US005555534A

United States Patent [19]
Maslak et al.

[11] Patent Number: 5,555,534
[45] Date of Patent: Sep. 10, 1996

[54] METHOD AND APPARATUS FOR DOPPLER RECEIVE BEAMFORMER SYSTEM

[75] Inventors: Samuel H. Maslak, Woodside; Christopher R. Cole, Cupertino; Joseph G. Petrofsky, Sunnyvale, all of Calif.

[73] Assignee: Acuson Corporation, Mountain View, Calif.

[21] Appl. No.: 433,916

[22] Filed: May 2, 1995

Related U.S. Application Data

[63] Continuation-in-part of Ser. No. 286,648, Aug. 5, 1994, abandoned.

[51] Int. Cl.$^6$ .................................................. G03B 42/06
[52] U.S. Cl. ................................................ 367/135; 367/7
[58] Field of Search .................................. 367/138, 119, 367/121, 103, 105, 135, 11, 7; 73/626, 625; 364/413.25; 128/660.01, 660.04, 660.05, 661.01, 661.07; 342/81, 154, 158

[56] References Cited

U.S. PATENT DOCUMENTS

| | | | |
|---|---|---|---|
| 3,805,596 | 4/1974 | Klahr | 73/67.8 |
| 4,140,022 | 12/1979 | Maslak . | |
| 4,387,597 | 6/1983 | Brandestini . | |
| 4,550,607 | 11/1985 | Maslak et al. | 73/626 |
| 4,598,589 | 7/1986 | Riley et al. | 367/90 |
| 4,608,868 | 9/1986 | Green . | |
| 4,699,009 | 10/1987 | Maslak et al. | 73/626 |
| 4,733,562 | 3/1988 | Saugeon | 73/626 |
| 4,759,373 | 7/1988 | Takeuchi . | |
| 4,809,184 | 2/1989 | O'Donnell et al. | 364/413.25 |
| 4,839,652 | 6/1989 | O'Donnell et al. | 341/122 |
| 4,886,069 | 12/1989 | O'Donnell | 128/661.01 |
| 4,893,284 | 1/1990 | Magrane | 367/12 |
| 4,896,287 | 1/1990 | O'Donnell et al. | 364/754 |
| 4,924,869 | 5/1990 | Takeuchi et al. . | |
| 4,966,151 | 10/1990 | Takeuchi . | |
| 4,975,885 | 12/1990 | Hassler et al. | 367/7 |
| 4,983,970 | 1/1991 | O'Donnell et al. | 341/122 |
| 5,005,419 | 4/1991 | O'Donnell et al. | 73/626 |
| 5,014,710 | 5/1991 | Maslak et al. | 128/660.05 |
| 5,111,695 | 5/1992 | Engeler et al. | 73/626 |
| 5,121,364 | 6/1992 | O'Donnell . | |
| 5,142,649 | 8/1992 | O'Donnell | 367/7 |
| 5,165,413 | 11/1992 | Maslak et al. | 128/660.05 |
| 5,230,340 | 7/1993 | Rhyne | 128/661.01 |
| 5,235,982 | 8/1993 | O'Donnell | 128/660.07 |
| 5,249,578 | 10/1993 | Karp et al. | 128/661.01 |
| 5,269,307 | 12/1993 | Fife et al. . | |
| 5,309,409 | 5/1994 | Jones et al. . | |
| 5,318,033 | 6/1994 | Savord . | |
| 5,375,470 | 12/1994 | Matsushima et al. . | |
| 5,406,949 | 4/1995 | Yao et al. . | |

OTHER PUBLICATIONS

*Beamforming*, Dan E. Dudgeon & Russell M. Mersereau, *Multidimensional Digital Signal Processing*, Section 6.2, Prentice Hall, 1984.

*Digital Signal Processing for Sonar*, William C. Knight, Roger G. Pridham, Steven M. Kay, *Proceedings of the IEEE*, vol. 69, No. 11, Nov. 1981.

(List continued on next page.)

*Primary Examiner*—Daniel T. Pihulic
*Attorney, Agent, or Firm*—Brinks Hofer Gilson & Lione

[57] ABSTRACT

An ultrasonic receive system includes two receive beamformers. A first receive beamformer is optimized for imaging modes such as B-mode and color Doppler flow imaging, and therefore has high spatial resolution and wide bandwidth, while the accompanying second receive beamformer has a wide dynamic range and is dedicated for use in acquiring spectral Doppler information, which is typically narrowband compared to imaging information. The second receive beamformer achieves the sensitivity and low-noise performance of a dedicated single-channel pencil probe instrument yet it also performs electronic beam steering. Both receive beamformers can operate through a common transducer array, thereby increasing exam efficiency and permitting registration of spectral Doppler information with a B-mode or color Doppler flow image.

116 Claims, 19 Drawing Sheets

OTHER PUBLICATIONS

*Fundamentals of Digital Array Processing*, Dan E. Dudgeon, *Proceedings of the IEEE*, vol. 65, No. 6, Jun. 1977.

*Digital Beamforming Antennas; An Introduction*, Hans Steyskal, Microwave Journal, Jan. 1987.

*Acoustic Imaging for Nondestructive Evaluation*, Gordon S. Kino, *Proceedings of the IEEE*, vol. 67, pp. 510–525, Apr. 1979.

*A 16 PSK Modulator with Phase Error Correction*, Bernd Wuppermann, Brian Fox, Rick Walker, Simon Atkinson, Dan Budin, Colin Lanzl, Scott Bleiweiss, ISSCC 93, Session 9, Radio Communication Circuits, Paper TP 9.1.

Liz Hatle and Bjorn Angelsen, Doppler Ultrasound in Cardiology; Physical Principles and Clinical Applications, Second Edition pp. 69–71, 1982.

Acuson 128 Computed Sonography Systems Service Manual, pp. 13–32, 113–125, Acuson Corp., Aug. 1989.

*Underwater Acoustic Imaging*.Jerry L. Sutton, *Proceedings of the IEEE*, vol. 67, pp. 554–556, Apr. 1979.

*Digital Beamforming for Radar*, P. Barton, *Proceedings of the IEEE*, vol. 127, pt. F. No. 4, Aug. 1980.

*A Digital Synthetic Focus Acoustic Imaging System*,P. D. Carl, G. S. Kino, C. S. Desilets, and P. M. Grant, *Acoustic Imaging*,vol. 8, 1978.

*Digital Beamforming in Ultrasound*, B. D. Steinberg, *IEEE Transactions of Ultrasonics, Ferroelectronics, and Frequency Control*, vol. 39, Nov. 1992.

Ronald E. Crochiere and Lawrence R. Rabiner, *Multirate Digital Signal Processing*, Prentice–Hall, 1983. [This document is presently unavailable and will be submitted at a later date].

*Digital Signal Processing Applications Using the ADSP–2100 Family*, vol. 1, Amy Mar, ed., Prentice–Hall, 1992. [This document is presently unavailable and will be submitted at a later date].

*A Novel Approach to Digital Beamforming*, Roger Pridham and Ronald A. Mucci, *Journal of the Acoustical Society of America*, vol. 63, Feb. 1978.

*Digital Interpolation Beamforming for Low Pass and Band Pass Signals*, Roger G. Pridham and Ronald A. Mucci, *Proceedings of the IEEE*, vol. 67, Jun. 1979.

*Principles of Oversampling A/D Conversion*, Max W. Hauser, *Journal of the Audio Engineering Society*, vol. 39, Jan./Feb. 1991.

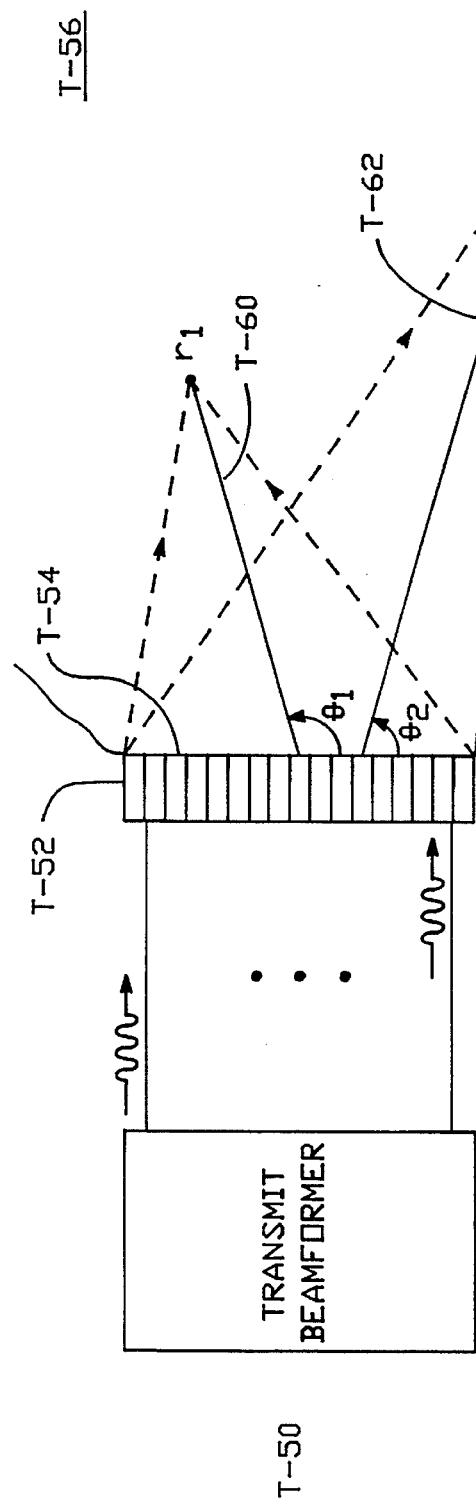
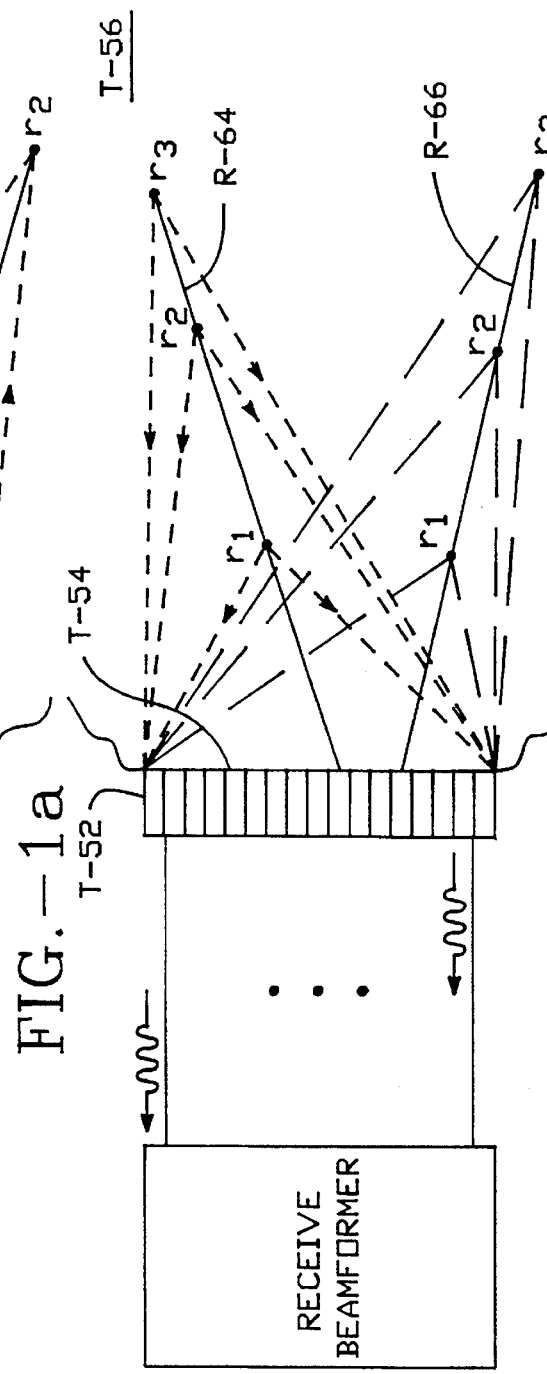
FIG.–1a
FIG.–1b

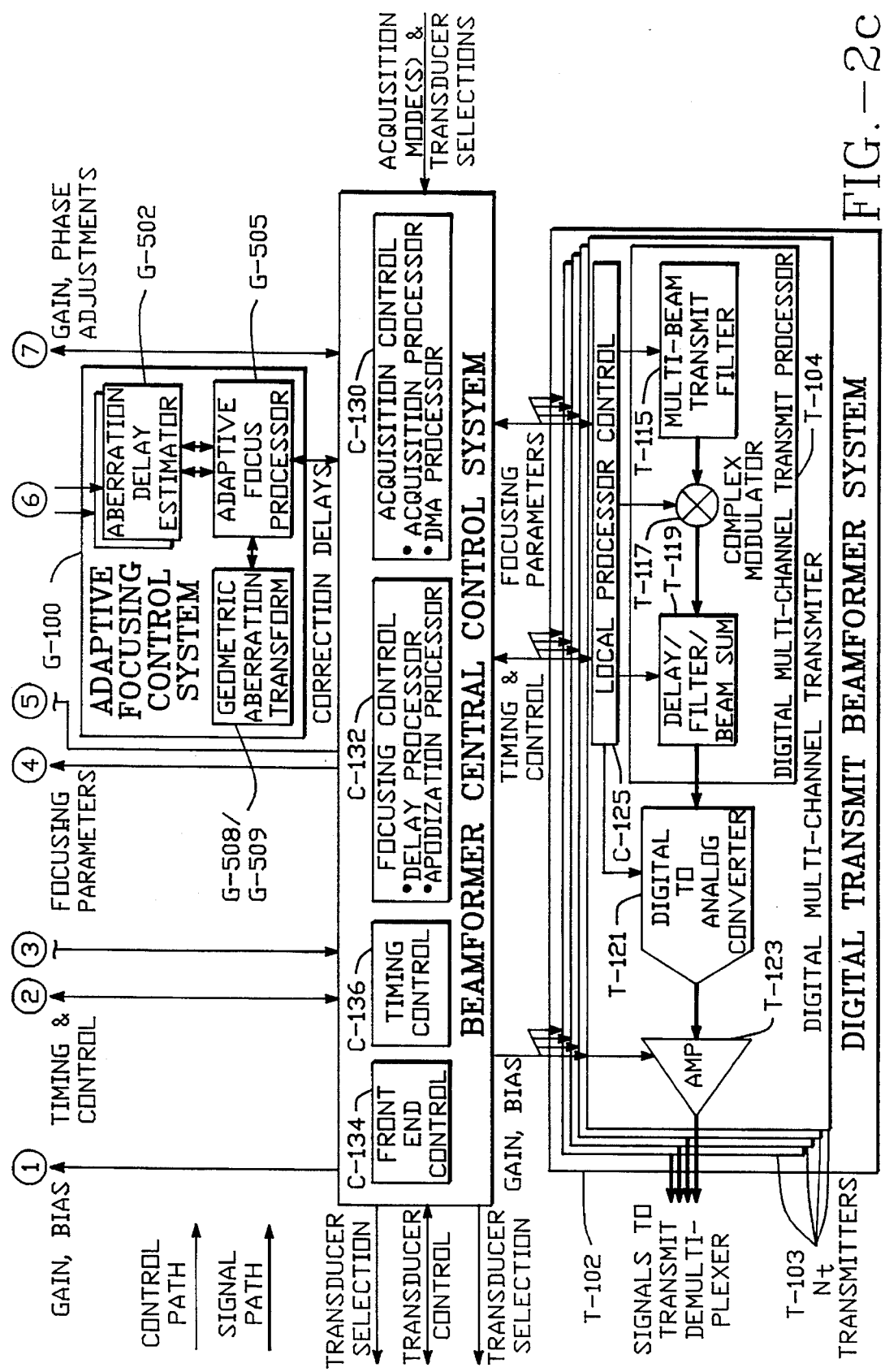

FIG.—6

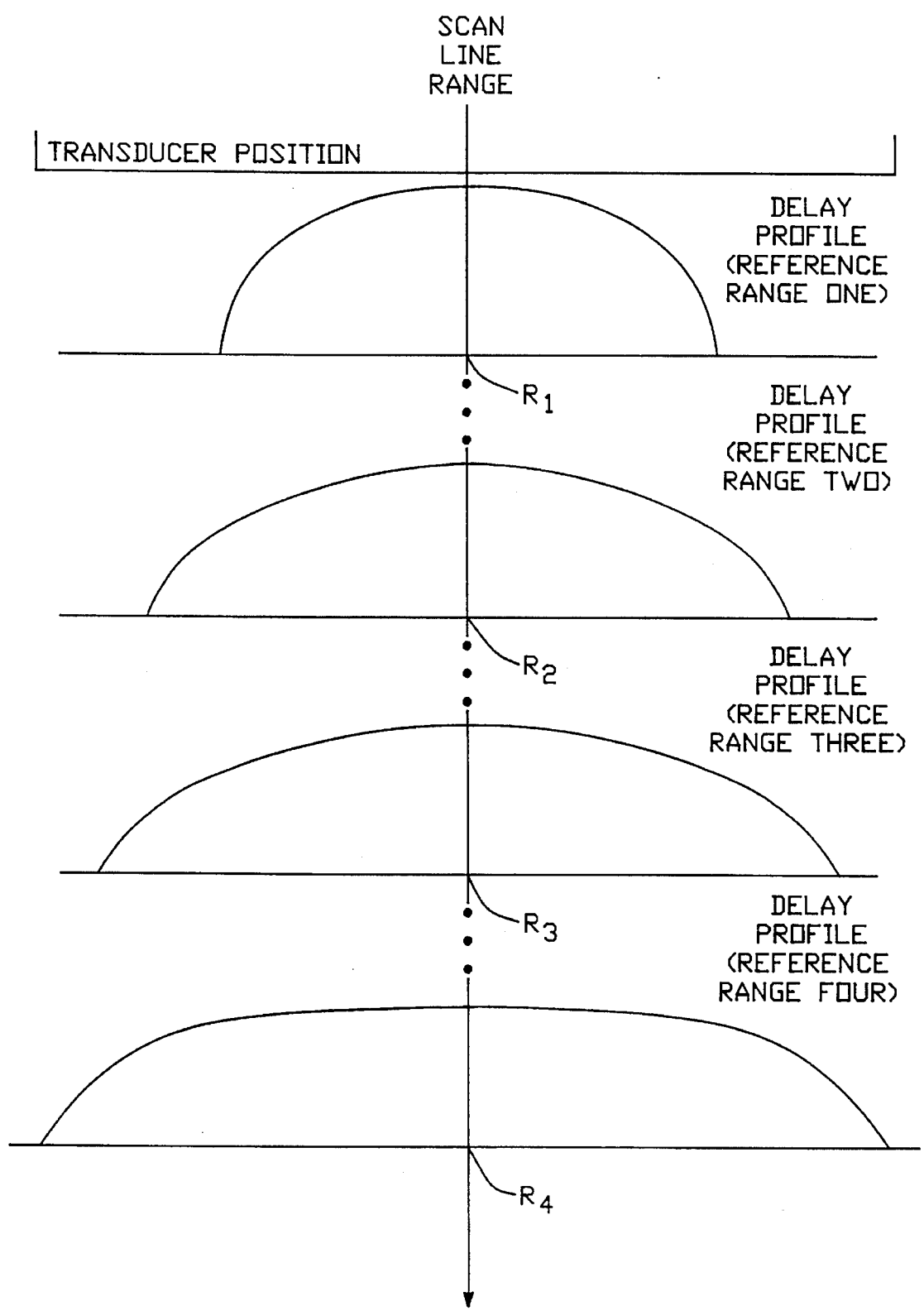
FIG.—9c

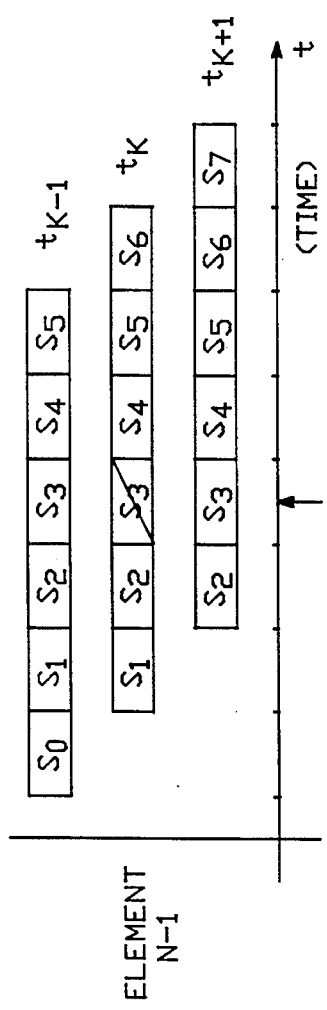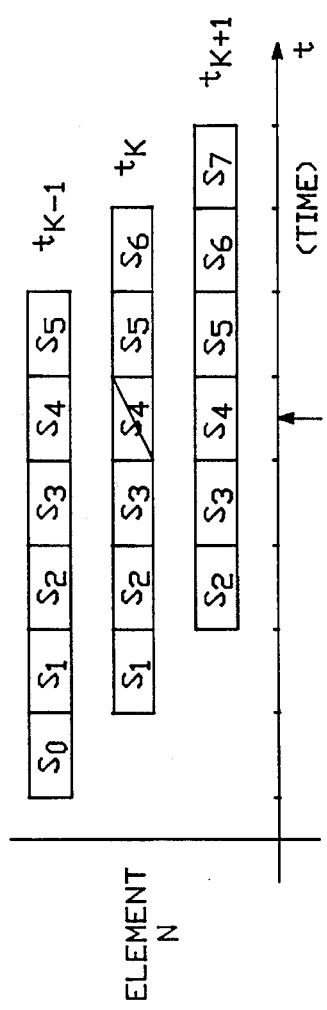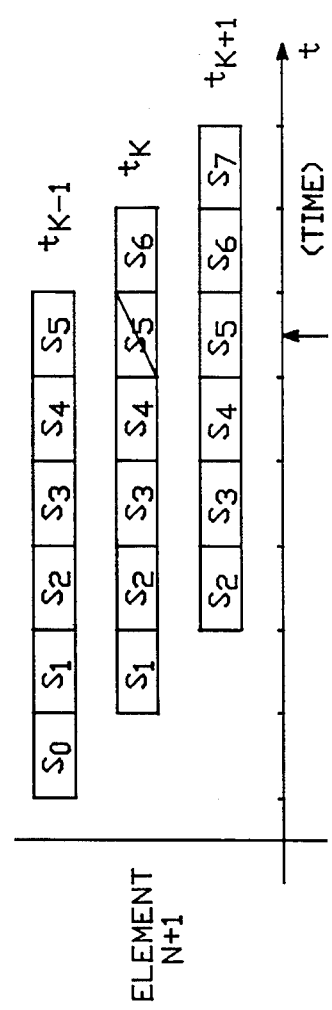

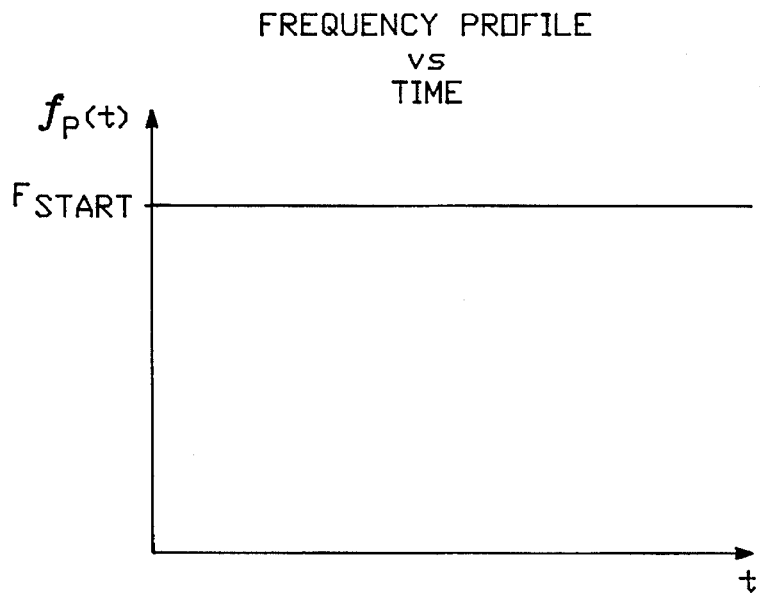
FIG.—14a
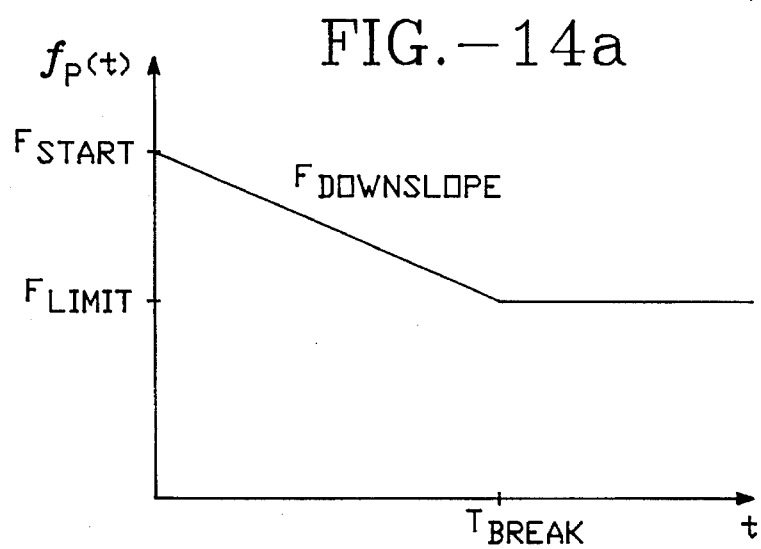
FIG.—14b
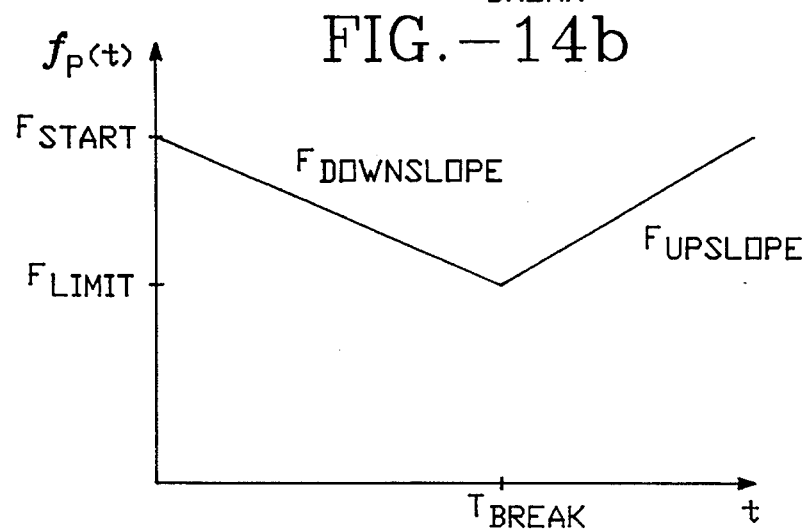
FIG.—14c

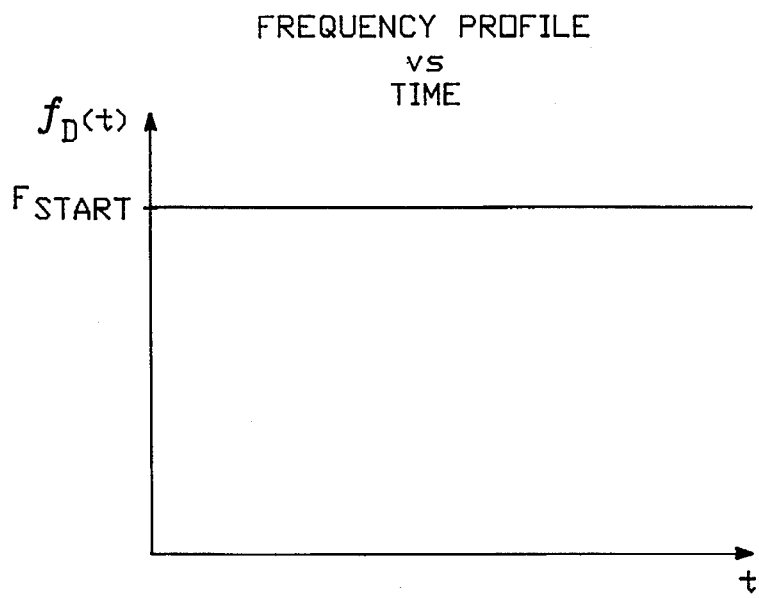
FIG.—14d
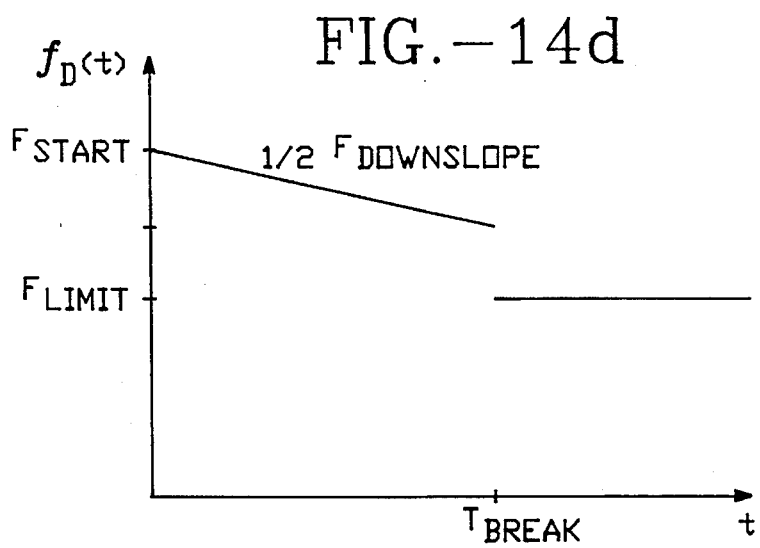
FIG.—14e
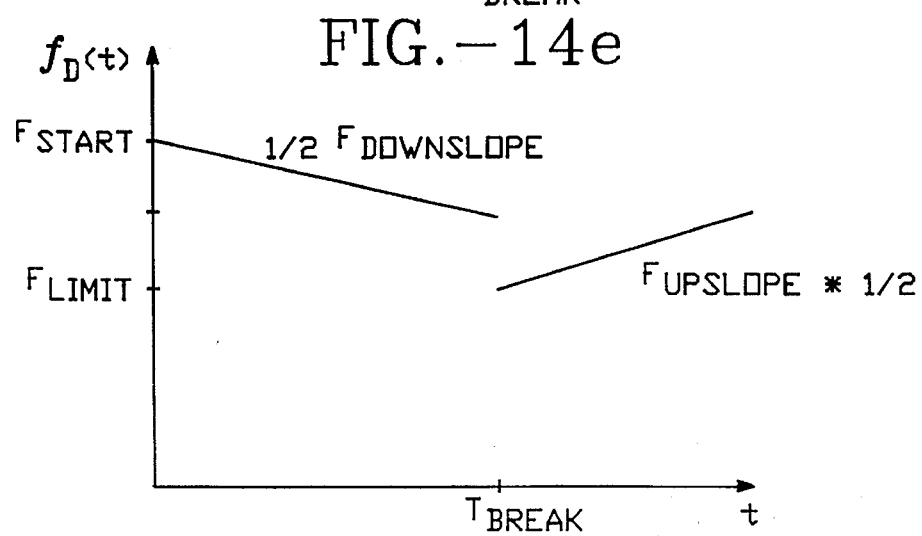
FIG.—14f

METHOD AND APPARATUS FOR DOPPLER RECEIVE BEAMFORMER SYSTEM

REFERENCE TO RELATED APPLICATION

This application is a continuation in part of Ser. No. 08/286,648, filed Aug. 5, 1994 now abandoned.

REFERENCE TO MICROFICHE APPENDIX

This application includes a microfiche appendix of 195 sheets of microfiche having 19,058 frames. A portion of the disclosure of this patent document contains material which is subject to copyright protection. The copyright owner has no objection to the facsimile reproduction by any one of the patent disclosure, as it appears in the Patent and Trademark Office patent files or records, but otherwise reserves all copyright rights whatsoever.

CROSS-REFERENCE TO RELATED APPLICATIONS

This application is related to:

a. METHOD AND APPARATUS FOR RECEIVE BEAMFORMER SYSTEM, Wright et al., Attorney Docket No. 5055-77 Ser. No. 08/432,615;

b. METHOD AND APPARATUS FOR TRANSMIT BEAMFORMER SYSTEM, Cole et al., Attorney Docket No. 5055-78 Ser. No. 08/432,056;

c. METHOD AND APPARATUS FOR FOCUS CONTROL OF TRANSMIT AND RECEIVE BEAMFORMER SYSTEMS, Gee et al., Attorney Docket No. 5055-79 Ser. No. 08/432,544;

d. METHOD AND APPARATUS FOR ADJUSTABLE FREQUENCY SCANNING IN ULTRASOUND IMAGING, Wright et al., Attorney Docket No. 5055-83 Ser. No. 08/432,868;

e. METHOD AND APPARATUS FOR A BASEBAND PROCESSOR OF A RECEIVE BEAMFORMER SYSTEM, Wright et al., Attorney Docket No. 5055-84 Ser. No. 08/433,217;

f. METHOD AND APPARATUS FOR BEAMFORMER SYSTEM WITH VARIABLE APERTURE, Cole et al., Attorney Docket No. 5055-85 Ser. No. 08/432,547.

The above patent applications are all commonly assigned with the present application, filed concurrently with the present application, and are all incorporated herein by reference in their entirety.

The present application is also related to the following previously filed applications:

a. METHOD AND APPARATUS FOR REAL-TIME, CONCURRENT ADAPTIVE FOCUSING IN AN ULTRASOUND BEAMFORMER IMAGING SYSTEM, Wright et al., Ser. No. 08/286,528, filed Aug. 5, 1994;

b. METHOD AND APPARATUS FOR A GEOMETRIC ABERRATION TRANSFORM IN AN ADAPTIVE FOCUSING ULTRASOUND BEAMFORMER SYSTEM, Wright et al., Ser. No. 08/286,664, filed Aug. 5, 1994;

c. METHOD AND APPARATUS FOR COHERENT IMAGE FORMATION, Wright et al., Ser. No. 08/286,510, filed Aug. 5, 1994 now abandoned.

I. FIELD OF THE INVENTION

This invention relates to coherent imaging and Doppler systems including, for example, radar, sonar, seismic, and ultrasound systems, using vibratory energy, and in particular, but not limited to, phased array ultrasound imaging systems with spectral Doppler acquisition. Although the invention will be discussed with respect to an ultrasound system, the invention can be implemented with other types of coherent imaging systems.

II. BACKGROUND OF THE INVENTION

A. Literature

The open literature, which presents issues relevant to imaging systems in general, includes the following documents which are incorporated herein by reference:

1. Dan E. Dudgeon, "Fundamentals of Digital Array Processing," *Proceedings of the IEEE*, volume 65, pp. 898–904, June 1977.

2. Dan E. Dudgeon and Russell M. Mersereau, *Multidimensional Digital Signal Processing*, Chapter 6, Section 2: "Beamforming," Prentice Hall, 1984.

3. William C. Knight, Roger G. Pridham, and Steven M. Kay, "Digital Signal Processing for Sonar," *Proceedings of the IEEE*, volume 69, pages 1451–1506, November 1981. (Digital beamformers for use in sonar described on pages 1465–1471.)

4. Roger G. Pridham and Ronald A. Mucci, "A Novel Approach to Digital Beamforming," *Journal of the Acoustical Society of America*, volume 63, pages 425–434, February 1978.

5. Roger G. Pridham and Ronald A. Mucci, "Digital Interpolation Beamforming for Low-Pass and Bandpass Signals," *Proceedings of the IEEE*, volume 67, pages 904–919, June 1979.

6. P. Barton, "Digital Beamforming for Radar," *IEE Proceedings*, volume 127, part F, number 4, August 1980.

7. P. D. Carl, G. S. Kino, C. S. Desilets and P. M. Grant, "A Digital Synthetic Focus Acoustic Imaging System," *Acoustic Imaging*, volume 8, pp. 39–53, 1978.

8. B. D. Steinberg, "Digital Beamforming in Ultrasound," *IEEE Transactions on Ultrasonics, Ferroelectrics, and Frequency Control*, volume 39, pp. 716–721, November 1992.

9. Hans Steyskal, "Digital Beamforming Antennas," *Microwave Journal*, volume 30, No. 1, pp. 107–124, January 1987.

10. R. E. Crochiere and L. R. Rabiner, "Multirate Digital Signal Processing," Chapter 2, Prentice Hall, 1983.

B. Analog and Hybrid (Analog-Digital) Beamformer Systems

Relevant analog and hybrid (analog-digital) phased array beamformer system art can be found in the following patents which are incorporated herein by reference:

| U.S. Pat. No.: | Title: | Inventor(s): |
| --- | --- | --- |
| 4,140,022 | MULTIPLE TRANSDUCER ACOUSTIC IMAGING APPARATUS | Samuel H. Maslak |
| 4,550,607 | PHASED ARRAY ACOUSTIC IMAGING SYSTEM | Samuel H. Maslak J. Nelson Wright |
| 4,699,009 | DYNAMICALLY FOCUSED LINEAR PHASED ARRAY ACOUSTIC IMAGING | Samuel H. Maslak Hugh G. Larsen |

| U.S. Pat. No. : | Title: | Inventor(s): |
| --- | --- | --- |
| 5,014,710 and 5,165,413 | SYSTEM STEERED LINEAR COLOR DOPPLER IMAGING | Samuel H. Maslak Donald J. Burch J. Nelson Wright Hugh G. Larson Donald R. Langdon Joel S. Chaffin Grant Fash, III |

C. Imaging Beamformer Systems

The concept of a digital imaging beamformer system has been proposed in the art with respect to ultrasound systems. By way of example, the following U.S. patents, all of which are incorporated herein by reference, discuss various aspects of such systems. The patents include:

| U.S. Pat. No. : | Title: | Inventor(s): |
| --- | --- | --- |
| 4,809,184 | METHOD AND APPARATUS FOR FULLY DIGITAL BEAM FORMATION IN A PHASED ARRAY COHERENT IMAGING SYSTEM | Matthew O'Donnell Mark Magrane |
| 4,839,652 | METHOD AND APPARATUS FOR HIGH SPEED DIGITAL PHASED ARRAY COHERENT AIMGING SYSTEM | Matthew O'Donnell William E. Engeler Thomas L. Vogelsong Steven G. Karr Sharbel E. Noujaim |
| 4,886,069 | METHOD OF, AND APPARATUS FOR, OBTAINING A PLURALITY OF DIFFERENT RETURN ENERGY IMAGING BEAMS RESPONSIVE TO A SINGLE EXCITATION EVENT | Matthew O'Donnell |
| 4,893,284 | CALIBRATION OF PHASED ARRAY ULTRASOUND PROBE | Mark G. Magrane |
| 4,896,287 | CORDIC COMPLEX MULTIPLIER | Matthew O'Donnell William E. Engeler |
| 4,975,885 | DIGITAL INPUT STAGE FOR AN ULTRASOUND APPARATUS | Dietrich Hassler Erhard Schmidt Peter Wegener |
| 4,983,970 | METHOD AND APPARATUS FOR DIGITAL PHASED ARRAY IMAGING | Matthew O'Donnell William E. Engeler John J. Bloomer John T. Pedicone |
| 5,005,419 | METHOD AND APPARATUS FOR COHERENT IMAGING SYSTEM | Matthew O'Donnell Kenneth B. Welles, II Carl R. Crawford Norbert J. Plec Steven G. Karr |
| 5,111,695 | DYNAMIC PHASE FOCUS FOR COHERENT IMAGING BEAM FORMATION | William E. Engeler Matthew O'Donnell John T. Pedicone John J. Bloomer |
| 5,142,649 | ULTRASONIC IMAGING SYSTEM WITH MULTIPLE, DYNAMICALLY FOCUSED TRANSMIT BEAMS | Matthew O'Donnell |
| 5,230,340 | ULTRASOUND IMAGING SYSTEM WITH IMPROVED DYNAMIC FOCUSING | Theador L. Rhyne |
| 5,235,982 | DYNAMIC TRANSMIT FOCUSING OF A STEERED ULTRASONIC BEAM | Matthew O'Donnell |
| 5,249,578 | ULTRASOUND IMAGING SYSTEM USING FINITE IMPULSE RESPONSE DIGITAL CLUTTER FILTER WITH FORWARD AND REVERSE COEFFICIENTS | Sidney M. Karp Raymond A. Beaudin |

D. Doppler Beamformer Systems

Medical ultrasound imaging operates by firing (transmitting) a sequence of focused ultrasonic "lines" or "beams" into body tissue from an array of ultrasonic transducers, with the firing directions steered to cover a planar slice of the tissue according to a predefined scanning pattern. The ultrasonic energy propagates at an assumed constant propagation velocity through the tissue, and interacts with the tissue to reflect or defract a weak portion of the energy back to the ultrasonic array that launched the ultrasonic energy. The round-trip delay time due to the finite propagation velocity is shortest for those tissue returns closest to the ultrasonic array, and longest for those returns at the furthest range from the array. Thus, the energy received by the ultrasonic array at different points in time from a given transmit firing, contains information about the tissue at different depths ("ranges") in the body.

The transmit beam is steered by delaying the time at which different ones of the transducers in the array emit a pulse, with a predefined delay profile across the array, such that the interference pattern set up in the body emphasizes a relatively narrow line. The receive beam is steered in a similar and complimentary manner. In addition, the delay profiles also operate to focus the beam at a known depth within the body. On transmit, only one focal depth can be defined. On receive, the focal depth can be dynamically changed over time in order to track the depth of tissue from which reflections are being received at each moment in time.

In addition, the signal applied to each of the transducers on transmit is weighted according to an apodization profile in order to control the spatial side lobe pattern of the beam due to the finite aperture of the transducer array. A complimentary apodization profile is also applied on receive.

Several different ultrasonic data acquisition modes are known, including those referred to as B-mode (gray scale imaging), F-mode (color flow or Doppler imaging) and D-mode (spectral Doppler).

In B-mode imaging, the ultrasound system typically transmits a series of beams, along scan lines, steered to scan a desired field of view. The ultrasound system typically steers "receive beams" in a manner that corresponds to the transmit beams. Data returned from each receive beam is communicated to an image display subsystem which reconstructs a two-dimensional gray scale image from the B-mode data and displays it on a console.

F-mode imaging is accomplished in a manner similar to B-mode imaging, in that the ultrasound system fires and receives a series of beams to scan a field of view. However, since F-mode imaging requires calculation of the velocity of targets, each line is fired and received several times. As with B-mode imaging, the data returned from each firing of each line is used to reconstruct an image on a console.

F-mode imaging is often used concurrently with B-mode imaging. For example, the gray scale image reconstructed from a B-mode scan can be superimposed with an F-mode image reconstructed from an F-mode scan of the same field of view or of a lesser included field of view. The F-mode information can be displayed using colors, with different colors indicating different positive or negative flow velocities or turbulence at the part of the B-mode image on which the pixel is superimposed. Because F-mode imaging is intended to provide only qualitative insight into target motion in the patient's body, the ultrasound system's processing of F-mode signals need not have high spatial or velocity resolution either in amplitude or in pixel resolution. However, since an important value of F-mode imaging is to detect flows relative to anatomical structures in the body, it is usually important that the F-mode image be properly registered with the B-mode image on-screen.

In D-mode (spectral Doppler) acquisition, the ultrasound system fires a beam and processes the return signal for a single target. Spectral Doppler information can be obtained by transmitting and receiving either continuous wave (CW) or pulsed wave (PW) ultrasonic energy. In CW Doppler acquisition, the ultrasound receiver continuously receives echoes from all objects within the receiver's area of sensitivity in the body, and cannot isolate information received from any specific range interval. CW Doppler is most useful where the instrument's area of sensitivity can be adjusted, either by physical placement of the probe or by beamforming, or both, to include only the desired target. In PW Doppler acquisition, the ultrasound instrument receives echoes from individual pulses, the timing of which implies a range interval within the body of the object which produced the echo. A clinician typically selects a range interval within which the target is expected to be located.

In D-mode acquisition, it is desirable to be able to produce detailed quantitative measurements over a very large range of signal levels (dynamic range). D-mode information is processed by the ultrasound system to display either the velocity spectrum of the target, plotted against time, or to provide an audio output carrying similar information. Spectral Doppler acquisition is described in Liv Hatle, M.D. & Bjorn Angelsen, Dr. Techn., "Doppler Ultrasound in Cardiology" (1st ed. 1982) and (2d ed. 1984), both of which are incorporated herein by reference in their entirety.

In addition to B-, F- and D-mode acquisition, a fourth mode also exists, known as M-mode, but this is merely a different display modality for data acquired in a manner similar to B- or F-mode acquisition. The requirements for M-mode acquisition are not significantly different from those for B- or F-mode acquisition.

D-mode ultrasound acquisition requires a receive instrument with a much greater dynamic range than that required for B- or F-mode acquisition. This is primarily because D-mode acquisition concentrates on low-level Doppler signatures from echoes of moving targets, such as the flow of blood corpuscles. The echoes produced by blood flows are extremely weak, and a cardiac valve leak in particular produces a very weak signal. But clutter, or the non-Doppler-shifted component of a D-mode receive signal, is often much stronger. For example, non-moving objects in the receiver's area of sensitivity in the body may be producing echoes which are much stronger than those being produced by the target of interest. As another example, in one form of PW Doppler known as "high pulse repetition frequency" (HPRF), one or more new pulses are fired before data acquisition for the current pulse is complete. In HPRF-PW Doppler, echoes being produced from the new pulses reflecting off objects less deep than the target of interest, can be stronger than the echo being produced from the current pulse reflecting off the target of interest. This problem of near-field echoes arises in CW Doppler as well, where the transmit signal is being received continuously.

In addition to clutter, in CW Doppler there also may be significant crosstalk, both electric and acoustic. Thus, to detect weak flows, the receive signal path must have a large enough dynamic range to be able to carry the clutter without corrupting the noise floor, even though they may be separated by many orders of magnitude.

Receivers intended for B- and F-mode acquisition have less of a dynamic range requirement than required for the sensitivity of D-mode. B-mode acquisition concentrates on echoes from stationary objects, which echoes are much stronger than those most of interest for spectral Doppler analysis, and F-mode acquisition is not subject to the same kinds of clutter sources that are present in CW and HPRF-PW D-mode acquisition.

Commercially available prior art analog medical ultrasound systems with analog receive beamformers typically employed analog, per-channel variable delay lines in order to form (define) receive beams. The analog delay lines provided the good directivity (lateral resolution) required for high-quality B- and F-mode imaging. These systems could also be used for D-mode acquisition by activating a post-beamforming range gate in order to isolate the energy received from the desired range interval of the beam. But although the analog delay lines were adequate for B- and F-mode acquisition, they limited the dynamic range below that required to adequately handle D-mode processing. Wider-dynamic-range analog variable delay lines were prohibitively expensive, especially considering the large number of them needed.

Prior art digital receive beamformers provide numerous advantages over analog receive beamformers for B- and F-mode acquisition, although substantial improvements are still possible through innovative designs. Digital receive beamformers use digital variable delay elements in place of the analog variable delay lines of analog receive beamformers. Although digital variable delay elements can be made less expensively than comparably high-precision analog variable delay lines, the digital processing path imposes other limitations on the dynamic range achievable for D-mode acquisition.

Specifically, in order to achieve the dynamic range desirable for D-mode acquisition, a large bit-precision may be needed to be carried through most of the processing path. This would render the instrument far more expensive than it would be if only the lower bit-precision acceptable for B- and F-mode acquisition were to be carried. Additionally, digital receive beamformers typically operate by converting the individual per-channel analog input signals to digital form at the earliest opportunity, and performing all processing on the digital version of the signals. The per-channel analog-to-digital converters (ADCs) which perform this operation need to produce samples at rates of, for example, 40 megasamples per second in order to avoid aliasing, a requirement which already places significant demands on the ADCs. If these ADCs were required to produce samples at that rate and also with the significantly higher bit-precision desirable for the wider dynamic range requirements of D-mode acquisition, the demands could render the ADCs either unmanufacturable in present technology or, at a minimum, extremely expensive. Thus digital receive beamformers designed with the bit-precision to support B/F-mode acquisition typically do not support the dynamic range necessary for high performance D-mode acquisition.

Because of the inadequacies of prior art receive beamformers for D-mode acquisition, commercially available instruments often included a non-beamforming separate auxiliary channel (or AUX channel) exclusively for D-mode acquisition. This channel operated with a separate, non-imaging transducer consisting of one or two elements. An AUX channel could perform CW or PW spectral Doppler using a single receive channel with wide dynamic range.

This wide-dynamic-range channel delivered superior spectral Doppler performance, but the use of a separate probe had significant clinical drawbacks. Since the AUX channel did not produce an image, a clinician could not visually register the location of a flow in the body relative to anatomical structures visible on a B-mode display. Further, a clinician desiring to use both B-mode and D-mode in a single patient examination was required to interrupt the examination to change probes. The major functional blocks of a typical AUX channel are illustrated in the above-incorporated "Doppler Ultrasound in Cardiology" book, 1st edition, at p. 202.

Accordingly, because of the above constraints, users of medical ultrasound instruments were in the past restricted to choosing either high-resolution-beamformed acquisition on one hand, or wide-dynamic-range, non-beamformed acquisition on the other hand. Wide-dynamic-range-beamformed acquisition, desirable in order to permit clinicians to visually locate targets for detailed quantitative spectral Doppler analysis relative to anatomical structures in the body, was not available. There is therefore a need for ultrasonic receive systems which can achieve both high-resolution, phased-array beamforming of B- and/or F-mode acquisition and wide-dynamic-range phased-array beamforming of D-mode acquisition without requiring a large amount of additional or expensive hardware.

III. SUMMARY OF THE INVENTION

According to the invention, roughly described, an ultrasonic receive system includes two receive beamformers. A first receive beamformer is optimized for imaging modes such as B- and F-mode, and therefore has high spatial resolution, while the accompanying second receive beamformer has a wide dynamic range and is dedicated for use in acquiring D-mode signals. The second receive beamformer achieves the sensitivity and low-noise performance of a single-channel pencil probe instrument yet it also performs electronic beam steering. The second beamformer does not require a large amount of additional hardware since many of the functions required in the imaging receive beamformer in order to acquire data for other modes, can be omitted for dedicated D-mode acquisition. Preferably, the second receive beamformer is analog.

In an embodiment of the second receive beamformer (sometimes referred to herein as the Doppler receive beamformer), the analog input signal from each receive element is amplified, applied to in-phase (I) and quadrature (Q) mixers for demodulation to baseband, independently phased in a complex rotator, and for pulse wave (PW) signals, independently range gated to effect both beamforming and isolation of the desired range interval. The baseband signals from all the channels are then summed and (for PW signals) integrated over the combined time period of all the range gates. (For continuous wave (CW) signals, the integrator can function as a low-pass filter.) The integrator is followed by a sampler, filters and subsequent processing such as analog-to-digital conversion.

The placement of individual per-channel range gates upstream of channel summation embodies one aspect of the invention which substantially reduces the added hardware required for an additional wide dynamic range, D-mode receive beamformer, because not only do they substitute for the post-summation range gate, but they also substitute for the expensive, high-precision delay lines (analog or digital) required in the conventional architecture. The range gates can be implemented extremely economically.

The use of a single integrator downstream of the summation embodies another aspect of the invention. PW spectral Doppler processing requires integrating over the selected range interval in order to yield, ultimately, a single output value per line firing. But with the per-channel analog delay lines being replaced with individually activated per-channel range gates, it might be supposed that individual per-channel integrators are required in order to integrate over the time that each individual range gate is closed (conducting). But this aspect of the invention takes advantage of the observation that when the range gate in a particular channel is open (not conducting), that channel is not contributing to the sum. Thus the integration function can remain after summation, as long as the integration takes place over a time period beginning no later than the time when the first range gate closes, and ending no earlier than the time that the last range gate opens. The PW sample is incomplete until the end of that time period.

The separation of the functions of demodulation and phasing in each of the channels embodies yet another aspect of the invention. In order to perform coherent summation of the signals from the various channels, the phases of the individual channel signals must be aligned prior to the summation in order that they all add, rather than randomly add and subtract. Also, mixing to baseband requires both sine and cosine products in order to retain Doppler direction information. The conventional approach to phase alignment is to generate, for each channel, its own mixer clock inputs with a selected phase. But providing variable-phase clocks for a single channel is itself problematical; providing them for an acceptable number of different channels (for example 64), is even more so. Providing two variable phase clocks, in accurate quadrature, for many channels, would be extremely difficult. This aspect of the invention takes advantage of the observation that focusing requirements are less demanding in D-mode acquisition than in other acquisition modes, so a granularity of only a small number of phase settings is sufficient. Common sine and cosine clocks are therefore distributed to the mixers in all channels, and in-line phase rotation is performed per-channel in response to selections made digitally by a common control unit.

There are many variations possible in the implementation of the invention, including the rearrangement and/or combination of processing functions and the inclusion of an IF stage. Some of these variations are mentioned at the conclusion of the Detailed Description.

IV. BRIEF DESCRIPTION OF THE DRAWINGS

The invention will be described with respect to particular embodiments thereof, and reference will be made to the drawings, in which:

FIGS. 1a and 1b conceptually depict the transmission and reception of ultrasound beams to and from body tissue;

FIG. 2a depicts a high level block diagram schematic of a novel ultrasound beamformer system of an ultrasound medical imaging system.

FIGS. 2b and 2c taken together depict a detailed block diagram of the ultrasound beamformer system of FIG. 2a;

FIG. 9c depicts a series of evolving delay profiles which have increasing aperture widths with increased range along a receive scan line centered on and normal to the transducer array.

FIGS. 10a, 10b and 10c depict graphically the storage and selection of appropriate time delayed data from the variable time delay memory of the digital multi-channel receive processor of FIG. 8.

FIGS. 14a, 14b and 14c depict graphs of typical signal frequency downshifting profiles that can be applied for signal demodulation and fine phase adjustment in the complex multiplier and for signal remodulation in the phase aligner.

FIGS. 14d, 14e and 14f depict graphs of signal frequency downshifting profiles appropriate for signal demodulation.

V. DETAILED DESCRIPTION OF THE PREFERRED EMBODIMENT

Figure 2A:
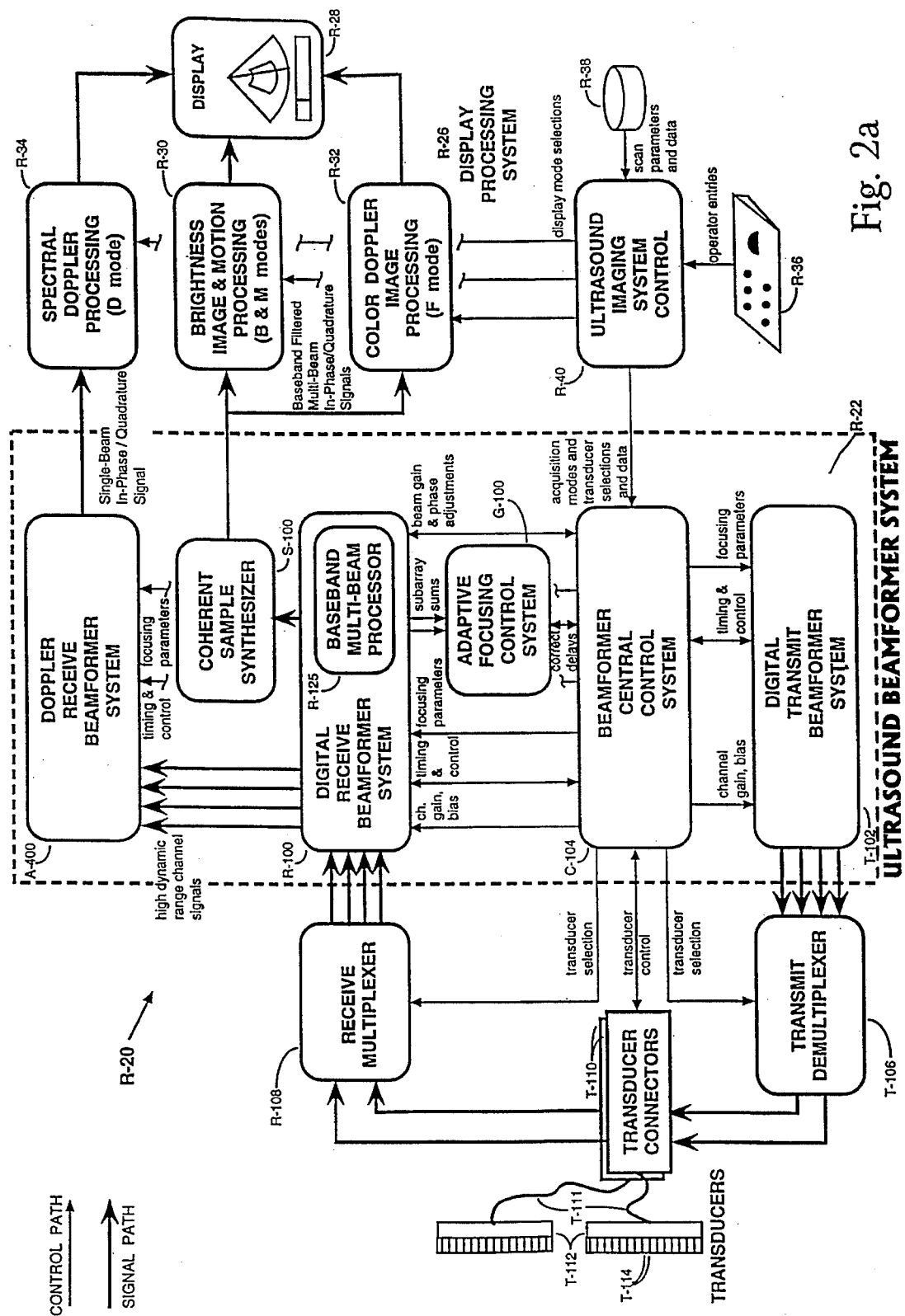

The present invention represents a component of a medical ultrasound imaging system for which additional patent applications, listed above, have been simultaneously filed in the United States Patent and Trademark Office.

A. Overview of Preferred Beamformer System Architecture

1. Ultrasound Signal Description

With respect to the present invention, ultrasound imaging is accomplished by firing (transmitting) into body tissue or other objects to be imaged a scan sequence of focused ultrasonic beams centered along straight lines in space called transmit scan lines (FIG. 1a). The transmit scan lines are generated by a transmit beamformer and an ultrasound transducer array. The transmit scan lines are spaced to produce a planar linear, planar sector or other display of the tissue via a pre-defined firing or scanning pattern. Focused to some defined depth in the tissue, the ultrasonic transmit continuous-wave (CW) or pulse-wave (PW) signal, propagating at an assumed constant propagation velocity of nominally c=1540 m/sec through the tissue, interacts with the tissue and reflects a small portion of the signal back to the ultrasound transducer array that initiated the ultrasound signal. The round trip delay time is shortest for those targets closest to the ultrasound transducer array, and longest for those targets farthest from the transducer array. With the application of appropriate time delays, the receive beamformer (FIG. 1b) can dynamically focus receive beams along straight lines in space called receive scan lines commencing, for example, with the shallowest range (depth) of interest and evolving toward the deepest range of interest.

FIGS. 1a and 1b depict representations of transmit and receive scan lines (solid) and straight-line signal propagation paths from individual elements (dashed), respectively. In FIG. 1a, the transmit beamformer is generally identified by T-50 with the transducer array T-52 containing a multiplicity of individual transducer elements T-54 organized as a linear phased array in this particular embodiment. As is known in the art, there are a great variety of transducer array configurations available for use with ultrasound transmit and receive beamformer systems. As can be seen in FIG. 1a, the transmit beamformer T-50 sends appropriately time-delayed electrical signals to the individual transducer elements T-54. These transducer elements T-54 then in turn convert electrical signals into acoustic waves that propagate into the body tissue T-56. By applying different time delays to the excitation signals sent to the individual transducer elements T-54, transmit scan lines T-60 and T-62, having respective foci $r_1$ and $r_2$, can be established. It is to be understood that each of these transmit scan lines is representative of a center line of a different transmit beam which is steered and focused into the body to be imaged.

The transmit beamformer T-50 can generate simultaneous multiple beams along different scan lines, or different focal depths along the same scan line (compound focus). Further, the multiple transmit beams can each scan the entire image format or be transmitted such that each of the multiple beams only scans a specified section of the image format.

FIG. 1b depicts a digital receive beamformer R-58 which is also connected to the transducer array T-52. Also depicted in FIG. 1b are receive scan lines R-64, R-66 corresponding to a dynamically focused first receive beam and a dynamically focused second receive beam, respectively. The beams are sampled in range at a plurality of focal depths ($r_1, r_2, r_3$) along each scan line. In the digital receive signal path of the present invention, transducer array signals can be selectively separated into data representative of multiple individual beams.

Each scan line of a transmit or receive scan pattern can be parameterized by the origin on the transducer array, the scan line orientation (angle θ) and the focus depth or range (r). The ultrasound imaging system of the present invention stores a pre-computed sparse data set of focusing time delay and aperture apodization values indexed by these parameters (based on geometric considerations as is known in the art) and expands the values by real-time computational means to control the transmit and receive beamformation systems that produce the desired scan lines.

2. Beamformer System

Figure 2B:
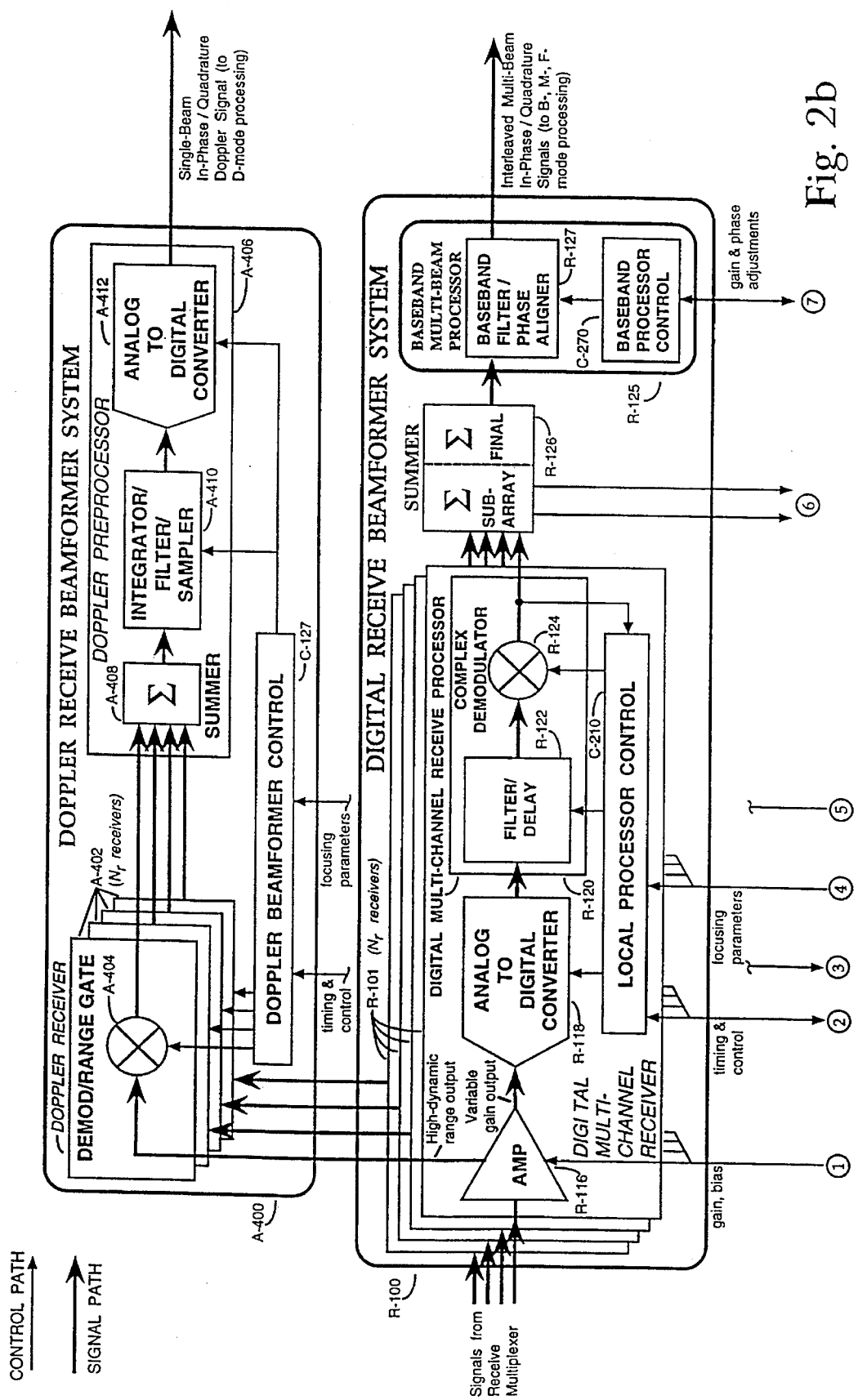

FIGS. 2a, 2b, 2c depict an overall block diagram of a medical ultrasound imaging system R-20. Ultrasound system R-20 includes a beamformer system R-22, one or more transducers T-112, a display processing system R-26 with a display R-28 and an ultrasound imaging system control R-40.

In FIGS. 2a, 2b, or 2c, the beamformer system R-22 includes inventive and novel (1) digital transmit beamformer system T-102, (2) digital receive beamformer system R-100, (3) beamformer central control system C-104, (4) adaptive focusing control system G-100, (5) Doppler receive beamformer system A-400, (6) baseband multi-beam processor R-125, and (7) coherent sample synthesizer S-100. These systems are depicted as high level, functional block diagrams. The blocks are abstracted from the actual implementation of a preferred embodiment in order to better illustrate the signal processing functions performed.

As indicated in FIG. 2a, beamformer system R-22 provides two sources of digital beam data to the display processing system R-26: (1) Doppler receive beamformer single-beam complex in-phase/quadrature data representing coherent temporal sampling of the beam (CW case) or coherent temporal sampling at one range location along the beam (PW case), and (2) digital receive beamformer multi-beam complex in-phase/quadrature data representing coherent sampling in range along each receive scan line. Beamformer system R-22 can be operated to provide a sequence of scan lines and associated samples as above to provide data for a variety of display modes. By way of example, possible display modes and their associated processors include (1) brightness image and motion processor R-30 for B-mode (gray-scale imaging) and M-mode (motion display), (2) color Doppler image processor R-32 for flow imaging, and (3) spectral Doppler processor R-34 for wide dynamic nonimaging Doppler velocity vs. time displays. Additional display modes can be created from the two complex data sources of R-22, as will be obvious to those skilled in the art.

Ultrasound system R-20 also includes a transmit demultiplexer T-106 for routing the output waveforms from the transmitters T-103 to the transducer elements T-114, a receive multiplexer R-108 for routing the input waveforms from the transducer elements T-114 to the receivers R-101, one or more transducer connectors T-110 and transducer arrays T-112. Many types of transducer arrays can be used with the present system.

Ultrasound system R-20 also includes an ultrasound imaging system control R-40, archival memory R-38 for storing scan parameters and scan data, and operator interface R-36.

As used herein, the term ultrasonic refers to frequencies above the range of human hearing. However, the transducer arrays T-112 are optimized for frequencies typically within the range of 2–10 MHz.

The transducer array T-112 is interchangeable with a variety of different kinds of transducer arrays, including but not limited to linear, curved, curvi-linear and annular transducer arrays. A variety of transducer array shapes and frequencies are desirable in order to satisfy the requirements of a variety of different clinical settings. However, the transducer arrays T-112 are typically optimized for frequencies within the above specified range of 2–10 MHz. The medical ultrasound system R-20 performs the three major functions of driving the ultrasonic transducer array of elements T-114 to transmit focused ultrasound energy, receiving and focusing back-scattered ultrasound energy impinging on the transducer array T-114, and controlling the transmit and receive functions to scan a field of view in scan formats including (but not limited to) linear, sector or Vector® format.

In FIGS. 2a, 2b, 2c, the control signals are communicated over the light lead lines while the signal paths are depicted with heavy lead lines.

3. Digital Transmit Beamformer System

The digital transmit beamformer T-102 (FIG. 2c) is the subject of the above cited co-pending application entitled: METHOD AND APPARATUS FOR TRANSMIT BEAMFORMER SYSTEM. It is to be understood that in a preferred embodiment, the digital transmit beamformer T-102 is comprised of a plurality of digital multi-channel transmitters T-103, one digital multi-channel transmitters for one or more of the individual transducer elements T-114. The transmitters are multi-channel in that each transmitter can process, in a preferred embodiment, up to four independent beams. Thus, for example, 128 multi-channel transmitters have 512 channels. In other preferred embodiments, more than four independent beams can be achieved. Processing more than four beams per processor is within the scope of the invention.

In a preferred embodiment, each of the digital multi-channel transmitters T-103 produces as its output in response to an excitation event the superposition of up to four pulses, each pulse corresponding to a beam. Each pulse has a precisely programmed waveform, whose amplitude is apodized appropriately relative to the other transmitters and/or channels, and delayed by a precisely defined time delay relative to a common start-of-transmit (SOT) signal. Transmitters T-103 are also capable of producing CW.

Each digital multi-channel transmitter T-103 conceptually comprises a multiple beam transmit filter T-115 which provides an output to a complex modulator T-117. The output from complex modulator T-117 is communicated to a delay/filter block T-119, and therefrom is provided to a digital-to-analog converter (DAC) T-121. The output of the DAC T-121 is amplified by an amplifier T-123. The multiple beam transmit filter T-115, the complex modulator T-117 and the delay/filter block T-119 comprise a digital multi-channel transmit processor T-104.

The transmit filter T-115 can be programmed to provide any arbitrary real or complex waveform responsive to a start-of-transmit (SOT) signal. The transmit filter T-115 is implemented with a memory which stores real or complex samples of any desired and arbitrary pulse waveform, and a means of reading the samples out sequentially in response to the start-of-transmit (SOT) signal delayed by a component of the focusing delay. In a preferred embodiment, the memory of T-115 is programmed to store baseband representations of real or complex pulse envelopes.

Block T-115, although primarily a memory, is referred to herein as a transmit filter, as the output of block T-115 can be thought of as the time response of a filter to an impulse. The complex modulator T-117 upconverts the envelope to the transmit frequency and provides appropriate focusing phase and aperture apodization.

Delay/filter block T-119 conceptually provides any remaining focusing delay component and a final shaping filter. The digital-to-analog converter (DAC) T-121 converts the transmit waveform samples to an analog signal. The transmit amplifier T-123 sets the transmit power level and generates the high-voltage signal which is routed by the transmit demultiplexer T-106 to a selected transducer element T-114.

Associated with each multi-channel transmit processor T-104 is a local or secondary processor control C-125 which provides control values and parameters, such as apodization and delay values, to the functional blocks of multi-channel transmit processor T-104. Each local or secondary channel control C-125 is in turn controlled by the central or primary control system C-104.

4. Digital Receive Beamformer System

The digital receive beamformer R-100 (FIG. 2b) is the subject of the above-identified application entitled: METHOD AND APPARATUS FOR RECEIVE BEAMFORMER SYSTEM which has been incorporated herein by reference.

The signals from the individual transducer elements T-114 represent return echoes or return signals which are reflected from the object being imaged. These signals are communicated through the transducer connectors T-110 to the receive multiplexer R-108. Through multiplexer R-108, each transducer element T-114 is connected separately to one of the plurality of digital multi-channel receivers R-101 which taken together with summer R-126 comprise the digital receive beamformer R-100 of the invention. The receivers are multi-channel in that each receiver can process, in a preferred embodiment, up to four independent beams. Processing more than four beams per processor is within the scope of the invention.

Each digital multi-channel receiver R-101 can, in a preferred embodiment, comprise the following elements which are represented by the high level function block diagram in FIG. 2b. These elements include a dynamic low-noise and variable time-gain amplifier R-116, an analog-to-digital converter (ADC) R-118, and a digital multi-channel receive processor R-120. The digital multi-channel receive processor R-120 conceptually includes a filter/delay unit R-122 and a complex demodulator R-124. The filter/delay unit R-122 provides for filtering and coarse focusing time delay. The complex demodulator R-124 provides for fine focusing delay in the form of a phase rotation and apodization (scaling or weighting), as well as signal demodulation to or near baseband. The digital multi-channel receivers R-101 communicate with summer R-126 where the signal samples associated with each beam from each receive processor are summed to form final receive scan line samples, and the resulting complex samples provided to baseband processor R-125. The exact functioning and composition of each of these blocks will be more fully described hereinbelow with respect to the remaining figures.

A local or secondary control C-210 is associated with each digital multi-channel receiver R-101. Local processor control C-210 is controlled by central or primary control C-104 and provides timing, control and parameter values to each said receiver R-101. The parameter values include focusing time delay profiles and apodization profiles.

5. Doppler Receive Beamformer System

The Doppler receive beamformer system A-400 for wide dynamic range, nonimaging Doppler acquisition includes analog receivers A-402, each of which receives echo signals from a respective one or more transducers T-114. Each of the Doppler receivers A-402 includes a demodulator/range gate A-404 which demodulates the received signal and gates it (PW mode only) to select the echo from a narrow range. The analog outputs of the Doppler receivers A-402 are communicated to a Doppler preprocessor A-406. In preprocessor A-406, the analog signals are summed by summer A-408 and then integrated, filtered, and sampled by analog processor A-410. Preprocessor A-406 then digitizes the sampled analog signal in an analog-to-digital converter (ADC) A-412. The digitized signal is communicated to the display processing system R-26. The Doppler receive beamformer system is the subject of the present application.

Associated with all Doppler receivers A-402 is a single local or secondary Doppler beamformer control C-127. Doppler beamformer control C-127 is controlled by central or primary control system C-104 and provides control and focusing parameter values to the Doppler receive beamformer system A-400.

As pointed out in the above patent application describing the Doppler receive beamformer system A-400, the present beamformer system R-22 advantageously combines an imaging digital receive beamformation system R-100 and a nonimaging Doppler receive beamformation system A-400 in a manner which uses the same digital transmit beamformation system T-102 and the same transducer array and allows the digital receive beamformation system R-100 to be optimized for imaging modes such as B-mode and color Doppler imaging, and therefore has high spatial resolution, while the accompanying Doppler receive beamformation system has a wide dynamic range and is optimized for use in acquiring signals for nonimaging Doppler processing.

6. Beamformer Central Control System

The beamformer central control system C-104 of the present invention controls the operation of the digital transmit beamformer system T-102, the digital receive beamformer system R-100, the Doppler receive beamformer system A-400, the adaptive focusing control system G-100, and the baseband processor R-127. The beamformer control is more fully discussed in the above referenced and incorporated patent application entitled: METHOD AND APPARATUS FOR FOCUS CONTROL OF TRANSMIT AND RECEIVE BEAMFORMER SYSTEMS.

The main control functions of the central control system C-104 are depicted in FIG. 2c. The control functions are implemented with four components. The acquisition control C-130 communicates with the rest of the system including the ultrasound system control R-40 and provides high level control and downloading of scanning parameters. The focusing control C-132 computes in real time the dynamic delay and apodization digital values required for transmit and receive beamformation, which includes pre-computed and expanded ideal values plus any estimated correction values provided by adaptive focusing control system G-100. The front end control C-134 sets the switches for the demultiplexer T-106 and the multiplexer R-108, interfaces with the transducer connectors T-110, and sets the gain and bias levels of all transmitter amplifiers T-123 and all receive amplifiers R-116. The timing control C-136 provides all the digital clocks required by the digital circuits. This includes the sampling clocks for all the transmitter DACs T-121 and receiver ADCs R-118.

In a preferred embodiment central control C-104 expands sparse tables of focusing time delay and aperture apodization values based on pre-computed and stored data, through such techniques as interpolation and extrapolation. The expanded delay and apodization values are communicated as a profile of values across the transducer aperture to the local processor controls, where the delay and apodization data expansion in range is completed to per-transducer-element, per-sample, per-beam values.

7. Adaptive Focusing Control System

Adaptive focusing control system G-100 provides for real time concurrent adaptive focusing. Adaptive focusing control system G-100 is comprised of an adaptive focus processor G-505 which provides focus correction delay values to the focus control C-132 of the central control C-104. Adaptive focus processor G-505 operates on output produced by aberration value estimators G-502 from data gathered from the subarray summers R-126 of the digital receive beamformer system R-100. Accordingly, aberration correction values, preferably aberration delay and amplitude values, are adaptively measured for each receive scan line or for a subset of receive scan lines in range regions corresponding to transmit focal depths by the adaptive focusing control subsystem G-100 shown in FIG. 2c. Adaptive focusing control system G-100 is more fully described in the above identified co-pending patent application entitled: METHOD AND APPARATUS FOR REAL TIME, CONCURRENT ADAPTIVE FOCUSING IN AN ULTRASOUND BEAMFORMER IMAGING SYSTEM.

It is to be understood that in addition to the adaptive focusing control system which adjusts focus delays, that a number of adaptive control systems are contemplated. These systems, by way of example, include (1) adaptive contrast enhancement control system for adjusting focus delays and aperture apodizations, (2) adaptive interference cancellation control for adjusting focus delays and phases, aperture apodizations, and (3) adaptive target enhancement control for adjusting focus delays and phase, aperture apodizations, imaging transmit and receive frequencies and baseband waveform shaping.

Another aspect of adaptive focusing which can be included in the preferred embodiment of the adaptive focusing control system G-100 is a geometric aberration transform device G-508/509 which can provide aberration correction delay values to the adaptive focus processor G-505 for scan lines and scan line depth locations for which measured aberration values were not collected by aberration value estimators G-502. More specifically, measured aberration correction values are written to a delay table in G-508/509. G-508/509 retrieves values from the delay table according to look-up rules of the geometric aberration transform to form focusing delay correction profiles across the aperture valid for depths, scan geometries, and acquisition modes other than the depth, scan geometry, and mode for which aberration correction values were measured. The geometric aberration transform device G-508/509 is the subject of the above identified co-pending U.S. patent application entitled: METHOD AND APPARATUS FOR A GEOMETRIC ABERRATION TRANSFORM IN AN ADAPTIVE FOCUSING ULTRASOUND BEAMFORMER SYSTEM.

8. Baseband Processor System

The baseband processor B-100 provides for filtering, and receive-scan-line-to-receive-scan-line (beam-to-beam) amplitude and phase adjustments as discussed herein and in the above-referenced and incorporated patent applications entitled: METHOD AND APPARATUS FOR A BASEBAND PROCESSOR OF A RECEIVE BEAMFORMER SYSTEM and METHOD AND APPARATUS FOR ADJUSTABLE FREQUENCY SCANNING IN ULTRASOUND IMAGING, and the above-referenced patent application entitled METHOD AND APPARATUS FOR COHERENT IMAGE FORMATION.

The baseband processor R-125 additionally includes a baseband filter, a complex multiplier, and a baseband processor control which controls the operation of the baseband filter and complex multiplier. The baseband processor control is controlled by central control C-104.

9. Coherent Sample Synthesizer System

The coherent sample synthesizer system S-100 (FIG. 2a) is the subject of the above-identified application entitled: METHOD AND APPARATUS FOR COHERENT IMAGE FORMATION.

This system exploits the multi-beam transmit and multi-beam receive capability of the invention to acquire and store coherent (pre-detection) samples of receive beam data along actual scan lines and to perform interpolation of the stored coherent samples to synthesize new coherent samples at new range locations along existing scan lines or along synthetically-created scan lines. Both acquired and synthesized samples are passed to the display processing system R-26.

10. Transmit and Receive Multiplexers

The connectivity between the transducer array elements T-114 and the processors T-103, R-101, A-402 of the digital transmit, digital receive, and Doppler receive beamformer systems is established through a transmit demultiplexer T-106 and a separate receive multiplexer R-108, as shown in FIG. 2a. The multiple-transducer multiplexer configuration shown in FIG. 2a permits selection of transmit and receive apertures lying entirely within a single transducer array or stradling across two transducer arrays. The two multiplexers are independently controlled by the beamformer central control system C-104 and may be programmed to support a number of acquisition modes, including sliding aperture and synthetic aperture modes. The multiplexers and their connectivity are the subject of the above-cited co-pending application entitled: METHOD AND APPARATUS FOR BEAMFORMER SYSTEM WITH VARIABLE APERTURE.

B. Detailed Description of the Doppler Receive Beamformer

Figure 3:
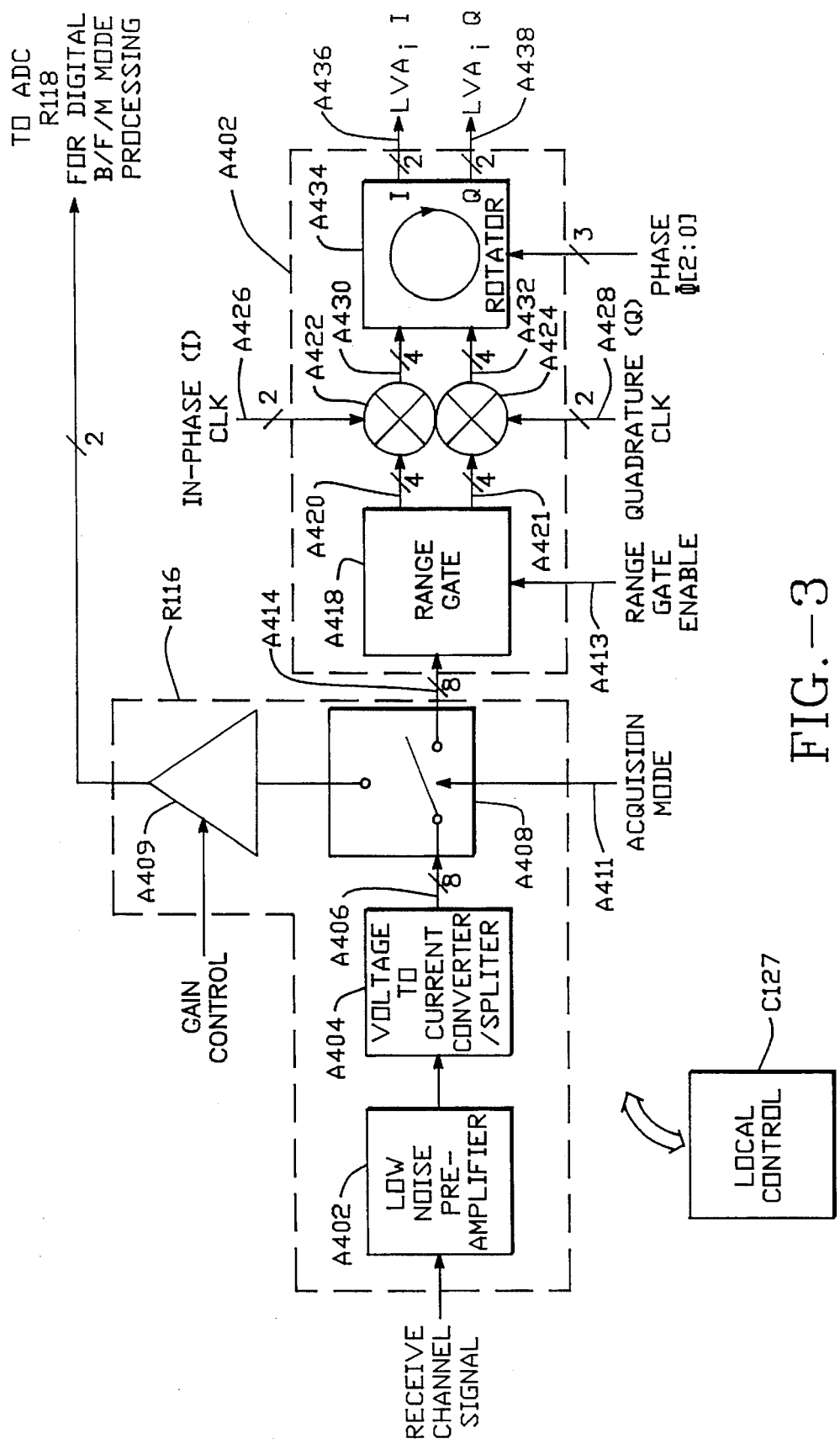
FIG. 3 is a functional block diagram of one of the receive amplifiers and demodulator/range gates shown in FIG. 2b.

Referring to FIG. 2b, the low-noise, variable-gain amplifier R116 for each of the digital receive beamformer channels is associated with a corresponding one of the demodulator/range gate units A402 in the Doppler receive beamformer A400. FIG. 3 is a functional block diagram showing the relationship between these two elements for a given receive channel.

Referring to FIG. 3, amplifier R116 includes a low-noise preamplifier A402 which receives the analog channel signal from the receive multiplexer R108 (FIG. 2a). The low-noise preamplifier A402 is the first stage of amplification in the receive portion of the ultrasound system, and has a gain which is sufficient to prevent significant noise degradation by the noise introduced by subsequent stages.

The output of preamplifier A402 is a single-ended voltage signal, which is provided to a voltage-to-current signal converter/splitter A404. The current output signal of converter/splitter A404 is provided over eight leads A406 (for reasons which will become apparent), and drives them using two identical banks of four voltage-to-current amplifiers each. The four amplifiers weight their outputs in approximate proportion to $\vec{\sqrt{2}}/2$, $(1-\vec{\sqrt{2}}/2)$, $-\vec{\sqrt{2}}/2$ and $-(1-\vec{\sqrt{2}}/2)$, respectively. Although the two banks are identical, one is referred to herein as an I-bank and the other as a Q-bank, for reasons which will become apparent.

The output leads A406 of the converter/splitter A404 are connected to the input port of a switch A408, which steers the currents either to a variable gain amplifier A409 for B/F-mode acquisition, or to demodulation/range gate T222 via leads A414 for D-mode acquisition, in response to an acquisition mode control signal A411. In the preferred embodiment, the functions of the switch and the variable gain are performed by the same circuitry. For D-mode, the gain is set to unity. For B/F-mode, the gain is continuously variable over a range less that unity. This can be accomplished with a bipolar transistor in a differential pair connection. While the present embodiment cannot perform both B/F-mode processing and D-mode processing simultaneously on the same receive signal, it will be understood that another embodiment could perform such simultaneous processing.

Focusing during D-mode acquisition is achieved in each receiver's demodulator/range gate T222 by timing of the range gate enable A413 and by selecting available phase rotations from A434. Both range gate enable A413 and phase rotator A434 are operated by local control C127 of FIG. 3 (identical to Doppler beamformer control C127 of FIG. 2b), which obtains its focus timing from the DMA processor of acquisition control C130 of FIG. 2c. The beamformer central control C104, of which the DMA processor is a component, is the subject of co-pending and cross-referenced patent application entitled METHOD AND APPARATUS FOR FOCUS CONTROL OF TRANSMIT AND RECEIVE BEAMFORMERS. Briefly, focusing control C132 of the central control system C104 develops all transmit and receive focusing parameters for the user selected range interval (PW only) from common sparsely-sampled delay and apodization profiles that are expanded into fully-sampled delay and apodization profiles, which are then passed to each beamformer for final local control processing. The Doppler receive beamformer of the present embodiment supports only uniform apodization, so the apodization profile available from central control system C104 is not required for this beamformer. Only the aperture size and location is required in order to determine the active elements of the Doppler beamformer, which is simply precomputed and stored without requiring the apodization apparatus of the central control system, although other Doppler beamformer embodiments that use apodization could benefit from the central control apodization. The delays to be used by the Doppler beamformer, produced by the delay processor of focusing control C132 apparatus common to all ultrasound system beamformers, are not communicated directly to the local control processors as is done with the transmit beamformer system T102 or imaging receive beamformer system R100. Rather, they are passed to the DMA processor of acquisition control C130 for additional processing to convert each per-channel focusing delay (for active elements in aperture) into a delay to start of range gate, a range time gate duration, and a fine focusing phase rotation component which are communicated and stored in RAM in the local control C127. For CW operation, the range gate enable is held active during the CW acquisition interval and only the phase rotator is applied to the baseband demodulated signal for focusing.

For D-mode acquisition, the signal output over the lines A414 is provided to a range gate A418, which is the first component in the per-channel analog receive circuitry A402 (FIG. 3). The range gate A418 simply constitutes eight transistors, each of which diverts a respective one of the eight lines of signal A414 out of the signal path when a range-gate enable signal A413 is off. The range gate A418 is functionally an on/off switch, controlled by local control unit C127 via the range-gate enable signal A413. For CW operation, the range gate A418 is simply gated "on", or "closed", and in PW operation, it is timed according to the Doppler range-gate position from a logical map of the range gate on and off times in each channel that has been downloaded into a RAM in the local control unit C127. In the local control unit C127, the map is represented in each channel as a vector whose sequentially indexed elements correspond to sequential ranges in the body. On receive, the RAM is read out at a fixed rate to determine when to close the range gate and when to open it. The readout sequence and rate is common for all channels, but the rate can be changed to accommodate a tradeoff between gate resolution and maximum depth. The same range-gate enable signal is provided to the range gates A418 in each adjacent pair of analog receive channels A402. Thus the range gate A418, in conjunction with a post-summation integrator described below, forms the coarse delay function of the analog beamformer A400. There is no analog delay circuit.

When not gated off, the four leads A420 from the I-bank in converter/splitter A404 are mixed in a mixer A422 with an in-phase (I-CLK) signal arriving differentially over leads A426, and the four leads A421 from the Q-bank in converter/splitter A404 are mixed in a mixer A424 with a quadrature (Q-CLK) signal arriving differentially over leads A428. The mixers A422 and A424 each simply constitute a pair of differential input, differential output analog multipliers. The in-phase clock signal which is provided to mixer A422 is provided in common to the in-phase mixers of all of the analog receive channels A402, as is the quadrature clock signal received by mixer A424. These clock signals can be generated by circuitry (not shown) which divides down a crystal oscillator signal, an extremely low jitter technique. The low jitter helps to preserve the wide dynamic range.

The baseband signal outputs of the mixers A422 and A424 are provided as in-phase and quadrature components, each occupying four lines A430 and A432. These outputs are provided to a complex rotator A434, which is a baseband signal processing block that selects and sums the input in-phase and quadrature signals into one of eight possible phases of output in-phase and quadrature signals. The rotator in each channel has its own set of three phase control input bits Φ[2:0] provided by local control unit C127, and functions to phase-align the analog signals in the various analog beamformer channels A402. The in-phase and quadrature outputs of the rotator A434 are provided as differential current mode signals A436 and A438, respectively. While a phase alignment granularity of eight possible positions is used in the present embodiment, it will be understood that finer or coarser granularity can be used in a different embodiment.

Rotator A434 outputs a differential current mode in-phase signal (I+, I−) over leads A436 and a differential current mode quadrature signal (Q+, Q−) over leads 438. Rotator A434 produces its I+ output by current steering its eight input leads and summing a pair of them which it chooses in response to the phase control input bits Φ[2:0]. Rotator A434 produces its I−, Q+ and Q− outputs in a similar manner. Thus an 8-position phase rotation is accomplished by rotator A434 with very little hardware required.

Table I sets forth the specific sums performed by rotator A434 in response to each value of Φ. It can be seen that due to the vector nature of the input signals on leads A430 and A432, the sums effectively represent a phase rotation of the input signals according to Φ.

TABLE I

| Φ[2:0] | I+ Output | Q+ Output | I− Output | Q− Output |
|--------|-----------|-----------|-----------|-----------|
| 000    | +I7−Q3    | +Q7+I3    | −I7+Q3    | −Q7−I3    |
| 001    | +I7+Q3    | +Q7−I3    | −I7−Q3    | −Q7+I3    |
| 010    | +Q7+I3    | −I7+Q3    | −Q7−I3    | +I7−Q3    |
| 011    | +Q7−I3    | −I7−Q3    | −Q7+I3    | +I7+Q3    |
| 100    | −I7+Q3    | −Q7−I3    | +I7−Q3    | +Q7+I3    |
| 101    | −I7−Q3    | −Q7+I3    | +I7+Q3    | +Q7−I3    |
| 110    | −Q7−I3    | +I7+Q3    | +Q7+I3    | −I7+Q3    |
| 111    | −Q7+I3    | +I7+Q3    | +Q7−I3    | −I7−Q3    |

As used in Table I:
+I7 represents the input lead originating from the √2/2 weighted output of the I bank in converter/splitter A404;
+I3 represents the input lead origination from the (1 − √2/2) weighted output of the I bank in converter/splitter A404;
−I7 represents the input lead origination from the −√2/2 weighted output of the I bank in converter/splitter A404;
−I3 represents the input lead origination from the −(1 − √2/2) weighted output of the I bank in converter/splitter A404;
+Q7 represents the input lead originating from the √2/2 weighted output of the Q bank in converter/splitter A404;
+Q3 represents the input lead originating from the (1 − √2/2) weighted output of the Q bank in converter/splitter A404;
−Q7 represents the input lead origination from the −√2/2 weighted output of the Q bank in converter/splitter A404;
−Q3 represents the input lead originating from the −(1 − √2/2) weighted output of the Q bank in converter/splitter A404.

The I and Q outputs A436 and A438 of all the Doppler receive beamformer channels A402 are combined (separately for I and Q) before being provided to common portion A412. FIG. 5 illustrates how the in-phase signals are combined, and it will be understood that the quadrature signals are combined in the same manner. All analog signal path signals in FIG. 5 are differential signals, although the indication of such on the drawing has been omitted for clarity of illustration. The same is true for FIG. 4, discussed below.

Referring to FIG. 5, the in-phase (I) signal outputs of all of the individual Doppler receive beamformer channels A402 are summed in four groups by current summing nodes A602, A604, A606 and A608, to produce four in-phase sums. These sums are amplified by respective amplifiers A610, A612, A614 and A616, the gains of which can be selected in common from four available gain settings via control A609. These amplifiers also introduce a low-pass pole which filters out the RF products of the mixing process without affecting the baseband component. Additionally, as for all RF signals in the system, the physical signal path lengths from the outputs of the mixer A422 to amplifiers A610, A612, A614 and A616 are kept as short as possible; this is not a requirement downstream of the amplifiers.

The outputs of the amplifiers are summed by a summer A618 to generate a combined in-phase signal A620 from all channels. It is sometimes clinically useful to utilize fewer than all of the available number of channels, so switches A622, A624, A626 and A628 are inserted between respective amplifiers A610, A612, A614 and A616, and the summer A618, to disconnect one or more of the four channel groups. The noise contribution due to unused channels is minimized by disconnecting any channel group that is entirely unused.

Figure 4:
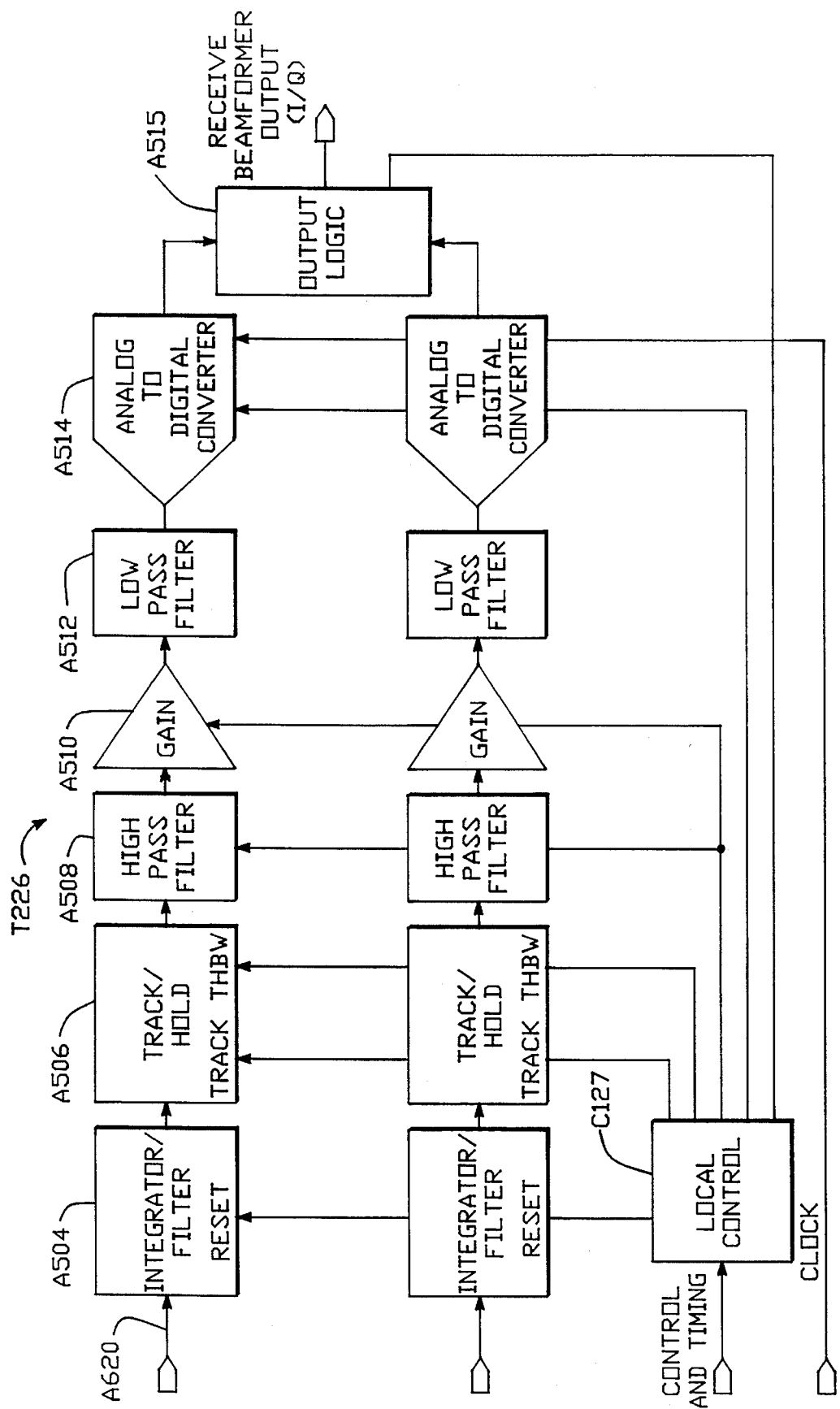
FIG. 4 is a functional block diagram of the common circuitry in the Doppler receive beamformer shown in FIG. 2b.
Figure 5:
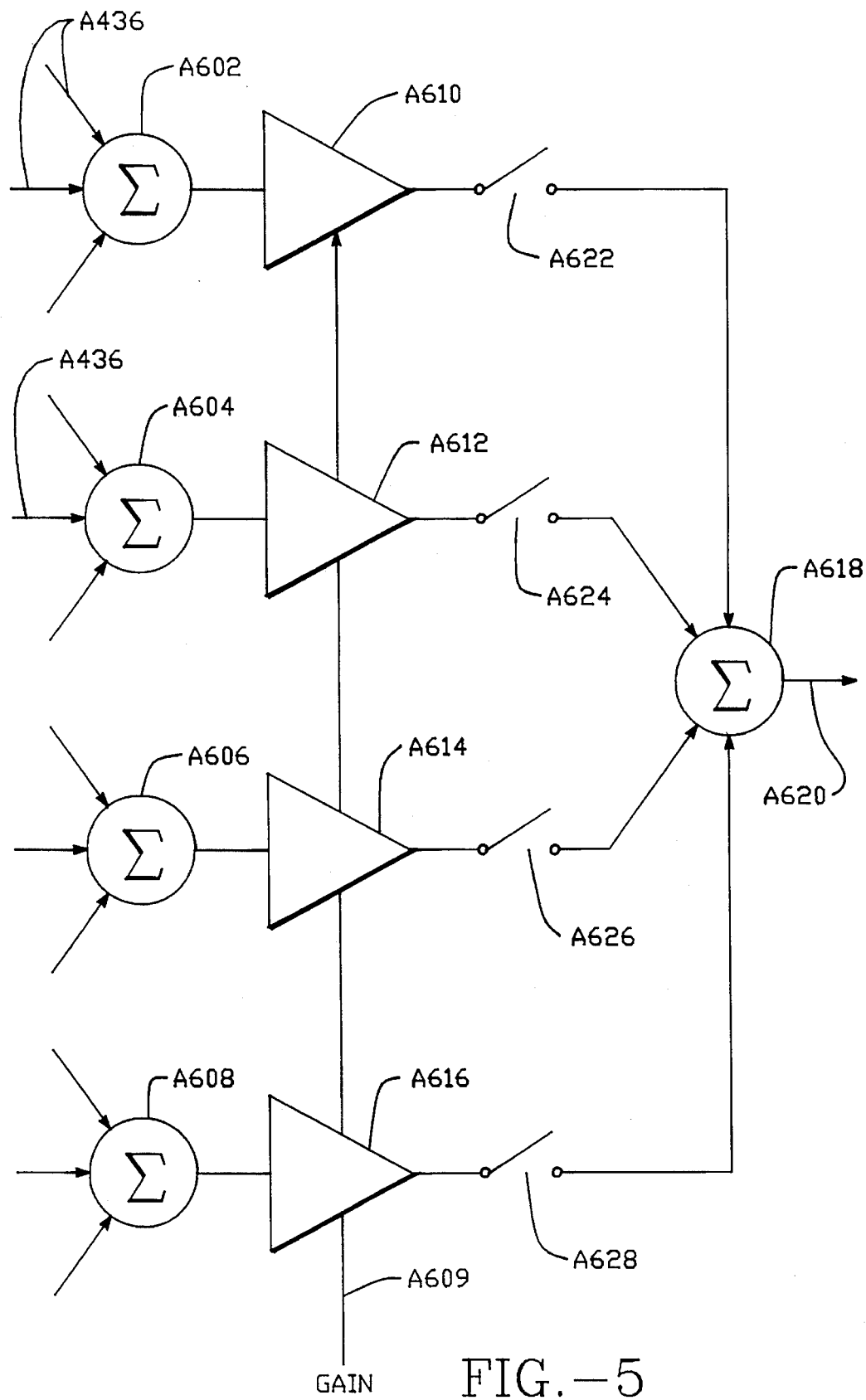
FIG. 5 is a functional block diagram illustrating how outputs of different ones of the demodulator/range gates shown in FIG. 2b are combined for input to the common portion shown in FIG. 2b.

FIG. 4 is a functional block diagram of circuitry in A406 (FIG. 2b) which is common for all of the analog receive channels A402. The in-phase and quadrature paths are shown separately, but since they are identical, only the in-phase path will be described.

The output A620 of the summer A618 (FIG. 5) is connected to an integrator/filter A504. In PW modes, the integrator is reset at the chosen pulse repetition frequency (PRF) and functions as the range gate integrator. In CW modes, this block functions as a low-pass filter.

The output of integrator/filter A504 is provided to a track/hold circuit A506, which is used in PW modes to acquire the baseband signals after range-gate integration and to hold during integrator reset and integration of the next returned pulse. The ultrasound system can also operate in simultaneous display modes, in which data from two acquisition modes are displayed simultaneously. This is accomplished by time interleaving the acquisition modes. When one of the acquisition modes is spectral Doppler, the track/hold circuit A506 tracks during D-mode acquisition and holds as B- or F-mode lines are fired. By holding the last value acquired in the previous D-mode period, during these other line firings, the track/hold circuit A506 prevents large transients from being applied to downstream filters, thereby minimizing filter settling requirements.

The state/timing of circuit 506 is controlled by a signal from control unit C127, shown again for convenience in FIG. 4. The control unit also controls the bandwidth of the track/hold circuit for reasons discussed below.

The output of track/hold circuit A506 is provided to a high-pass filter A508, included to remove low-frequency clutter signals, thereby reducing the dynamic range of the in-phase and quadrature signals to better utilize the dynamic range of the A/D (ADC) convertor described below. The cut off frequency of this filter is selectable by control unit C127.

The output of high-pass filter A508 is provided to a programmable gain stage A510, the gain of which is also controlled by control unit C127. Gain stage A510 is used in conjunction with the high-pass filter A508 to scale the input to the A/D convertor. The output of gain stage A510 is provided to a low-pass filter A512, the output of which is connected to the analog input of an analog to digital converter A514. The low-pass filter A512 prevents aliasing of signals or noise which exceed one-half of the converter's input sampling rate. The filter also serves to smooth the signal steps which occur at the output of track/hold circuit A506.

The ADC A514 is an oversampling ADC which digitizes the signal with 18-bit resolution. This converter operates at a fixed output sample rate in the tens of kilohertz range. The ADC A514 performs an intermediate step of highly oversampling its analog input signal with only one bit per sample. This highly oversampled signal is then digitally filtered and decimated to produce the high-precision output samples at the low sampling rate. The digital filter in the ADC does most of the anti-alias filtering required to sample at that frequency. Oversampling ADCs and their advantages are described in Hauser, "Principles of Oversampling A/D Conversion", J. Audio Eng. Soc., Vol. 39, No. 1/2, pp. 3–26 (January/February 1991), incorporated herein by reference. The low sample rate allows the complex (I/Q) output data to be combined in output logic A515 into a single serial data stream, which is sent to the digital signal processing blocks in the display processing system R26 (FIG. 2a).

Figure 6:
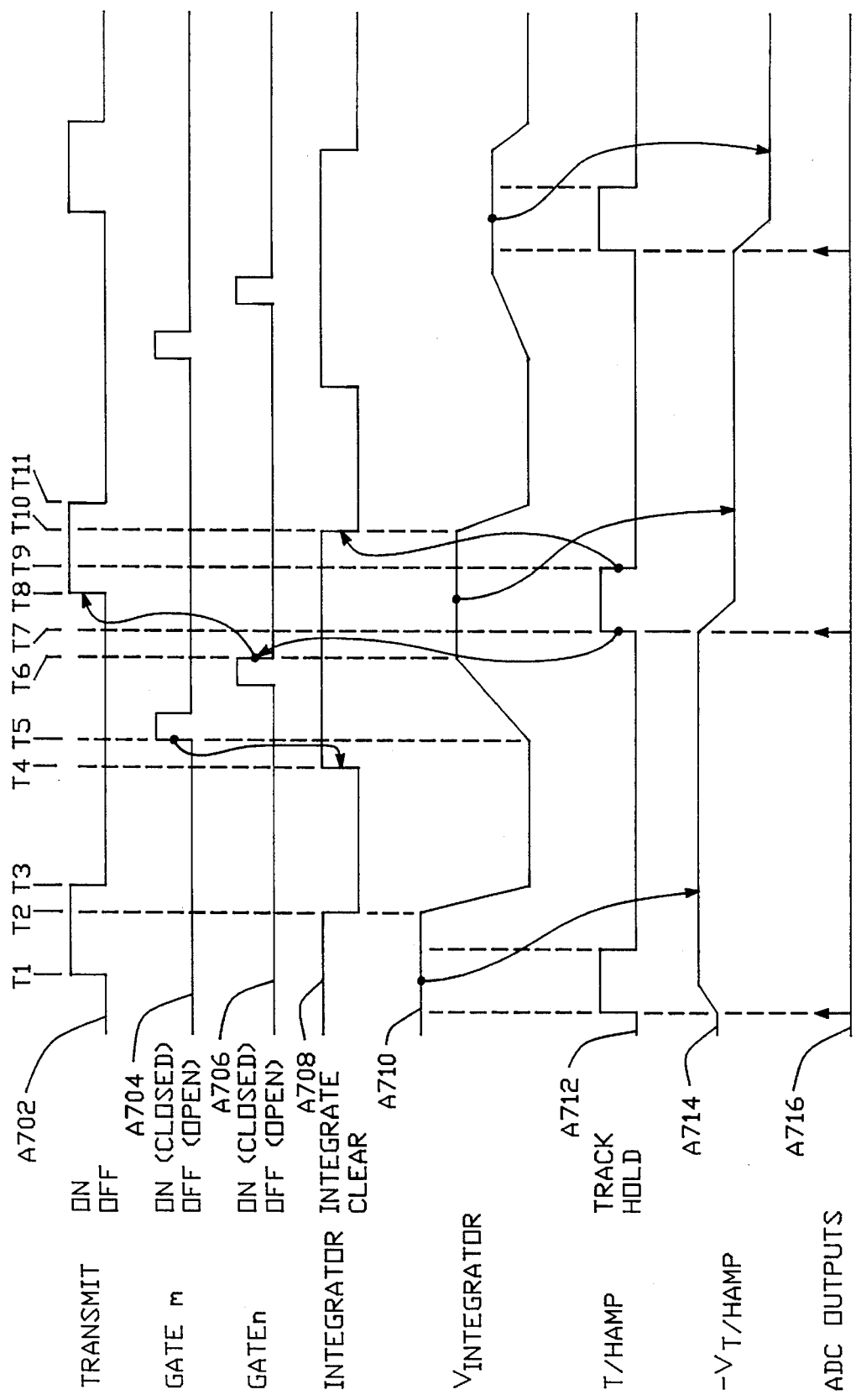
FIG. 6 is a timing diagram illustrating the operation of certain of the components shown in FIGS. 3 and 4 for PW-Doppler acquisition (normal or HPRF).

FIG. 6 is a timing diagram illustrating the operation of certain of the components shown in FIGS. 3 and 4 for PW-Doppler acquisition (normal or HPRF). Line A702 of the timing diagram of FIG. 6 indicates when an ultrasonic pulse is being transmitted from the transducer array T112 (FIG. 2a). As indicated, the pulse begins transmission at a time T1 and ends transmission at a time T3. A subsequent pulse is transmitted beginning at a time T8 and ending at a time T11, and so on.

Lines A704 and A706 indicate when two of the range gates A418 (FIG. 3) are closed. Range gate m, illustrated on line A704, is the range gate which closes earliest according to the beamforming delay profile, and range gate n, illustrated on line A706, is the range gate which opens last. Thus as indicated in FIG. 6, the first range gate to close does so at a time T5, and the last range gate to open does so at a time T6. For normal PW-Doppler acquisition, the echoes which pass through the range gates from T5 to T6 are those produced in response to the transmit pulse transmitted between T1 and T3. For HPRF PW-Doppler acquisition, in which several ultrasonic pulses may be in flight simultaneously, the echoes of interest which are received between T5 and T6 are those which were produced in response to some pulse transmitted prior to T1. Echoes from more recently transmitted pulses will also pass through the range gates between T5 and T6, but these signals are either filtered out by downstream filter A508 or are manageable by the clinician. Specifically, if the unwanted signals constitute echoes from stationary objects, they will merely add a constant offset to the output of Track/Hold A506. A constant offset is a zero frequency component which is attenuated by high pass filter A508. If the unwanted signals constitute echoes from a moving object, then the clinician can move the transducer in order to move the unwanted areas of sensitivity elsewhere.

Line A708 represents a control signal to the integrator/filter A504 (which, for PW operation, operates as an integrator). As shown in FIG. 6, the integrator clears until a time T4, which must be before the time T5 at which the first range gate m closes. The integrator A504 continues to integrate until time T10, which is after the time that the last range gate n opens. It is also after an acquisition by track/hold unit A506 as explained below. Line A710 illustrates a sample voltage output of the integrator A504. It can be seen that beginning from a cleared state prior to T5, the voltage output ramps up between T5 and T6 while the range gates are closed, and then remains steady from T6 until T10 when the integrator is cleared.

The internal noise of the per-channel amplifiers R116 contribute noise to the integrator output only during the time when the range gate for their respective channel is closed. However, noise sources from ensuing stages, up to and including the integrator, contribute noise to the integrator output for the entire time the integrator is in integrate (as opposed to reset) mode. Since this noise is accumulated by the integrator, the control unit minimizes the time from T4 to T5 to minimize the effect of the noise.

Line A712 in FIG. 6 indicates when the track/hold unit A506 is tracking, and when it is holding. As indicated, the track/hold unit A506 holds its prior value between T5 and T6 when the range gates are closed, and as soon as possible thereafter, at a time T7, begins tracking. The time between T6 and T7 is kept as short as possible in order to reduce noise accumulation in the integrator. Track/hold unit A506 continues to track until a time T9, after which, at time T10, the integrator A504 is cleared. (See line A708.) Line A714 in FIG. 6 illustrates the voltage output of track/hold unit A506 in response to the integrator voltage output shown on line A710. It can be seen that after each track interval indicated on line A712, the voltage output of the track/hold unit A506 corresponds to the immediately preceding voltage output of integrator A504.

The sampling action of the Track/Hold circuit A506 causes noise aliasing into the passband at the output. The degree to which this happens is controlled by the Track/hold circuit's bandwidth. Narrower bandwidths allow less noise aliasing, but require a longer acquisition time, T7–T9. The bandwidth of the Track/Hold circuit is therefore selected by making a trade-off of aliased sample noise, versus the additional integrator noise accumulation during the Track/Hold acquisition time. The control unit C127 selects one of four available Track/Hold bandwidths and a corresponding acquisition time T7–T9 based on the current system settings.

Line A716 indicates with arrows the times when ADC A514 completes each conversion. The ADC A514 operates at a fixed rate of 50,000 output samples per second, and all other times in the waveform diagram of FIG. 6 are calculated based thereon. Specifically, as indicated in line A712, track/hold unit A506 is operated to begin tracking the next sample as soon as an ADC output sample is complete. Immediately after T9, at the end of the track time, at time T10, the integrator A504 is cleared (line A708). The time period between T6 (when the last range gate opens) and time T7 (when the track/hold unit A506 begins tracking) is arbitrary, but as previously mentioned, it is desirable to keep this time period as short as possible in order to minimize noise. The time period between T5 (when the first range gates closes) and T6 (when the last range gate opens) is fixed by the range interval and position selected by the clinician, as is the time period between T1 (start of transmit) and T5 (the time that the first range gate closes). Accordingly, in order to keep the time between T6 and T7 as short as possible, the system begins transmitting each pulse just early enough so that the last range gate can open before the ADC A514 completes an output sample.

It is often the case that, due to the depth of the target chosen by the clinician, the time between T1 (start of transmit) and T6 (the time when the last range gate opens) is longer than the 20 microseconds between ADC output samples. When this occurs, the system continues to calculate the start of transmit times synchronously with the ADC output sample times, although only one transmit pulse will be issued for every two, three or more ADC output samples. In this case, the ADC will generate more than one output sample per firing line. These multiple output samples represent different estimates of the single held output value of track/hold unit A506, and they are merely averaged in subsequent processing in order to produce a single output value per firing.

It can be seen that all of the functional blocks described above in the Doppler beamformer A400 can be easily optimized to provide an enormous dynamic range for spectral Doppler acquisition. None of the blocks are inherently difficult to optimize in this way. The beamformer A400 also has sufficient directivity for spectral Doppler acquisition and has been added to the B/F-mode receiver without requiring more than a minimal amount of additional circuitry. This achievement is made possible by a number of innovations, including, but not limited to, the following. First, the use of simple, per-channel range gates A418 (FIG. 3) avoids the need for expensive, high-precision, per-channel analog or digital delay lines. Second, the beam formation of the receive signal while it remains in the analog domain avoids the need for expensive, large-dynamic range ADCs at the front of each of the receive channels. Only a single I/Q pair of ADCs A514 are actually required. Third, by filtering the clutter in high-pass filter A508, the dynamic range requirements of the single I/Q ADC pair A514 can be minimized as well. Fourth, by analog processing of the receive signal for only the desired range interval, prior to conversion to digital, the conversion speed requirements of the ADCs A514 are vastly reduced. (That is, whereas ADCs placed prior to range-gating and prior to integration would need to operate in the MHz range, the ADCs A514 in the present embodiment need only operate in the KHz range.) Fifth, most of the expensive processing in the signal path takes place in the common portion of the path. The per-channel portion, which is replicated many times in the system, can be implemented economically.

Thus an ultrasonic system has been described in which two receive beamformers are coupled to the same ultrasonic transducer array. One of the receive beamformers (the D-mode receive beamformer) has a significantly wider dynamic range than the other (the imaging receive beamformer), but produces information about only a single target per receive beam. Additionally, the imaging receive beamformer dynamically tracks the focal range of a receive beam (see the Appendix), whereas the D-mode receive beamformer need only focus in one range interval. The D-mode receive beamformer is designed for optimal spectral Doppler acquisition, whereas the imaging receive beamformer is designed for optimal imaging acquisition.

In the described embodiment, certain functional units are illustrated as being upstream or downstream from other functional units in a signal processing path. In FIG. 3, for example, the rotator A434 is shown as being downstream from the range gate A418, and both (see FIG. 4) are upstream of the integrator/filter A504. Although the terms "upstream" and "downstream" make reference to the way in which different components which perform the specified functions are to be interconnected, the terms also imply a temporal relationship between the steps performed by the processing elements. For example, after a given instantaneous portion of the receive channel signal passes through the range gate A418, a finite amount of time elapses before that same instantaneous portion of the receive signal reaches rotator A434. For analog functional blocks, this time delay is small, yet finite. Also, note that downstream units may be processing earlier instantaneous portions of the input signal at the same time that upstream units are processing later instantaneous portions of the input signal. Even though such operations overlap in time, the upstream units still process a given instantaneous portion of the receive signal before the downstream units process the same instantaneous portion.

As will be apparent, many of the processing elements in the Doppler receive beamformer A400 can be interchanged in sequence, and other processing elements which do not preclude the invention can be inserted at various points in the signal path. In order to accommodate such variations, certain signals may be referred to herein as being "responsive" to other, upstream signals in the signal path. If there is an intervening processing element, the signal output of that processing element is still "responsive" to the signal input. If the intervening processing element combines more than one signal, such as summer A502, the signal output of the processing element is "responsive" to each of the signal inputs. And if only a transmission line separates an upstream signal from a downstream signal, the downstream signal is still considered to be "responsive" to the upstream signal, as the term is used herein.

Finally, as used herein, an "analog" signal is a signal whose value at any given moment in time can take on any value within a continuous range of values. Analog signals can also be continuous in time, or sampled in time. A "digital" signal, as the term is used herein, can take on only discrete values.

The foregoing description of preferred embodiments of the present invention has been provided for the purposes of illustration and description. It is not intended to be exhaustive or to limit the invention to the precise forms disclosed.

For example, there are many variations possible on the per-channel processing in the Doppler receive beamformer. For example, instead of the mixers being driven by fixed I and Q clocks followed by a phase rotator, the per-channel phase rotators could act on the incoming fixed I and Q clocks and their outputs drive the mixers. As another example, the range-gated signal could be (but does not need to be) common across some number of adjacent array channels. For CW-only applications, the range gates can be omitted entirely. The preferred embodiment supports an effective one bit of apodization control by permitting each channel to be enabled or disabled entirely. In another embodiment, apodization could be extended to a larger number of bits through the use of multiplying DAC structures having the channel signal applied to the analog input and having the digital apodization value applied to the digital input. As yet another example, the order of processing elements (e.g. mixing, phasing, gating) could be changed.

As yet another variation, instead of direct demodulation to baseband, another embodiment could employ an IF scheme in which a single mixer clock per channel (with the clock phase independently controlled per channel) is used to translate and phase the received signal to an IF frequency. Range-gating can be applied before or after the mixer. The per-channel IF signals can then be summed, and the I and Q demodulation performed on the summed output, followed by baseband processing. Alternatively, some processing could be performed on the IF signal prior to baseband demodulation. An embodiment is possible also which performs phasing pre-beamforming, and demodulation post-beamforming.

Another variation on the PW Doppler architecture would be to demodulate the signal in each channel to baseband, independently phase it, sum it across some number of adjacent channels (8, for example) to form sub-array signals, accumulate the summed signals in a set of I and Q integrators (one complex set per sub-array), and then sum the integrator outputs. Also, embodiments are possible which acquire information about more than one selected target per firing, either along a single beam or along multiple beams.

Obviously, many other modifications and variations will be apparent to practitioners skilled in this art. The embodiments were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

APPENDIX A

DIGITAL RECEIVE BEAMFORMER SYSTEM
PREFERRED EMBODIMENT

1. Analog Front End a. Low Noise, Variable Time-Gain Amplifier

As is known in the art, a time-varying gain is applied to the receive signal to compensate for attenuation with depth. In this embodiment, the gain is applied by an analog low noise, time-gain amplifier R-116 (FIG. 2b). There is one low noise, time-gain amplifier R-116 for each digital multi-channel receiver R-101. A common gain function is applied to all amplifiers R-116, although independent gains could be applied to each amplifier R-116. The gain varies with the range (or time, as range and time are related to each other in accordance with the speed of sound in the medium being imaged) from the object being imaged to the transducer elements.

b. Analog-To-Digital Converter (ADC)

The analog-to-digital converter (ADC) R-118 (FIG. 2b) in the preferred embodiment oversamples the signal by at least four times (preferably four, eight, sixteen or thirty-two times) the receive signal nominal center frequency $F_o$. It is to be understood that the oversample rate can be lower or greater than four times in a different embodiment. Thus, if the system is imaging at 10 MHz, the ADC R-116 is sampling at a rate of 40 MHz. Preferably the ADC R-116 is an eight or more bit ADC. However, it is to be understood that as is evident from the patents listed before, many types of ADCs can be used with the beamformer in different embodiments.

2. Multi-Channel Digital Signal Processing (Digital Multi-Channel Receive Processor R-120)

a. Processing Modes

Figure 7:
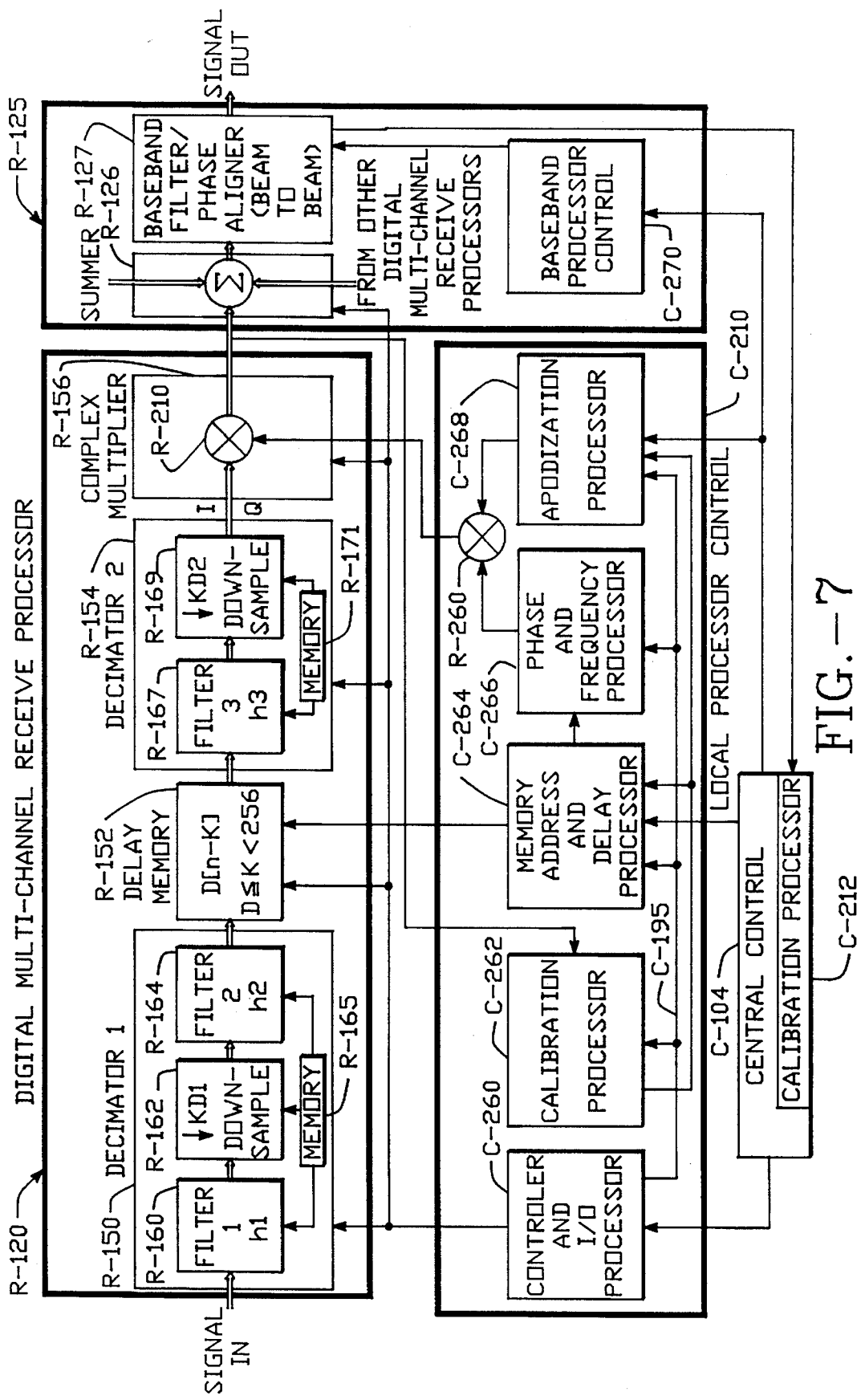
FIG. 7 depicts a detailed block diagram of an embodiment of a digital multi-channel receive processor and baseband multi-beam processor of the invention of FIG. 2b.

Before describing the functional blocks in FIG. 7, it will be useful to understand the various processing modes in which each receive processor can operate. Ideally, it would be desirable for each receive processor to be able to process any number of superposed and separately delayed and apodized receive beams up to some maximum, at any receive signal nominal center frequency $F_0$ up to some maximum, specified by a receive signal spatial range resolution $\gamma_B$ (inversely related to receive signal bandwidth) up to some maximum. This would require extensive processing power, however, especially if the maximums are large. Since processing power is limited in any system, it would seem that these maximums must be kept low enough such that the hardware is able to keep up when all three parameters are specified at maximum. The present embodiment, on the other hand, makes better use of the available processing power by permitting trade-offs among these three parameters and allowing the central control system to choose among processing modes depending on the clinical setting. It is to be understood that once the user selects a transducer, a mode and scan format pursuant to the clinical setting, that preferably the method and apparatus automatically selects from the preselected and pre-stored processing modes.

Table A1 sets forth some of the processing modes which can be selected by central control system C-104 to be applied to all digital multi-channel receive processors R-120 of receive beamformer R-100. Different embodiments can support fewer or greater numbers of modes and fewer or greater numbers of beams. As used in the Table:

$F_s$: is the system clock frequency. The central control C-104 can set $F_s$ at any of a variety of frequencies.

$F_{ADC}$: is the ADC sampling frequency or the rate at which samples are converted by the ADC R-118 (FIG. 2b), where typically $F_{ADC}=F_s$ or $F_s/2$.

$F_0$: is a receive signal nominal center frequency. $F_0$ is equal to, or near, the actual signal carrier frequency $F_c$ and is therefore considered to be the nominal receive signal frequency. $F_o$ is specified for each digital multi-channel receiver R-101 as a fraction of $F_s$. $F_0$ is programmable by the central control C-104 for each digital multi-channel receiver R-101 based on pre-stored values.

c: is the speed of sound in the body.

$\lambda_0$: is the acoustic wavelength of $F_0$; $\lambda_0=c/F_0$.

$F_c$: is the receive signal carrier frequency (an imaging frequency). The digital multi-channel receiver R-101 can be tuned by verniering $F_0$ to $F_c$. $F_c$ and $F_o$ are related in the present embodiment by a frequency scaling factor or frequency vernier factor v, such that $v \cdot F_o=F_c$ as pre-stored in the central control. The range of the carrier frequencies $F_c$ for which an embodiment can be tuned ranges theoretically between $0 \times F_o$ to $2 \times F_o$, but typically is 75% of $F_o$ to 125% of $F_o$.

$R_o$: is the per-beam complex (I/Q-pair) output sampling rate or per beam processing rate. The ratio $R_0/F_0$ represents the number of complex samples per period of the receive signal nominal center frequency $F_0$.

$\gamma_B$: is the per-beam spatial range resolution. Note that $\gamma_B=c/2R_o=\lambda_0/(2R_o/F_0)$.

Spatial Range Resolution (or bandwidth modes (BW Mode)) selected at Decimator Two: There are 6 spatial range resolutions (or bandwidth modes) in the preferred embodiment, accounting for spatial range resolution between values $F_0/2$ to $4F_0$. Values outside these values are possible in a different embodiment.

Spatial range resolution (Bandwidth Modes):
BW MODE 1: $R_0=4F_0$ or $\gamma_B=\lambda_0/8$.
BW MODE 2: $R_0=2F_0$ or $\gamma_B=\lambda_0/4$.
BW MODE 3: $R_0=F_0$ or $\gamma_B=\lambda_0/2$.
BW MODE 4: $R_0=F_0/2$ or $\gamma_B=\lambda_0$.
BW MODE 5: $R_0=2F_0/3$ or $3\gamma_B=\lambda_0/4$.
BW MODE 6: $R_0=F_0/3$ or $3\gamma_B=\lambda_0/2$.

$N_B$: maximum number of simultaneously produced beams for the given processing mode. (Note that the beamformer can be operated to produce fewer than $N_B$ beams if desired; for example, in a mode for which $N_B=4$, the beamformer can be operated to produce only three beams if desired, although this would not make full use of the available hardware processing power.)

N/I=Mode not implemented in preferred embodiment.

TABLE A1

| | RECEIVE PROCESSING MODES (Output of Decimator Two) | | |
|---|---|---|---|
| $F_0$(MHz) | $N_B = 1$ | $N_B = 2$ | $N_B = 4$ |
| $F_s/32$ | N/I | BW Mode 1 $R_o = 4F_0$ $\gamma_B = \lambda_0/8$ | BW Mode 2 $R_o = 2F_0$ $\gamma_B = \lambda_0/4$ |
| $F_s/16$ | BW Mode 1 | BW Mode 2 | BW Mode 3 |

TABLE A1-continued

RECEIVE PROCESSING MODES
(Output of Decimator Two)

| $F_0$(MHz) | $N_B = 1$ | $N_B = 2$ | $N_B = 4$ |
|---|---|---|---|
| $F_s/8$ | $R_o = 4F_0$<br>$\gamma_B = \lambda_0/8$<br>BW Mode 2 | $R_o = 2F_0$<br>$\gamma_B = \lambda_0/4$<br>BW Mode 3 | $R_o = F_0$<br>$\gamma_B = \lambda_0/2$<br>BW Mode 4 |
| $F_s/4$ | $R_o = 2F_0$<br>$\gamma_B = \lambda_0/4$<br>BW Mode 3 | $R_o = F_0$<br>$\gamma_B = \lambda_0/2$<br>BW Mode 4 | $R_o = F_0/2$<br>$\gamma_B = \lambda_0$<br>N/I |
| $3F_s/8$ | $R_o = F_0$<br>$\gamma_B = \lambda_0/2$<br>BW Mode 5<br>$R_o = 2F_0/3$<br>$\gamma_B = 3\lambda_0/4$ | $R_o = F_0/2$<br>$\gamma_B = \lambda_0$<br>BW Mode 6<br>$R_o = F_0/3$<br>$\gamma_B = 3\lambda_0/2$ | N/I |

As can be seen by reading horizontally across Table A1, for each receive signal nominal center frequency $F_0$, the hardware permits a larger number $N_B$ of superposed beam waveforms to be traded-off against some degradation of the per-beam spatial range resolution $\gamma_B$, and vice-versa. A larger $N_B$ translates into a higher frame rate (since the entire field of view can be scanned with only half or one quarter the number of firings), while an enhanced spatial range resolution $\gamma_B$ (smaller value of $\gamma_B$) translates into a sharper image in range. For example, therefore, in a display mode which displays a color flow Doppler image superimposed on a grey-scale image, produced by interleaving B-mode and F-mode pulse firings, the central control C-104 could reprogram the receive beamformer R-100 to operate at $N_B=1$ for all B-mode imaging pulses and at $N_B=2$ or even $N_B=4$ for color flow Doppler imaging pulses, assuming both modes share the same $F_0$.

Similarly, reading vertically down Table A1, and excluding modes 5 and 6 for this example, it can be seen that for a given maximum number of beams $N_B$, processing modes having a higher carrier frequency (approximately $F_0$), have a larger relative per-beam spatial range resolution $\gamma_B$. A clinician typically selects a transducer operable at the carrier frequency appropriate for a desired depth penetration. In doing so, the clinician trades off penetration for overall image resolution (ability to distinguish two targets). (The latter trade-off is inherent in the physics of ultrasound since greater penetration is achieved by reducing the imaging frequency, which in turn reduces the overall image resolution.) For a given maximum number of beams $N_B$, the desired tissue penetration determines $F_0$ (Table A1), which in turn determines a processing mode having the optimum per-beam spatial range resolution which the hardware can provide at the selected $F_0$. That is, as $F_0$ decreases relative to $F_s$ to achieve greater penetration, the signal processing path in each receive channel R-101 need not process as many samples per second. This leaves hardware processing capacity available, which the system takes advantage of by increasing $R_0/F_0$ and hence improving the normalized per-beam relative spatial range resolution $\gamma_B/\lambda_0$.

Further, by reading diagonally across Table A1 (upward to the right), and again excluding modes 5 and 6 for this example, it can be seen that the hardware permits a lower $F_0$ to be traded off for a larger number of beams $N_B$ at a constant receive spatial resolution $\gamma_B$.

In summary the modes with which the receive channel R-101 can be specified to operate offer trade-offs among three parameters: $N_B$, $F_0$, and $\gamma_B$. Thus each processing mode defines a parameter set $\{N_B, F_0, \gamma_B\}$. In general, all of the processing modes shown in Table A1 satisfy the rule that for a given $F_s$, the product of the maximum number of beams $N_B$ and the channel processing rate $F_0$, divided by the normalized per-beam spatial range resolution $\gamma_B/\lambda_0$, is constant. Further, the preferred embodiment also supports additional processing modes not shown in Table A1, and which do not fully utilize the total processing capability of the system.

b. Decimator One

As can be seen in FIG. 7, the beamformer processor R-120 is comprised of decimator one R-150, time delay memory R-152, decimator two R-154 and complex multiplier R-156. Decimator one R-150 is programmable (as previously defined) and is also referred to as a variable rate decimator filter or a multi-rate decimator filter with a variety of programmable decimation factors and associated programmable filter coefficients. Decimator one R-150, in a preferred embodiment, is functionally comprised of a first filter (filter one) R-160 which has first programmable filter coefficients h1, a decimator R-162 which down-samples at a decimation factor of $K_{D1}$ (Table A2), and a second filter (filter two) R-164 which has second programmable filter coefficients of h2. In a preferred embodiment filter one (h1) is a FIR (finite impulse response), anti-aliasing low/high-pass filter. Filter one (h1) filters out the ADC quantization noise and odd harmonics of the receive signal nominal center frequency $F_0$. Preferably, filter two (h2) is a FIR, anti-alias, band-pass filter which filters out the even harmonics of the receive signal nominal center frequency $F_0$. The filter profiles and decimation rate values are programmable depending upon the receive signal nominal center frequency $F_0$ and the ADC sampling rate ($F_{ADC}$). Such filters can perform the additional programmable task of signal shaping. In implementation, the functional features of the filter one (h1) R-160 and the decimator R-162 are accomplished simultaneously. It is to be understood, however, that the filtering and decimating operations can occur separately and in a less computationally efficient order in other embodiments.

Further it is to be understood that an embodiment can be implemented with filters with a variety of lengths and using fixed or floating point operations. A digital signal processing decimator performs both filtering and downsampling, as described in Sections 2.3.2 and 2.4 of the test by Crochiere and Rabiner, *Multirate Digital Signal Processing*, Prentice Hall 1983. Decimator filter design is disclosed in Crochiere and Rabiner and in *Digital Signal Processing Applications Using the ADSP-2100 Family*, volume 1, edited by Amy Mar of Analog Devices, DSP division, Prentice Hall 1992, which are hereby incorporated by reference.

In accordance with the same definition of programmable, the programming of filters and filter coefficients and decimation rates is accomplished by the central control C-104 which coordinates the operation of the digital multi-channel transmitter T-103 and the digital multi-channel receivers R-101. Such filter coefficients and filter values and decimation factor values can be downloaded to memory R-165 of decimator one R-150 from the central or primary control C-104. Accordingly, primary control C-104 can program memory R-165 and can select from the values programmed into memory R-165 in order to operate decimator one R-150. Alternatively such values can be permanently pre-stored in a memory such as memory R-165, with the primary control C-104 selecting among the pre-stored values depending upon the processing mode in accordance with the above definition of programmable. Further, decimation factors other than those specified in Table A2 can be selected in a different embodiment.

According to the Nyquist sampling rule, a real signal must be sampled by at least a factor of two over the highest frequency of the signal in order to be able to reconstruct the signal successfully. For the signals which are received by the digital multi-channel receive processor R-120, there is a significant frequency content above the signal nominal center frequency $F_0$, and at an oversample rate of four times $F_o$ (See Table A2), these frequencies are adequately sampled. In a preferred embodiment if the data from the ADC R-118 is already at four times $F_o$, no decimation is performed. Thus, one of the normal decimation modes of decimator one R-150 is that decimator one R-150 does not decimate at all. With a beam having a signal center frequency $F_c=F_o$ of 10 MHz, and with a sampling frequency $F_s$ of 40 MHz, then the output of decimator one R-150 without decimation would be 40 MHz, or four times oversampled. Data from the ADC R-118, which is sampled at greater than four times the receive signal nominal center frequency $F_0$, is downsampled to four times the receive signal nominal center frequency $4F_0$, as is evident from Table A2. The decimation factors $K_{D1}$ are selected to accomplish this rate of decimation as a function of the ADC sampling rate $F_{ADC}$.

Accordingly, in this embodiment, the relationship between the decimation factor $K_{D1}$ for decimator one and the channel processing rate or center frequency $F_0$ and the ADC sampling rate $$F_{ADC} \text{ is } K_{D1}=F_{ADC}/4F_0$$

where $F_{ADC}=F_s$ or $F_s/2$.

It is to be understood that oversampling by less than or greater than a factor of 4 (and thus with different integer and/or rational decimation factors $K_{D1}$) can be accomplished in a different embodiment.

Further, for the filter one (h1) R-160 and the filter two (h2) R-162 the filter coefficients can be selected in order to cause these filters to operate in a bypass mode (i.e., without filtering) for each of the specified decimation factors. Such bypass operation may be utilized for diagnostic purposes. Additionally for maximum wide-band processing, filter one can perform no filtering.

TABLE A2

DECIMATION FACTORS FOR DECIMATOR ONE

| $F_0$ | $K_{D1}$ Decimation Factor | Decimator One Output Rate |
| --- | --- | --- |
| $F_s/32$ | 8 | $4F_0$ |
| $F_s/16$ | 4 | $4F_0$ |
| $F_s/8$ | 2 | $4F_0$ |
| $F_s/4$ | 1 | $4F_0$ |
| $3F_s/8$ | 2 | $4F_0/3$ | c. Time Delay Memory

Figure 9A:
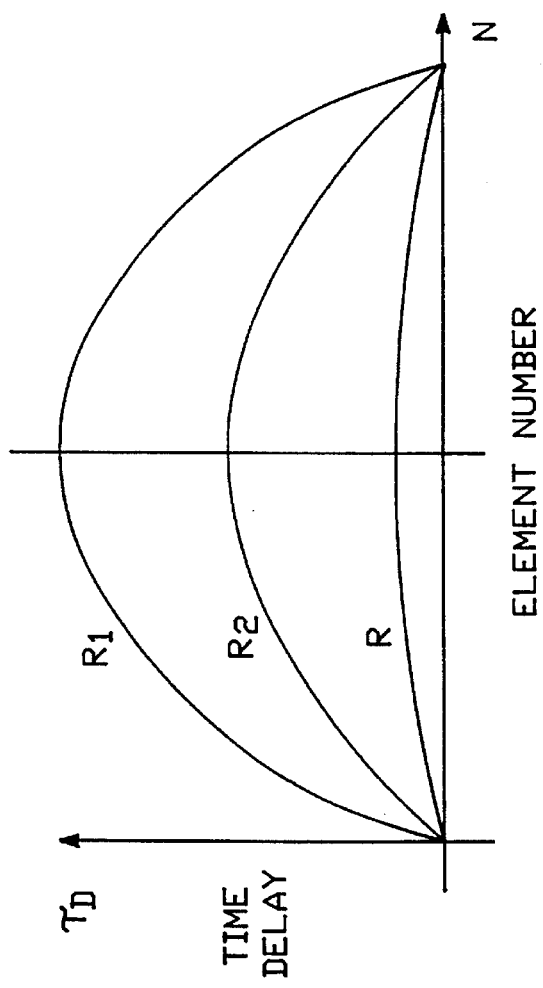
FIGS. 9a and 9b depict graphs of typical time delay profiles which can be applied to the variable time delay memory of FIG. 8.

As can be seen in FIG. 9*a*, the time delay profile across the aperture of a transducer is a function of both the transducer element position and the range of the object to be imaged from the transducer array. Generally, for the case where the scan line is steered straight ahead, more delay is applied in the center of the aperture (FIG. 9*a*) than is applied to the signals at the edges of the transducer array. This is due to the fact that it takes longer for the receive (return echo) ultrasound signals from the object to be imaged to reach the outer transducer elements than to reach the more central transducer elements or elements closer to the object to be imaged.

Also as shown in FIG. 9*a* for the case where the scan line is steered normal to the transducer array face, the reason that the time delay profiles are flatter as a function of range (or time to the object to be imaged) is that as the range increases to infinity, the distances from any particular transducer element to the object to be imaged converge to equal values reducing the need for time delays in order to properly sum the receive signals.

In a preferred embodiment, different time delay profiles are assigned to reference range boundaries of range zones (FIGS. 9*a* and 9*c* and as explained below). The spacing between the reference range boundaries may be equal and/or unequal as desired. Further, it is to be understood that these time delays represent a coarse time delay applied to the signal as explained below, with a fine focusing time delay implemented as a phase shift applied by the complex multiplier R-156 (FIG. 7).

Figure 9B:
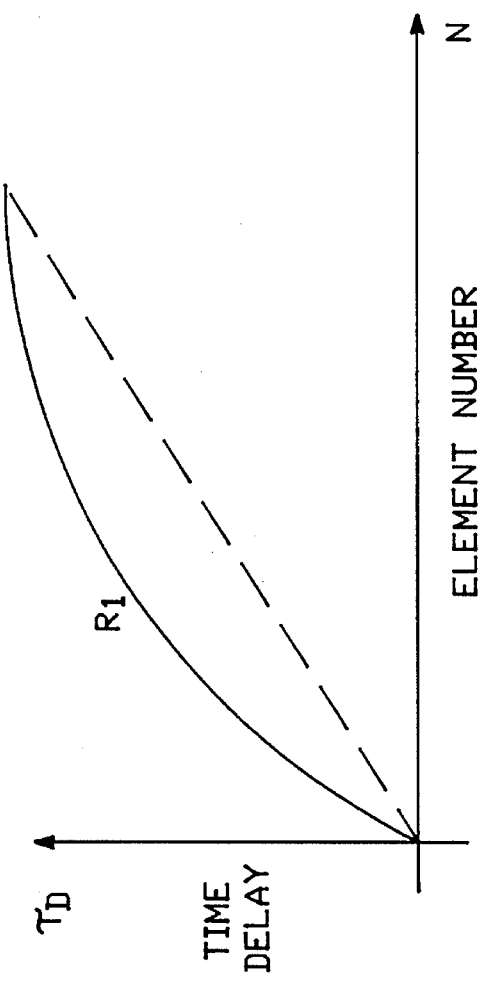

Tracking receive beams that are steered relative to the transducer aperture is a matter of changing the time delay profile with respect to the number of the transducer element and the range, as can be seen in FIG. 9*b*. Thus, by changing the time delay profile which is applied to select time-indexed receive data from memory, the desired beams can be steered and focused.

Figure 8:
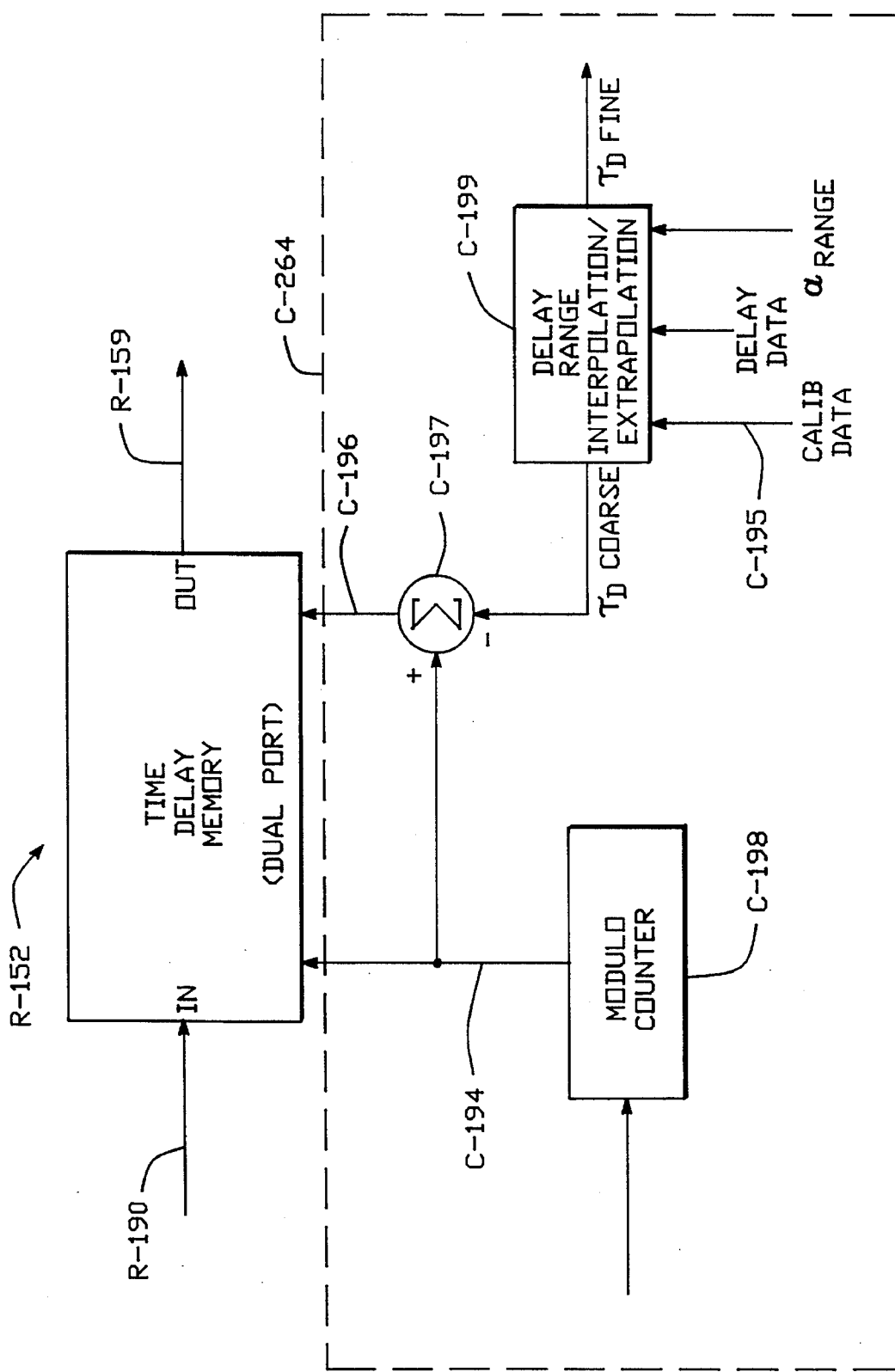
FIG. 8 depicts a schematical representation of the variable time delay memory of the digital multi-channel receive processor of FIG. 7 of the invention, along with an embodiment of the memory address and delay processor.

FIG. 8 depicts a schematic of the programmable, variable time-delay, two-port memory R-152 of the preferred embodiment. Data is read out of the memory R-152 based on continuously updated addresses derived from variable time delay profiles (such as for example described above), supplied by the central control system C-104 and the local control processor system C-210, in order to provide dynamic focusing.

Shown in FIG. 8 are data-in line R-190 and data-out line R-192 as well as in-address line R-194 and out-address line R-196. The in-address line R-194 is updated at a constant rate with a modulo counter C-198. The out-address R-196 is variable and is comprised of a combination of the in-address less a coarse time delay component of the time delay which is supplied by the central control system C-104 and the local control system C-210. In a preferred embodiment the coarse time delay represents the most significant bits (MSB) and the fine time delay represents the least significant bits (LSB) of a time delay word from the local control system C-210. In the preferred embodiment for bandwidth modes 1 to 4 and with $T_0=1/F_o$, the coarse time delay represents integer units of quarter cycles ($T_0/4$) of the receive signal nominal center frequency $F_0$ and the fine time delay (phase shift) represents a fractional value of a quarter cycle. For Bandwidth Modes 5 and 6 the coarse time delay represents integer units of three quarter cycles ($3T_0/4$) and the fine phase shift represents fractional values of three quarter cycles.

The memory R-152 is organized as a circular buffer which writes over the oldest stored data. The memory does not hold data for the entire scan or receive line, but just enough data to satisfy the span between the minimum and the maximum time delay that could be applied in order to select stored signal data. Thus, the necessity of having a much larger memory to store all the data from a scan line is avoided. In a preferred embodiment, the memory for each channel captures the most recent 256 data samples along a scan line at a rate of $4F_o$. The 256 data samples correspond, in a preferred embodiment, to a total delay range of $256\times T_0/4=64T_0$ for Bandwidth Modes 1 to 4 and a total delay range of $256\times 3T_0/4=192T_0$ for Bandwidth Modes 5 and 6.

In FIGS. 10*a*, 10*b* and 10*c*, strings of data stored at times $t_{k-1}$, $t_k$, and $t_{k+1}$ are depicted for data on three receive channels for adjacent transducer elements (N−1, N, N+1). The FIGS. 10a, 10b and 10c thus represent a snapshot of the stored signals from three transducer elements frozen in time for the three specified times. Applying the appropriate time delay value along the time axis of the figures selects the desired data from the string of stored data. Dynamic focusing results from real time selection of time delay values in order to determine the data to be read out of the memory R-152. FIGS. 10a, 10b and 10c depict read out of samples of S3, S4 and S5 from the data sequences stored at time $t_k$ from the three channels at the selected time delays. Thus, the ability exists to dynamically select from the stored data samples according to the different time delay values in order to provide for dynamic focusing.

Figure 11:
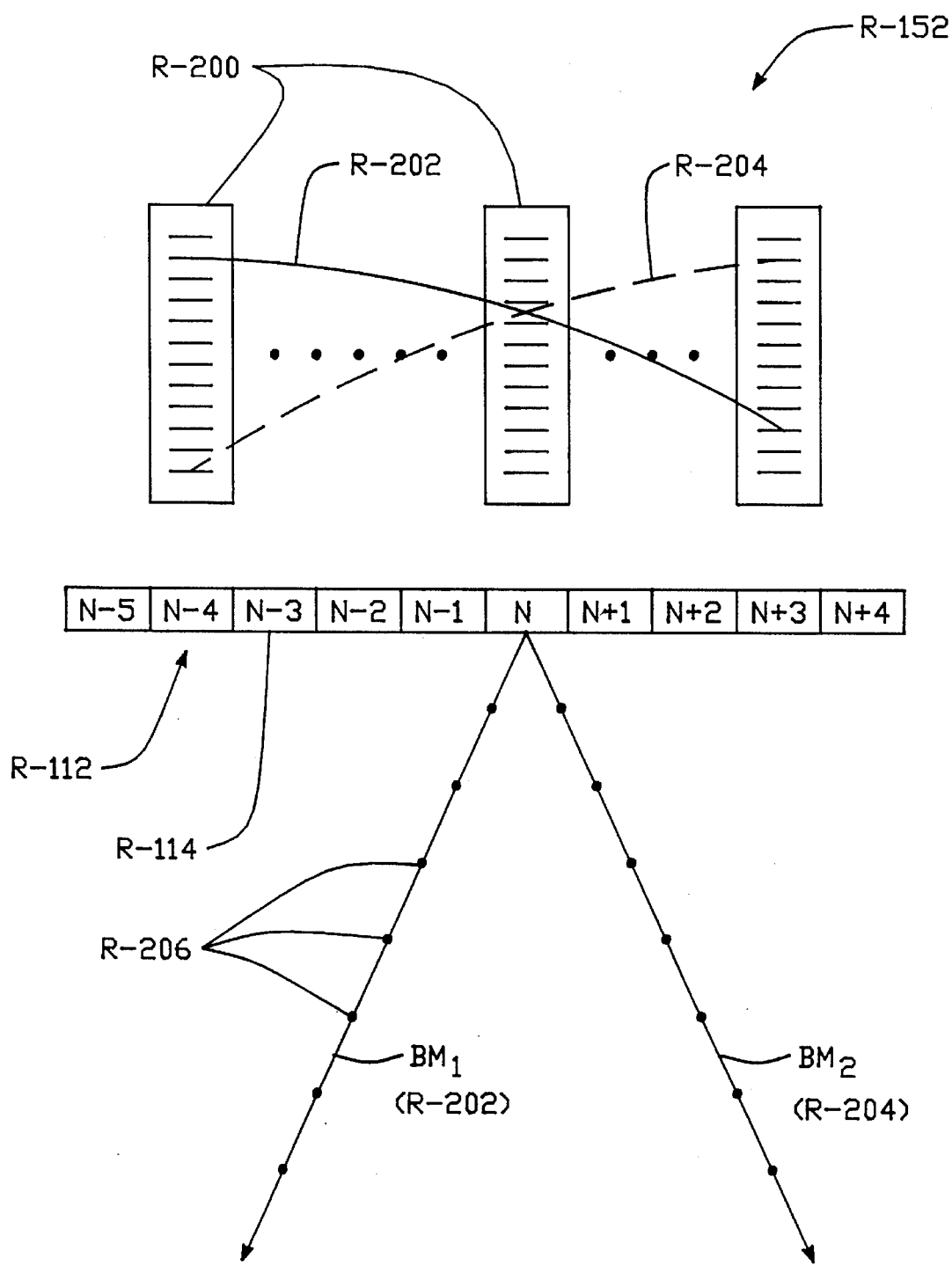
FIG. 11 depicts schematically the selection of data stored in the variable time delay memory of FIG. 8 for purposes of outputting delay data representative of that used to form multiple beams.

As can be seen in FIG. 11, applying different time delay profiles to the same data stored in the memory R-152 allows the receive beamformer processor R-120 to track and, as depicted, form two receive beams from the receive signals at each element.

More particularly, FIG. 11 schematically represents the manner that multiple beam data is selected from and read out of the memory R-152. Essentially interleaved time delay values from two or more time delay profiles at each desired range are applied to the same data stored in the memory R-152. Each time delay profile causes data corresponding to a different beam directed in a different direction to be retrieved from the memory and output over the data-out line R-192. Thus, the appropriate selection of time delay profiles causes data to be focused for different beams.

More particularly, FIG. 11 depicts a phased array transducer R-112 with transducer elements N−5 to N+4, R-114. Schematically, sequences of data R-200 (such as depicted in FIGS. 10a, 10b and 10c) which are stored in memory R-152 for each transducer element at time "t" are shown associated with the respective elements. Superimposed over the sequences of data are first and second time delay profiles R-202, R-204 representing profiles for first and second beams ($BM_1$, $BM_2$). By selecting the appropriate time delay values for each transducer element from the time delay profiles for each beam (as provided by the central and local control system), individual focal points R-206 of first and second beams can be formed from the appropriate data from each data sequence.

It is to be understood that the time delay profile can be dynamically changed for every instance in time. Thus, any desired beam which is contained in the data can be tracked and formed out of the data stored in memory R-152.

Further emphasizing the computational flexibility of this digital receive beamformer system and referring to Table A1, if it is assumed that a single beam has a nominal center frequency $F_0$ of 10 MHz, with a sampling rate $F_s$ of 40 MHz, then only one dynamically focused beam could be formed with a $\lambda_0/2$ spatial range resolution (BW Mode 3). If, however, the beam had a center frequency of 5 MHz, then there is sufficient computational bandwidth in the system such that two beams can be formed with $\lambda_0/2$ spatial range resolution (BW Mode 3). In a preferred embodiment, up to four time-interleaved data streams can be created from the data stored in memory R-152 by applying four sets of independent time delay profiles, one set for each beam. Other prior art systems are not as flexible and require a separate beamformer for each additional beam that is to be formed from data from the same transducer element. Such prior art systems do not have the ability to apply completely independent delay, phase and apodization values on a sample-by-sample basis for either single or multiple receive beams.

A further key advantage of this architecture is that up to and through the storage of receive signal data in the memory R-152, no distinction or segregation in the data is made between beams. Thus, all of the front end processing and amplification, the ADC operation and the computations by the decimator one, all of which are very computational intensive, as well as the process of storing data in the memory R-152 is done transparent to the number of beams in the receive signal. Were multiple beams individually tracked and identified earlier in the signal processing chain, then the computations in the decimator one, for example, would need to be run at a multiple of the number of beams times the present sampling rate. Thus, the present system affords a substantial hardware savings by not distinguishing between beams until the data is read out of memory R-152, and by efficient and maximum use of the computational capacity by a trade-off among the number of beams $N_B$ processed, the receive signal nominal center frequency $F_0$ for each beam, and the normalized per-beam relative spatial range resolution $\gamma_B/\lambda_0$.

d. Decimator Two

The second decimator, decimator two R-154, is programmable and has a filter and decimation structure (variable rate decimation filter) that is similar to decimator one R-150, but uses programmable complex filter coefficients h3 for the third filter R-167. The third filter acts as an anti-aliasing, complex band-pass filter and selects the positive image frequencies, and filters out negative image frequencies and out-of-band noise. This process of filtering and decimating in R-154 can also, in a preferred embodiment, demodulate the signal to or near baseband and convert the signal to a complex quadrature signal pair of I (in-phase) and Q (quadrature).

As discussed below, with respect to the preferred embodiment the data output from decimator two represents data from one, two or four beams, with the data representing two or four beams being time interleaved. As demonstrated in the Tables 1, 2 and 3, decimator two R-154 is where the receive sample bandwidth trade-off becomes most evident and the spatial range resolution is finally determined through the selection of the decimation factor $K_{D2}$.

Memory R-171 (FIG. 7) is programmable (as the term programmable is defined above) by central control C-104 with multiple complex filter coefficients and multiple decimator factors. The filter coefficients and decimator factors are programmed by the central control C-104 in accordance with the particular imaging task to be accomplished in the digital multi-channel receiver.

TABLE A3

| DECIMATION FACTORS FOR DECIMATOR TWO | | |
|---|---|---|
| Decimator Two Modes | $K_{D2}$ Decimation Factor | Decimator Two Output Rate $R_o$ |
| BW Mode 1 | 1 | $4F_0$ |
| BW Mode 2 | 2 | $2F_0$ |
| BW Mode 3 | 4 | $F_0$ |
| BW Mode 4 | 8 | $F_0/2$ |
| BW Mode 5 | 2 | $2F_0/3$ |
| BW Mode 6 | 4 | $F_0/3$ |

The relationship of the decimation factor of decimator two to the nominal center frequency $F_0$ defines the output sampling rate $R_o$ as set out in Table A3 where $K_{D2}=4F_0/R_o$ for Bandwidth Modes 1 to 4 and where $K_{D2}=4F_0/3R_o$ for Bandwidth Modes 5 and 6.

Accordingly, it is evident that as the decimation factor goes down to a smaller value, the sample rate per beam increases with the decimator two R-154 working at a constant full maximum capacity in all situations. Thus, this preferred embodiment uses decimator two R-154 in order to keep the computational rate at a maximum constant.

It is to be understood that the bypass modes of decimator two, as for decimator one, enables the isolation of decimator two for diagnostic purposes and/or when a signal with a wider bandwidth is desired. By way of example, for Bandwidth Mode 1, decimator two R-154 can be bypassed. Further, decimator two R-154 can be operated simply as a downsampler without performing a filtering operation.

From the above, it is evident that the beamformer processor R-120 decimates the signal to the lowest rate for maximum computational efficiency consistent with the number of beams utilized and spatial range resolution requirements.

Thus, it is evident that the above receive signal processing architecture provides for (1) a variable time delay memory, and (2) a second programmable decimator which affords the above advantage with respect to full and maximum signal processing computational bandwidth utilization. The relationship among (1) receive signal nominal center frequency $F_0$, (2) receive signal spatial range resolution $\gamma_B$, and (3) the number of simultaneously received beams $N_B$, can be programmed with decimation factors with respect to the decimators and in particular the second decimator, and with respect to the application of time delay values to the memory in order to distinguish between beams. Such advantages are independent of where signal demodulation occurs in the signal path.

e. Complex Multiplier

Complex multiplication to handle the complex phase rotation for fine time delay is very computational intensive; however, at this point in the signal path the signal is decimated down to the lowest sample rate in the signal path, and thus complex multiplication can be handled very efficiently.

The complex multiplier R-156 accomplishes true complex multiplication with a cross-multiplication as explained below.

In the complex multiplier R-156 signal demodulation to or near baseband occurs in order to account for verniering of $F_o$ to $F_c$. However, as explained above such demodulation to or near baseband, when for example there is no verniering of $F_o$, can occur at other locations in the signal path, such as decimator two, in a different embodiment.

In the complex multiplier R-156, a weighting term which is a function of the apodization value and the focusing phase shift (corresponding to a fine time delay) is multiplied by the signal input from decimator two R-154. The apodization value and the phase shift value can change dynamically on a sample-by-sample, per receive processor, per beam basis. Thus, these values can dynamically vary across the aperture of the transducer as well dynamically vary in time (See FIGS. 9a, 9b, 9c and 15). These values are supplied by the central control system C-104, which is the subject of the above referenced patent application, and the local processor control C-210.

In FIG. 7, the preferred embodiment of the complex multiplier R-156 is conceptually shown with a complex I/O signal sample multiplied in multiplier R-210 by a complex phase value and real apodization value which are combined in a complex multiplier R-260. The complex multiplier R-210 is preferably accomplished by four real multiplication operations performed by a time shared Booth multiplier. Alternatively a separate phase multiplier and a separate apodization multiplier can be used in order to focus the signal. In yet another embodiment, the separate phase multiplier can be implemented with a Cordic multiplier, and the separate apodization multiplier can be implemented by a Booth multiplier.

The output of the complex multiplier R-156 is represented as follows:

$$Y = A\cos\phi \cdot I - A\sin\phi \cdot Q + j(A\cos\phi \cdot Q + A\sin\phi \cdot I)$$

where I+jQ is the input channel sample signal to complex multiplier R-156, A is the apodization value and $\phi$ is the phase shift value.

It is evident from the above and in particular with respect to the memory R-152 and complex multiplier R-156, that the present embodiment implements true dynamic focusing and dynamic apodization as each data sample per beam per receive processor can be modified dynamically with delay values, phase values and apodization values as supplied by the central control system and local processor control systems. Thus, the present embodiment is capable of using instantaneous delay, phase and apodization values calculated by the central control system for every data sample.

As indicated above, the complex multiplier as well as the rest of the functional blocks of FIG. 7 are preferably implemented in high speed digital hardware. In a different embodiment, however, such functional blocks as, for example, for the complex multiplier, can be implemented in software with general purpose microprocessors and in a different computational order and with different algorithms other than specified above. By way of example only, in the complex multiplier the apodization value could be multiplied after the complex I and Q multiplication occurs. Further, the prior art describes other methods of implementing a complex multiplier.

f. Focusing Filter

In another embodiment, the fine focusing delay can also be accomplished with a delay interpolator, such as a linear interpolation between the two samples closest to the desired delay. A generalization of the delay interpolator is a focusing filter, as described for filter-and-sum beamforming in section 6.2.5 of the text by Dudgeon and Mersereau (*Multichannel Digital Signal Processing*, Prentice Hall, 1985). Such a filter is programmed differently for each digital multichannel receive processor, and each waveform associated with each beam within a receive processor, to account for the desired signal delay versus frequency characteristic needed to support receive beamformation. The filter will therefore generally have a nonlinear phase response. The focusing filter characteristics therefore contrast with the signal path filters associated with the decimation and demodulation operations shown in FIG. 7, which preferably have linear-phase responses (therefore yielding no distortion of signals passing through the filter and which are typically set to identical characteristics in all receive processors. The filters used in the decimator and demodulation operations provide waveform shaping, not beamforming, and the same waveform (with appropriate delay and apodization) is normally created in all receive processors, although the invention supports selection of different filter characteristics among receive processors.

3. Per Channel Local Processor Control System

Secondary or local processor control C-210 (FIG. 7) for the digital multi-channel receiver R-101, receives control data from the primary or central control C-104. The secondary or local processor control C-210 includes a controller and I/O processor C-260, a calibration processor C-262, a memory address and delay processor C-264, a phase and frequency processor C-266, and an apodization processor C-268. The local processor control C-210 is responsible for providing to the digital multi-channel receive processor R-120 frequency values (i.e. demodulation frequency, phase correction frequency, and receive signal nominal center frequency $F_0$, delay values, phase shift values, apodization values and calibration values per digital receive sample and per beam as discussed in detail below. The central control system C-104, as discussed in the above-referenced patent application, is responsible for providing to the local processor control C-210 the following: (1) filter coefficient programming (in line with the definition of programmable above), decimation factor programming, and calibration value programming per imaging mode, (2) frequency parameters as specified below per scan line and per beam, (3) delay and apodization values per dynamic range zone and per beam and (4) delay interpolation/extrapolation coefficients per sample. The local processor control C-210 also controls the sampling rate of the ADC R-118.

a. I/O Processor

With respect to the secondary or local control C-210, the controller and I/O processor C-260 controls all of the read and write operations.

b. Memory Address and Delay Processor

In a preferred embodiment, the memory address and delay processor C-264 calculates an interpolated and/or extrapolated delay value for each output sample of each beam of its associated beamformer processor R-120, using zone boundary delay values and the interpolation and/or extrapolation coefficients ($\alpha_{range}$) which are provided by the central control C-104 through a primary delay processor of a focus control C-132. The zone boundary delay values are defined for example by delay profiles (FIG. 9c) at specified range boundaries. The coefficients, $\alpha_{range}$, allow for interpolation (and/or extrapolation) in range between (and/or outbound of) the delay profile boundaries in order to increase the density of delay values between the range boundaries. As can be appreciated, each digital multi-channel receive processor R-120 has a memory address and delay processor C-264 associated with it in order to afford the dynamic focusing. For multiple beam operation, delay interpolations are time interleaved.

The delay processor C-264 performs local interpolation/extrapolation in order to increase the density of the sparse, decimated delay profile data set communicated to the memory address and delay processor C-264 from the focus processor C-132 of the central control C-104. After the interpolation/extrapolation step in interpolator C-199 (FIG. 8), the delay value is divided with the most significant bits (coarse delay) being sent to the time delay memory R-152 in order to facilitate the selection of samples for desired beam or beams. The least significant bits (fine time delay) of the time delay value is sent to the phase and frequency processor C-266 where it is turned into a phase value as described more fully hereinbelow.

If selected, the architecture provides for a delay calibration value which can be added to the delay data prior to interpolation in interpolator C-199. The digital receive path delay calibration values from the calibration processor C-262 are supplied on line via C-195 to interpolator C-199.

Alternative embodiments can have less than a one-to-one relationship between beamformer processor R-120 and memory address and delay processor C-264. Further, such coefficients $\alpha_{range}$ can be locally generated by the memory address and delay processor C-264. Further it is to be understood that still different delay value generation schemes can be employed. By way of example, an accumulator structure similar to accumulator C-272 of the local apodization processor C-268 can be used to generate appropriate delay values.

c. Phase and Frequency Processor

The phase and frequency processor C-266 (FIG. 7, 12) of local or secondary control C-210 generates demodulation phase values (to, for example, account for the verniering of $F_o$ by the transmit beamformer system), and also phase shift correction values determined by the central control system C-104. The demodulation phase values are ideally calculated as an integration of the demodulation frequency (FIGS. 14a, 14b and 14c) generated from the frequency profile generator C-141. As hardware that accomplishes such integration is expensive, the demodulation phase values are preferably calculated as the sum of (1) a product, computed in multiplier C-140 of the demodulation frequency specification profiles $f_D(t)$ FIGS. 14d, 14e, and 14f, from the frequency profile generator C-141 and a demodulation reference time from the memory address and delay processor C-264 synchronized with the input of data to the delay memory R-152 and (2) a constant value added by adder C-141, as more fully explained below.

The fine focusing phase correction values, as computed in multiplier C-138, are the product of the instantaneous phase correction frequency $f_p(t)$ from the frequency profile generator C-141 (FIGS. 14a, 14b and 14c) and the residual or fine delay time (LSBs of delay time) from the memory address and delay processor C-264. Both the demodulation frequency and the phase correction frequency used in computing the focusing phase values are computed by choosing, in a preferred embodiment, one of the respective frequency profiles generated in the frequency profile generator C-141. The two phase values, the fine phase shift value and the demodulation phase value are added by summer C-142 and communicated to a look-up table C-144 where the phase value is converted into a complex I/Q value.

In a preferred embodiment all demodulation to or near baseband occurs in the complex multiplier. However, in other situations such as by way of example only, where there are frequency offsets, such demodulation can occur alternatively in decimator two through the use of complex filter coefficients with residual demodulation occurring in the complex multiplier. Such frequency offsets can, by way of example only, result when the carrier frequency is verniered from the receive signal nominal center frequency $F_0$ by the above referenced digital transmit beamformer system T-100. Such verniered center frequency can be the same for all beams transmitted from the transmit beamformer T-100 or different for each of multiple transmit beams.

The frequency for demodulation and for phase shift or rotation can be independently programmed in order to select one of the following three frequency-vs-time profiles:

(1) The frequency remains at a constant start frequency $F_{start}$ (generally the carrier frequency $F_c$) which is time independent as shown in FIG. 14a; or (2) The frequency is shifted down from the start frequency ($F_{start}$) by downshift slope $\Delta F_{downslope}$, until it either: (a) saturates at a constant limit frequency, $F_{limit}$, in one embodiment, or (b) reaches a specified time limit, $T_{break}$, and thereafter remains at a constant frequency as shown in FIG. 14b; or (3) The frequency is first shifted down from the start frequency, $F_{start}$, by a downshift slope, $\Delta F_{downslope}$, until it either: (a) saturates at a constant limit frequency, $F_{limit}$, in one embodiment, or (b) reaches a specified time limit, $T_{break}$, and thereafter is immediately shifted up by an upshift slope, $\Delta F_{upslope}$, until the frequency either: (a) saturates at the start frequency, $F_{start}$, or (b) is allowed to continue without saturating at the start frequency (FIG. 14c).

Both the demodulation frequency, $f_D(t)$, and the frequency $f_P(t)$ applied to generate the focusing phase shift value, can be selected from any of the above similar frequency profiles. Thus, the same profile can be applied to both multipliers C-138 and C-140. Different frequency profiles can also be applied to these multipliers in a different embodiment.

These profiles model frequency attenuation of ultrasound signals transmitted through tissue. Thus, for example, the longer that a broadband signal is propagated through tissue, the more that the center frequency of the signal will be downshifted due to such attenuation. In this embodiment, all the profiles began at frequency $F_{start}$. This frequency can be the carrier frequency $F_c$ of the receive beam. It is understood that although the transmit carrier frequency and the corresponding receive carrier frequency can be the same, there is no requirement that they are in fact the same. Accordingly, the start frequency of the frequency profiles can be that of the center frequency of the receive beamformer should it be different from that of the center frequency of the transmit beamformer. Accordingly $F_{start}$ can be any value. However, $F_{start}$ is preferably the transmit carrier frequency $F_c$ which is equal to the vernier factor times the center frequency, $vF_o$.

The parameters for defining the above frequency profiles are stored in the central control C-104. The frequency profile generator C-141 of the phase and frequency processor C-266 receives these parameters and calculates the frequency values on a receive-sample-by-receive-sample basis. These frequency values define the frequency profiles of FIGS. 14a, 14b and 14c.

For one embodiment, the parameters downloaded from the central control and programmed into the local control include the start frequency, the frequency limit, the frequency downslope, and the frequency upslope. As indicated above, the start frequency is generally the carrier frequency $F_c$. The frequency limit is the lowest frequency value used for the above calculations. It is understood that the numbers stored in the central control C-104 can be updated at any time based on new data which can, for example, be introduced and stored on the central control C-104 for example, from hard disk memory.

In another preferred embodiment, the downloaded parameters include the start frequency, the break time, $T_{break}$, the frequency downslope and the frequency upslope. In this embodiment, the downslope is limited not by a limit frequency but by time, $T_{break}$. Thus, the frequency profile in FIG. 14c is allowed to slope down until the $T_{break}$ has expired. At that point, the frequency profiles slopes up.

Preferably, the phase and frequency processor C-266 calculates all profiles simultaneously and then the central and/or local processor control selects the frequency profile, based on criteria pre-stored in the central control C-104, for each imaging mode, to calculate a demodulation phase value and a residual time delay phase value in order to provide the most optimally enhanced image.

Additionally, it is understood that in a multiple beam situation, each of the beams can be received with a different carrier frequency, $F_c$. The central processor could, for example, select different frequencies, slopes, and time limits for each of the beams in order to provide for an enhanced image. In such a situation, the start frequencies for each of the above three frequency profiles would depend upon the frequency for the particular beam formed by the beamformer processor. Thus the frequency profiles for each beam could be specified with entirely different parameters.

As indicated above, as preferably implemented, the demodulation phase value is the sum of (1) a product in multiplier C-140 of the demodulation frequency $f_D(t)$ (FIGS. 14d, 14e, and 14f) from the frequency profile generator C-141 and a demodulation reference time t from the memory address and delay processor C-264 and (2) a value added by adder C-141. If the reference time t is given by $0 \leq t \leq T_{break}$, then multiplexer C-143 causes t to be multiplied by $f_D(t)$ at multiplier C-140 and multiplexer C-145 causes a zero value to be added by adder C-141. Accordingly, the demodulation phase value is $f_D(t) \cdot t$. If, on the other hand, the reference time t is given by $T_{break} \leq t$ then multiplexer C-143 causes $t - T_{break}$ to be multiplied by $f_D(t)$ and multiplexer C-145 causes the constant value $f_D(T_{break}) \cdot T_{break}$ (see discontinuities in FIGS. 14e and 14f) to be added to the result. Accordingly, the demodulator phase value is $f_D(t) \cdot (t - T_{break}) + f_D(T_{break}) \cdot T_{break}$.

d. Apodization Processor

The apodization processor C-268 (FIG. 12) obtains a sparse table of range bounded apodization values from the focus processor C-132 of the central control C-104. Also obtained from the central control C-104 is the zone width $2^B$ between the range bounded apodization value, which zone width is specified by a value B. If one zone boundary apodization value is $A_1$ (FIG. 15) and the other zone boundary apodization value is $A_2$, then the accumulator C-272 (FIG. 12) of apodization processor C-268 can generate incremented apodization values between $A_1$ and $A_2$ by preferably adding $$\frac{A_2 - A_1}{2^B}$$

to the accumulated apodization values (with the starting value being $A_1$). Accordingly, apodization values are generated every $2^B$ intervals between $A_1$ and $A_2$ in order to fill out the sparse data set sent by the central control. This above operation is implicitly a linear interpolation. However, nonlinear techniques can also be implemented as well as extrapolation techniques.

Alternatively, it is to be understood that local apodization processor C-268 can internally calculate the interpolation/extrapolation range coefficients in a local range coefficient generator based on scan geometry parameters supplied from the central control C-104. These parameters define the particular scanning format that is being used. Further in still other embodiments such apodization interpolation/extrapolation coefficients can be pre-stored in the central control and downloaded to the local apodization processor.

The apodization processor C-268 calculates an interpolated/extrapolated apodization value for each output sample of each beam. To support multiple beam operation, the apodization processor C-268 interleaves interpolation/extrapolation calculations. As with the delay values, the apodization values, if desired, can be modified by supplying the apodization calibration values from the calibration processor before the apodization value is applied to the complex multiplier.

The complex value representation of the phase shift and the apodization values, multiplied together in multiplier R-260, are sent to the complex multiplier R-156 to be multiplied with the complex sample signal value.

e. Calibration Processor

The calibration processor C-262 is activated when a scan format or transducer is changed. During calibration, a common calibration signal from, for example, the transmit beamformer system T-100 is injected into all receive channels. The component tolerances in analog circuitry prior to digitization in ADC R-118 can result in analog-path-to-analog-path signal variances. The local calibration processor compares the output signal to a fixed calibration reference value which is stored in the local calibration processor. The local calibration processor computes delay and apodization correction values for the local control in order to drive the difference between the output signals and the reference signal to zero through an iterative process.

These correction values are sampled on an analog signal path basis and supplied by the calibration processor C-262, with respect to magnitude, to the apodization processor C-268 and, with respect to delay and phase, to the memory address and delay processor C-264.

For operations including, by way of example only, sliding aperture, random aperture and synthetic aperture, multiple fixed calibration reference values can be stored.

In addition to the above locally computed calibration values, calibration values can be downloaded from the central control. For example, calibration values for each type of transducer can be pre-stored in central control or provided to central control when a new transducer is selected. Such calibration values can then be downloaded to the local calibration processor to be combined with the locally generated calibration values, if appropriate.

4. Baseband Multi-Beam Processor

Figure 13:
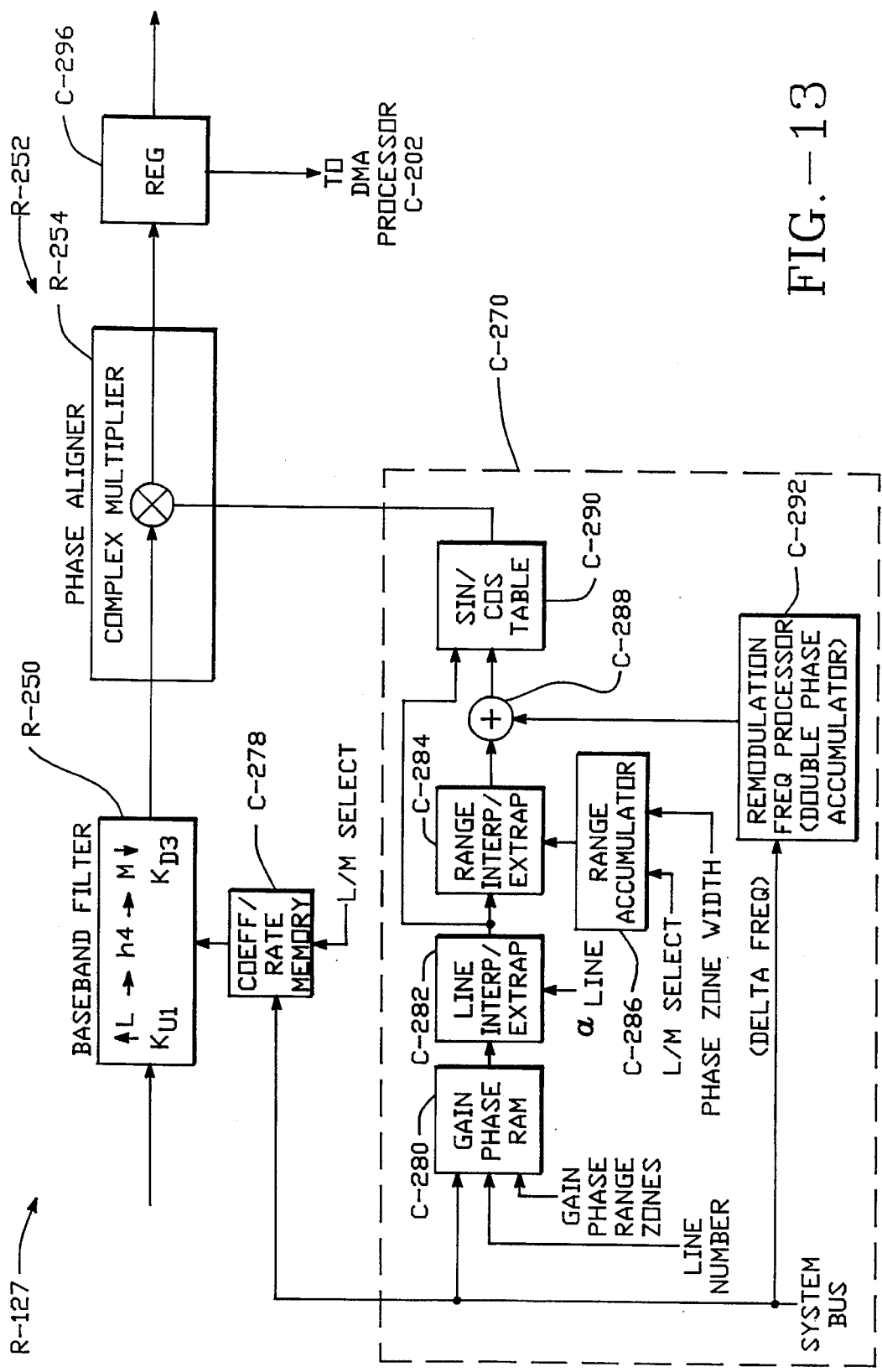
FIG. 13 is a block diagram schematic of an embodiment of a phase aligner of the invention which provides for phase alignment among receive scan lines in conjunction with a decimator, and a phase aligner (gain, phase and frequency) control processor.
Figure 15:
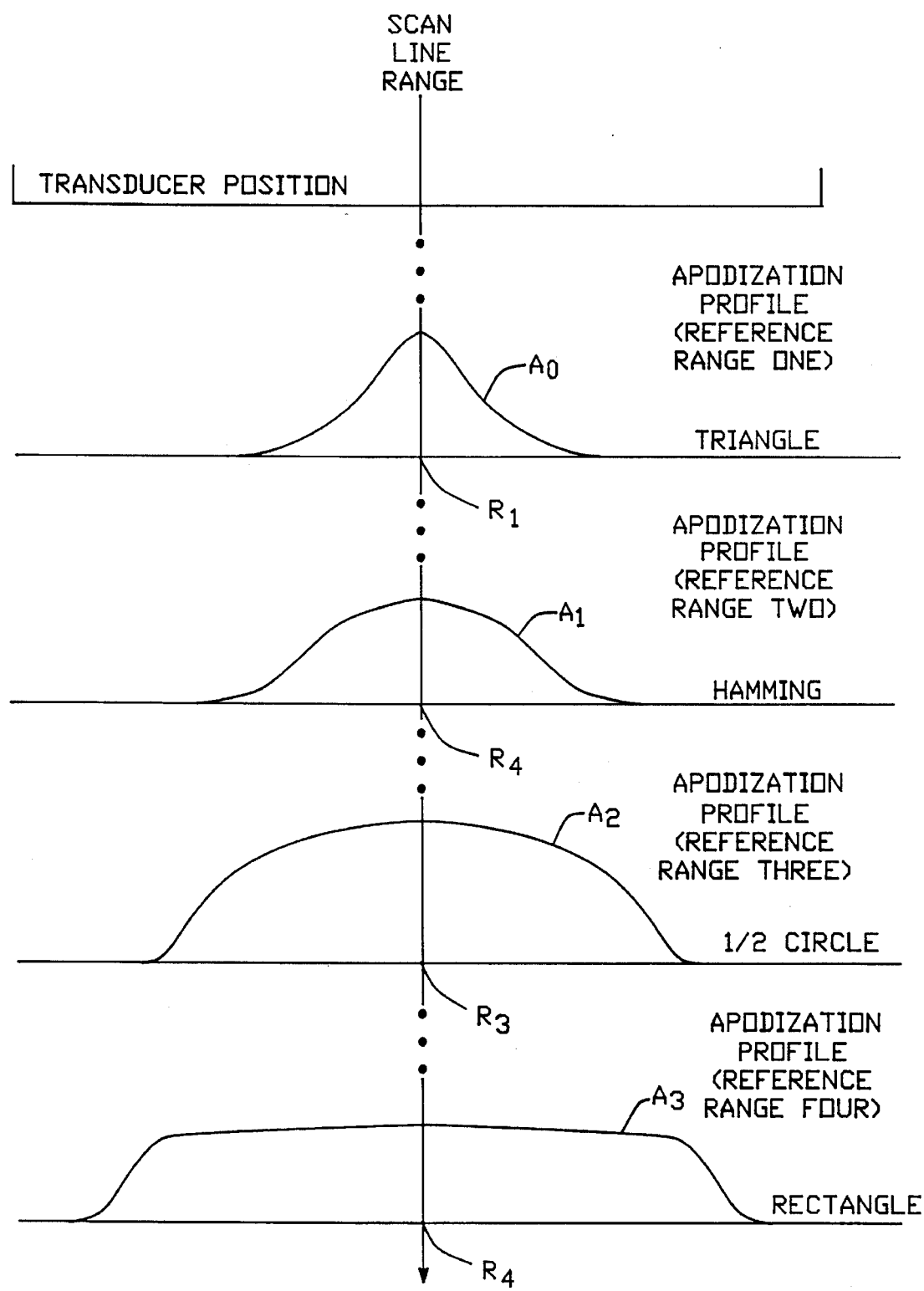
FIG. 15 depicts a series of differently evolving apodization profiles which have increasing aperture widths with increased range along a receive scan line centered on and normal to the transducer array.

The digital multi-channel receive processors R-120 are summed by summer R-126 and the results communicated to the baseband multi-beam processor R-125 (FIG. 2b) which comprises a baseband filter and phase aligner R-127 (FIGS. 2b, 7, 13) and a baseband processor control C-270 (FIGS. 2b, 7, 13).

a. Subarray Summer

As is known in the art, two standard methods to sum multiple inputs are parallel summation and sequential summation. The present embodiment combines aspects of these two approaches for a fast and efficient summation process. FIG. 2b depicts the summation process of the present digital receive beamformer system. Pairs of digital multi-channel receive processors R-120 are combined through parallel summation. Eight pairs of processors R-120 are sequentially summed by a subarray summer (subarray sums block R-126, FIG. 2b). The summers for this first summation step can be accomplished outside the processors R-120. Alternatively, the processors R-120 can include summers to effect this step.

After the above summation, then four such subarray sums are summed in parallel by a semi-final summer (final sums block R-126). Following this step is a parallel summation step where the sums from two semi-final summers are summed in parallel in final summer (sum block R-126). It is to be understood that alternative combinations of parallel and sequential summation techniques or all parallel summation or all sequential summation techniques could be used in a different embodiment.

b. Baseband Filter and Phase Aligner

The complex baseband signal (or signals in the multiple beam case) from the digital multi-channel receive processors R-120 which represent the summation of all the signals from the elements sampled across the face of the transducer, is communicated to a baseband filter and phase aligner block R-127. Block R-127 includes a baseband filter R-250 (FIG. 13) which performs filtering and rational sample rate conversion (interpolation and decimation). Block R-127 also includes a phase aligner R-252 (FIG. 13) which provides for (1) scan-line-dependent and range-dependent phase adjustments of the signal required to correct for phase differences resulting from line-to-line apodization changes, scan geometry, and non-aligned effective transmit and receive origins, (2) remodulation (frequency alignment) of the signal to correct for phase differences resulting from different transmit frequencies per scan line, and (3) gain adjustment per scan line. The advantage of the use of a scan-line-to-scan-line variable frequency mode on transmit and receive beamformation is the reduction of grating lobes (see co-pending application entitled: METHOD AND APPARATUS FOR ADJUSTABLE FREQUENCY SCANNING IN ULTRASOUND IMAGING, which discusses a scan-line-to-scan-line variable frequency mode).

Such phase alignment and remodulation between desired scan lines and particularly two or more adjacent scan lines is, for example, for purposes of implementing coherent image processing techniques as described in the above co-pending application entitled: METHOD AND APPARATUS FOR COHERENT IMAGE FORMATION.

Thus, the purpose of the phase aligner is to maintain scan-line-to-scan-line coherency for (1) adjustable frequency operation, (2) synthetic scan line operation, as well as for (3) synthetic aperture operation, and (4) future operations on coherent beam samples.

Baseband filter R-250 preferably includes a multi-tap FIR filter which is programmable with both real and complex coefficients h4, and a rational sample rate converter. The rational sample rate converter includes an interpolator which has an integer upsampling factor L and a decimator with an integer down sampling factor M. Baseband filter R-250 accordingly accomplishes the following tasks.

First, baseband filter R-250 increases the signal-to-noise ratio by rejecting out-of-band noise frequencies, and/or maximizing the signal-to-noise ratio with a matched filter or quasi-matched filter design, preferably for matching to substantially Gaussian transmit pulses as well as pulses of other shapes. Gaussian pulses are especially useful as they represent waveforms that do not distort during transmission through attenuative media such as the body.

Second, baseband filter R-250 enables pulse equalization and shaping by compensating for both the transducer frequency response and the analog signal path prior to the ADC R-118.

Third, baseband filter R-250 performs a sample rate conversion (decimation function) based upon the rational (non-integer) decimation factor L/M (where L and M are integers). Accordingly, the sample rate is converted to a rate that is advantageous for an image display.

Examples of such decimation can be found in the references identified with the above discussion of decimator one and decimator two. The filter coefficients and non-integer decimation factors for baseband filter R-250 are programmed into baseband filter/phase aligner R-127 by being downloaded from the central control C-104 to coefficient and rate memory C-278. The downloaded coefficients and factors can be changed at any time by introducing new coefficients and factors into the central control C-104. The coefficients and factors stored in the coefficient and rate memory C-278 are selectable by the central control C-104 for programming the filter and decimation ratio L/M of the baseband filter R-250.

The complex multiplier R-254 of phase aligner R-252 operates in a manner similar to complex multiplier R-156 (FIG. 7).

Following complex multiplier R-254 is a register C-296 which stores scan line sample data so that it can be reported to the DMA processor C-202 of the central control C-104 for providing scan-line-to-scan-line calibration.

c. Baseband Processor Control

The phase aligner includes a control function which is contained in a baseband processor control C-270 (FIGS. 2b, 7, 13). In this baseband processor control C-270, a scan-line-to-scan-line or beam-to-beam gain adjustment value and a phase adjustment value are generated in a time interleaved manner. As discussed above, the phase correction value is the sum of the phase terms including: (1) a phase adjustment term required to correct for phase differences due to scan-line-to-scan-line apodization changes, and scan geometry which results in non-aligned effective transmit and receive origins (the scan-line-dependent and range-dependent phase adjustment term) and (2) a phase term required to remodulate the signal as though each line had used a common carrier frequency. As discussed herein and in co-pending U.S. patent applications entitled: METHOD AND APPARATUS FOR TRANSMIT BEAMFORMER SYSTEM and METHOD AND APPARATUS FOR ADJUSTABLE FREQUENCY SCANNING IN ULTRASOUND IMAGING, using a frequency scaling factor or frequency vernier factor, each beam can have a different carrier frequency. The phase aligner accordingly provides for remodulation between beams so that all beams are adjusted for differences in carrier frequencies.

In operation a source data set including scan format geometry parameters, sparse scan line gain and delay value, interpolation coefficient and non-integer decimation factors are downloaded from the central control C-104 to the baseband processor control C-270. Additionally, frequency parameters used in the frequency profile generator of the central control C-104 in accordance with FIGS. 14a, 14b and 14c are downloaded to the baseband processor control C-270.

Figure 12:
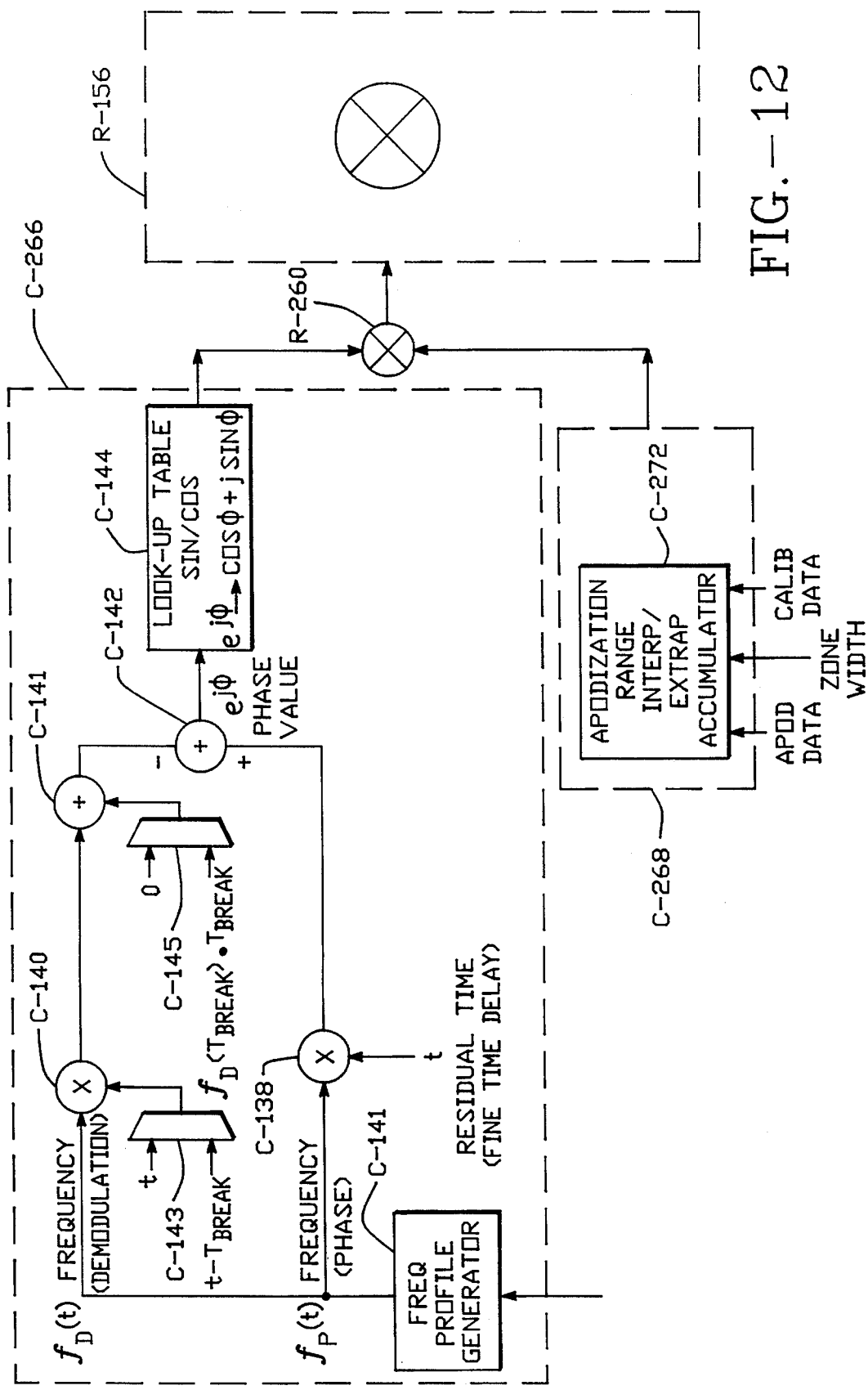
FIG. 12 depicts a schematic of an embodiment of the complex multiplier, the phase and frequency processor, and the apodization processor of the local processor control of the invention.

The baseband processor control C-270 of FIG. 13 includes a gain and phase RAM C-280, a line interpolator C-282 which is supplied with pre-calculated and pre-stored line interpolation coefficients ($\alpha_{line}$) by the central control C-104, and a range interpolator C-284 with a range accumulator C-286, which is supplied with a rational decimation factor L/M and a phase zone width, both of which values are pre-calculated and pre-stored in the central control C-104. The rational decimation factor L/M is the same value supplied to the baseband filter R-250. Accumulator C-286 operates in the same manner as does accumulator C-272 of the local apodization processor C-268 (FIG. 12). Additionally as is known in the art a sample rate conversion in accordance with the rational decimation factor L/M is accomplished in order to match the sample data rate of the baseband filter R-250.

Alternatively the range interpolator/extrapolator C-284 can be supplied with programmable (as defined above) interpolation/extrapolation coefficients which are, by way of example, either (1) pre-calculated and pre-stored in or calculated by the central control or (2) calculated locally in baseband processor control C-270 by a coefficient generator.

The baseband processor control C-270 also includes a remodulation frequency processor C-292 which is preferably implemented as a double phase accumulator. The double phase accumulator calculates phase adjustment values to correct for line-to-line frequency differences and thus to remodulate the signal as though a common carrier frequency had been used across all scan lines.

From the central control C-104, pre-calculated and pre-stored values representing the frequency differences between scan lines (delta frequency values) are sent to the remodulation frequency processor C-292. These frequency difference values are based on frequencies and frequency slopes such as specified in FIGS. 14a, 14b and 14c. By way of example only, let it be assumed that the frequency profiles for two scan lines look like FIG. 14b but with different start frequency, $F_{start}$, values and different downshift slope, $\Delta F_{downslope}$, values. Accordingly, downloaded to baseband processor control C-270 from the central control for the two scan lines are the difference in frequencies between the scan lines and the difference in the rate of change of the frequency profiles over time. These values are calculated by the acquisition processor C-130 based on stored parameters and dependent upon the particular rational conversion factor L/M currently being used. The first accumulator of processor C-292 accumulates the difference in the rates of change of the frequency profiles over time between scan line while the second accumulator accumulates the difference in the frequencies between the scan lines over time. If there is no difference in the rate of change of the frequency profile over time, (i.e. the profile are the same exact for initially different $F_{start}$ values, or after $T_{break}$ in FIG. 14b when the slope goes to zero) the first accumulator performs no function. With no difference in the rate changes of the frequencies between the scan lines, only the second accumulator accumulates the frequency differences over time resulting in a corrective remodulation phase value.

The phase adjustment due to scan-line-to-scan-line apodization changes, scan geometry which results in non-aligned transmit and receive origins, and the phase adjustment due to remodulating the signal to an effective common carrier frequency are added in a summer C-288 and the summed phase value is then converted in a look-up table C-290 to sine and cosine representations. As part of the look-up table C-290 function, the gain is multiplied by the sine and cosine representations. This value is applied to complex multiplier R-252.

It is to be understood that other embodiments of the baseband processor control are possible.

As indicated above the phase aligner R-127 ensures that coherent signal and sample relationships are maintained between scan lines. The transmit samples and the echo or receive samples of the signals from beams are defined as being coherent when sufficient information is stored, preserved, or maintained to enable the samples of the return signals to be phase and amplitude corrected from scan-line-to-scan-line. The process of actually making the phase and amplitude corrections need not have yet taken place, as long as sufficient information with respect to a reference is maintained.

When a signal sample is processed coherently, the processing continues to maintain sufficient information to perform phase and amplitude correction at a later time. When two or more samples are processed coherently (e.g., coherently summed), the phase and amplitude corrections necessary for phase and amplitude alignment must have previously been performed.

Coherent processing of two or more signal samples yields significant benefits, such as being able to calculate synthetic samples, as described in the above co-pending application.

Due to the beamformer control C-104 specifying and accounting for all aspects of the transmit and receive signal, the entire system maintains all signal samples as coherent samples throughout the transmit and receive signal path, until the signal is finally detected in an operation which is external to beamformation.

It is to be understood that although scan-line-to-scan-line phase alignment is accomplished by baseband filter/phase aligner R-127 after beamformation, that such phase alignment can be provided prior to beamformation in the digital multi-channel receive processor R-120. By way of example, such phase alignment can be accomplished in each complex multiplier R-156 of each processor R-120.

5. Synthetic Aperture

Synthetic aperture, in the preferred embodiment, is characterized by: (1) partitioning the array of transducer elements into a plurality of independent or substantially independent subarrays for transmission and/or reception, each subarray consisting of multiple transducer elements; (2) executing a plurality of transmit/receive sequences with a subarray pair; (3) for each sequence, acquiring the coherent samples; and (4) combining, preferably by summation or weighted summation, all corresponding coherent samples. With such an arrangement, the number of transmit and/or receive electronic paths is effectively increased, and the transducer aperture on transmission and/or reception is increased.

Synthetic aperture scanning is described, for example, in Klahr U.S. Pat. No. 3,805,596, entitled: "High Resolution Ultrasonic Imaging Scanner," and in Saugeon U.S. Pat. No. 4,733,562, entitled: "Method And Apparatus For Ultrasonic Scanning Of An Object." Synthetic aperture scanning is also identified in Kino, "Acoustic Imaging for Nondestructive Evaluation," and Sutton, "Underwater Acoustic Imaging," both in Proceedings of the IEEE, Vol. 67, April 1979. All the above references are incorporated herein by reference.

The present digital receive beamformer system supports synthetic aperture operations. The calibration processor stores gain and phase corrections for the subarray receive apertures used in the synthetic aperture operations. The phase aligner maintains coherency of the separately received subarray receive aperture beams so that a summer can combine the signals to form a synthetic aperture scan line.

Further description of such synthetic aperture operation can be found in co-pending application entitled: METHOD AND APPARATUS FOR COHERENT IMAGE FORMATION.

We claim:

1. Apparatus for processing a plurality of input signals each responsive to ultrasonic energy incident on a respective ultrasonic receive element in an array, comprising:

a plurality of range gates each coupled to range gate a respective one of said input signals;

a plurality of focusing phase-rotators each coupled to phase-rotate a respective one of said input signals; and a summer coupled to sum signals responsive to said gated, phase-rotated signals to produce a summed signal;

a demodulator demodulating a signal responsive to at least one of said input signals;

an integrator, downstream of said demodulator, said integrator integrating a signal responsive to said summed signal to produce an output value;

means for operating said apparatus in a first mode (PW), in which each of said range gates is enabled only during selected time periods; and means for operating said apparatus in a second mode (CW), in which said range gates are enabled continuously.

2. Apparatus according to claim 1 wherein:

said integrator integrates a signal responsive to said summed signal over time periods which include said selected time periods.

3. Apparatus according to claim 2, wherein in said second mode, said circuit element filters said signal responsive to said summed signal.

4. A method for processing ultrasonic energy incident on a plurality of ultrasonic transducers by phase-rotating an analog input signal by a desired phase rotation, comprising the steps of:

providing said analog input signal as a plurality of phase-split signals;

weighting at least one of said phase-split signals by a plurality of different fixed weights to produce a plurality of weighted, phase-split signals; and summing selected ones of said weighted, phase-split signals, said selection being made in response to said desired phase rotation.

5. A method according to claim 4, wherein said step of providing provides exactly two phase-split signals.

6. A method according to claim 5, wherein said two phase-split signals are substantially in quadrature.

7. A method according to claim 5, wherein said step of providing comprises the steps of mixing said analog input signal with a first signal and, in parallel, mixing said analog input signal with a second signal, said first and second signals being substantially in quadrature.

8. A method according to claim 5, wherein said step of providing comprises the steps of filtering said analog input signal with a first filter and, in parallel, filtering said analog input signal with a second filter, said first and second filters having transfer characteristics of approximately equal magnitude over a predetermined frequency range and having a phase difference of approximately 90 degrees over said predetermined frequency range.

9. A method according to claim 4, wherein said step of weighing comprises the step of weighing each of said phase-split signals by a respective plurality of different fixed weights to produce a respective plurality of weighted, phase-split signals.

10. A method according to claim 4, wherein the negative of each fixed weight in said plurality of different fixed weights is also in said plurality of different fixed weights.

11. A method according to claim 4, further comprising the step of providing said desired phase rotation as a selection of one of a predefined set of available discrete amounts.

12. A method for processing ultrasonic energy incident on a plurality of ultrasonic transducers by phase-rotating an analog input signal by a desired one of a predefined set of available discrete amounts, comprising the steps of:

providing said analog input signal as two input phase-split signals in substantial quadrature;

weighting each of said input phase-split signals to produce a respective plurality of weighted phase-split signals for each of said input phase-split signal, the negative of each weighted phase-split signal in each of said pluralities of weighted phase-split signals also being in such plurality of weighted phase-split signals; and summing selected ones of said weighted phase-split signals, said selection being made in response to said desired phase rotation amount.

13. A method according to claim 12, wherein said predefined set of available discrete amounts consists of eight available amounts substantially evenly spaced in a circular phase range of 0° to 360°, and wherein each of said pluralities of weighted phase-split signals consist of four signals having respective relative weights of: 1, −1, $1+\vec{\sqrt{2}}/2$ and $-(1+\vec{\sqrt{2}}/2)$.

14. Apparatus for processing ultrasonic energy incident on a plurality of ultrasonic transducers by phase-rotating an analog input signal by a desired phase rotation, comprising:

a source providing said analog input signal as a plurality of input phase-split signals;

amplifier circuitry weighting at least one of said input phase-split signals by a plurality of different fixed weights to produce a plurality of weighted phase-split signals; and a selective summer summing selected ones of said weighted phase-split signals, said selection being made in response to said desired phase rotation.

15. Apparatus according to claim 14, wherein said source provides exactly two input phase-split signals.

16. Apparatus according to claim 15, wherein said two input phase-split signals are substantially in quadrature.

17. Apparatus according to claim 15, wherein said source comprises:

a first mixer mixing said analog input signal with a first demodulation signal to produce a first one of said input phase-split signals; and a second mixer coupled in parallel with said first mixer, said second mixer mixing said analog input signal with a second demodulation signal to produce a second one of said input phase-split signals, said first and second demodulation signals being substantially in quadrature.

18. Apparatus according to claim 14, wherein said source comprises:

a first filter coupled to receive said analog input signal and to provide a first one of said input phase-split signals; and a second filter coupled to receive said analog input signal and to provide a second one of said input phase-split signals, said first and second filters having transfer characteristics of approximately equal magnitude over a predetermined frequency range and being substantially in quadrature over said predetermined range.

19. Apparatus according to claim 14, wherein said amplifier circuitry weights each of said input phase-split signals by a respective plurality of different fixed weights to produce a respective plurality of weighted phase-split signals.

20. Apparatus according to claim 14, wherein the negative of each fixed weight in said plurality of different fixed weights is also in said plurality of different fixed weights.

21. Apparatus for processing ultrasonic energy incident on a plurality of ultrasonic transducers by phase-rotating an analog input signal by a desired one of a predefined set of available discrete amounts, comprising:

a source providing said analog input signal as two input phase-split signals substantially in quadrature;

amplifier circuitry weighting each of said input phase-split signals to produce a respective plurality of weighted phase-split signals for each of said input phase-split signals, the negative of each weighted phase-split signal in each of said pluralities of weighted phase-split signals also being in such plurality of weighted phase-split signals; and a selective summer summing selected ones of said weighted phase-split signals, said selection being made in response to said desired phase rotation amount.

22. Apparatus according to claim 21, wherein said predefined set of available discrete amounts consists of eight available amounts substantially evenly spaced in a circular phase range of 0° to 360°, and wherein each of said pluralities of weighted phase-split signals consists of four signals having respective relative weights of: 1, −1, $1+\vec{\sqrt{2}}/2$ and $-(1+\vec{\sqrt{2}}/2)$.

23. A method for controlling an ultrasonic beamformer system, comprising the steps of:

communicating a transmit data set from a central control to a transmit beamformer of said system, said transmit beamformer being coupled to excite an array of ultrasonic transducers to emit a transmit beam, said transmit data set indicating a transmit delay profile across said array which focuses said transmit beam;

communicating a non-imaging receive data set from said central control to a separate local control of a non-imaging receive beamformer of said system, said non-imaging receive beamformer being coupled to receive signals for a non-imaging receive beam from said array of ultrasonic transducers, said non-imaging receive data set indicating a non-imaging receive delay profile across said array which focuses said non-imaging receive beam;

communicating an imaging receive data set from said central control to an imaging receive beamformer of said system, said imaging receive beamformer being coupled to receive signals for an imaging receive beam from said array of transducers, said imaging receive data set indicating an imaging receive delay profile across said array which focuses said imaging receive beam; and in said central control, calculating both said transmit delay profile and said non-imaging receive delay profile from a common source delay profile.

24. A method according to claim 23, wherein said non-imaging receive data set further indicates a profile of active array elements.

25. A method according to claim 23, wherein said non-imaging receive data set further indicates a focusing time delay profile across said array of active range intervals.

26. A method according to claim 23, wherein said transmit delay profile defines a steering angle for said transmit beam, and wherein said non-imaging receive delay profile defines the same steering angle for said non-imaging receive beam.

27. A method according to claim 23, wherein said non-imaging Doppler receive beamformer includes a range gate for each of said signals from said array, and wherein said non-imaging receive data set indicates when and for how long each of said range gates is to be enabled.

28. A method according to claim 27, wherein said non-imaging receive data set comprises a vector of bits for each of said range gates, each i'th bit of each given vector indicating whether the given vector's range gate is to be enabled during the i'th of a plurality of time periods, all of said time periods having the same duration.

29. A method according to claim 23, wherein said non-imaging receive beamformer includes a phase rotator for each of said signals from said array, and wherein a portion of said receive data set indicates a rotation amount for each of said phase rotators.

30. Apparatus for processing a plurality of input signals each responsive to ultrasonic energy incident on a respective ultrasonic receive element in an array, comprising:
 a first range gate range-gating a signal responsive to at least one of said input signals responsively to an enable input of said range gate;
 a first vector of bits for said first range gate; and
 applying means for applying sequential bits in said first vector to said enable input of said first range gate sequentially at predetermined intervals, said first range gate being enabled when the bit applied to said enable input has one logic level and disabled when the bit applied to said enable input has another logic level.

31. Apparatus according to claim 30, wherein said predetermined intervals all have the same duration.

32. Apparatus according to claim 30, wherein said duration is programmable.

33. Apparatus according to claim 30, wherein said first vector comprises writable memory.

34. Apparatus according to claim 30, wherein said first range gate is one of a plurality of range gates each range gating a respective signal responsive to a respective one of said input signals responsively to a respective enable input,
 wherein said first vector is one of a plurality of vectors of bits, each vector being for a respective one of said range gates,
 said applying means applying sequential bits in each of said vectors to the enable input of the range gate for the vector sequentially at said predetermined intervals, each of said range gates being enabled when the bit applied to the enable input of the range gate has said one logic level and disabled when the bit applied to the enable input of the range gate has said another logic level,
 said predetermined intervals being common across all of said range gates.

35. Apparatus according to claim 34, wherein each of said vectors comprise writable memory.

36. Ultrasonic receive apparatus for processing analog signals from a plurality of ultrasonic receive elements in an array, which receive elements each generate a respective analog signal in response to ultrasonic energy incident thereon, comprising:
 a first, imaging receive beamformer responsive to said analog signals to produce a first beamformed output signal; and
 a second, non-imaging receive beamformer responsive to said analog signals to produce a second beamformed output signal, said second, non-imaging beamformer comprising a plurality of processing channels, each channel comprising a demodulator demodulating the respective analog signal to generate a respective baseband signal, and a phase rotator for aligning the respective baseband signal, said second, non-imaging beamformer using said aligned baseband signals to produce said second beamformed output signal.

37. Apparatus according to claim 36, wherein the second beamformer comprises a channel summer for summing said baseband signals in said plurality of channels to produce said second beamformed output signal.

38. Apparatus according to claim 37, wherein said channel summer is downstream of said phase rotator.

39. Apparatus according to claim 36, wherein said first receive beamformer produces the first beamformed output signal as a multi-beam output signal, and wherein said second receive beamformer produces the second beamformed output signal as a single-beam signal.

40. Apparatus according to claim 36 wherein said first and second receive beamformers have respective dynamic ranges, and wherein the dynamic range of said second receive beamformer is wider than that of said first receive beamformer.

41. Apparatus according to claim 40, wherein the dynamic range of said second receive beamformer is substantially wider than that of said first receive beamformer.

42. Apparatus according to claim 40, wherein said first and second receive beamformers have respective directional selectivities for said incident ultrasonic energy, and wherein the directional selectivity of said first receive beamformer is finer than that of said second receive beamformer.

43. Apparatus according to claim 42, wherein the directional selectivity of said first receive beamformer is substantially finer than that of said second receive beamformer.

44. Apparatus according to claim 36, wherein said first and second receive beamformers have respective directional selectivities for said incident ultrasonic energy, and wherein the directional selectivity of said first receive beamformer is finer than that of said second receive beamformer.

45. Apparatus according to claim 40, wherein said first receive beamformer comprises a digital receive beamformer.

46. Apparatus according to claim 40, wherein said first receive beamformer comprises an analog receive beamformer.

47. Apparatus according to claim 40, wherein said first receive beamformer comprises a hybrid analog/digital receive beamformer.

48. Apparatus according to claim 36, wherein:
 the first output signal produced by said first receive beamformer comprises a plurality of values each corresponding to a target in a different respective one of a plurality of range intervals on a beam;
 the second output signal produced by said second receive beamformer comprises at least one value corresponding to a target on a beam within a predetermined range interval; and
 a range defined by said plurality of range intervals is substantially greater than a range defined by said predetermined range interval.

49. Apparatus according to claim 36, wherein said first receive beamformer dynamically tracks a range of focal points of said ultrasonic energy, and wherein said second receive beamformer does not dynamically track a range of focal points of said ultrasonic energy.

50. Apparatus according to claim 37, wherein said first receive beamformer comprises a plurality of first processing channels each responsive to a respective one of said analog signals, each of said first processing channels comprising:

an analog-to-digital converter coupled to produce a digital signal responsive to the respective one of said analog signals; and time delay means, downstream of said analog-to-digital converter, for introducing a variable time delay in the first processing channel according to a first focusing time delay profile for said first receive beamformer, and wherein said plurality of channels in said second receive beamformer define a plurality of second processing channels each responsive to a respective one of said analog signals, and each including range isolation means for isolating a selected range interval in the second processing channel according to a second focusing time delay profile for said second receive beamformer, said second receive beamformer further comprising an analog-to-digital converter downstream of the range isolation means of at least one of said second channels.

51. Apparatus according to claim 50, wherein said channel summer is downstream of said range isolation means for all of said second channels and upstream of said analog-to-digital converter.

52. Apparatus according to claim 36, wherein said first receive beamformer comprises a plurality of first processing channels each responsive to a respective one of said analog signals, each of said first processing channels comprising an analog-to-digital converter and a variable phase rotator downstream of said analog-to-digital converter; and wherein said phase rotator in said second receive beamformer comprises a variable phase rotator, said plurality of channels in said second receive beamformer define a plurality of second processing channels each responsive to a respective one of said analog signals, and each comprising the respective variable phase rotator, and an analog-to-digital converter downstream of the variable phase rotator of at least one of said second channels.

53. Apparatus according to claim 52, wherein said second beamformer comprises a channel summer for summing said baseband signals in said plurality of channels to produce said second beamformed output signal, said channel summer being downstream of the variable phase rotator of all of said second channels and upstream of said analog-to-digital converter.

54. Apparatus according to claim 37, wherein:

said first receive beamformer comprises a plurality of processing channels each responsive to a respective one of said analog signals and each producing a respective digital channel output signal, and a digital adder coupled to sum said digital channel output signals; and wherein said plurality of channels in second beamformer define a plurality of second processing channels each responsive to a respective one of said analog signals and each producing a respective analog channel output signal, and wherein said summer comprises an analog adder coupled to sum said analog channel output signals.

55. Apparatus according to claim 54, for use further with a common time reference, wherein each of said processing channels in said first receive beamformer comprises:

analog-to-digital conversion means generating a respective digital input signal in response to the respective analog signal for the channel;

digital means for delaying said digital input signal for the channel by a respective amount relative to said common time reference and for time-delaying the digital input signal with that of all others of said channels;

digital means for weighting the digital input signal for the channel by a respective apodization; and digital means for demodulating the digital input signal for the channel.

56. Apparatus according to claim 54, wherein each of said processing channels in said second beamformer further comprises an analog range gate, and wherein said phase rotator comprises an analog phase rotator.

57. Apparatus according to claim 36, further comprising steering means for steering said analog signals exclusively to one of said first receive beamformer and said second receive beamformer in response to a control signal.

58. Apparatus according to claim 36, wherein each of said receive elements comprises a plurality of ultrasonic transducers in said array.

59. Apparatus according to claim 36, wherein the second beamformer comprises:

a range gate range gating the respective analog signal to produce a gated signal which is responsive to said analog signal only between a gate close time and a gate open time; and an integrator integrating a signal responsive to said gated signal over a time period beginning no later than said gate close time and ending no earlier than said gate open time.

60. Apparatus according to claim 59, wherein said demodulator demodulates a signal responsive to said gated signal, to produce a gated demodulated signal, said signal integrated by said integrator being responsive to said gated demodulated signal.

61. A method for processing analog signals from a plurality of ultrasonic receive elements in an array, which receive elements each generate a respective analog signal in response to ultrasonic energy incident thereon, comprising:

producing a first beamformed output signal using a first, imaging receive beamformer responsive to said analog signals from said array; and producing a second beamformed output signal using a second, non-imaging receive beamformer responsive to said analog signals from said array, said second beamformer comprising a plurality of processing channels, said step of producing said second beamformed output signal comprising demodulating said analog signals to generate respective baseband signals, rotating the phases of said baseband signals to align said baseband signals in said plurality of channels, and using said aligned baseband signals to produce said second beamformed output signal.

62. The method of claim 61, wherein the step producing the second beamformed output signal comprises summing the baseband signals in said plurality of processing channels to produce said second beamformed output signal.

63. The method of claim 62, wherein the step of summing is performed after said step of rotating.

64. The method according to claim 61, wherein the first beamformed output signal produced in the first producing step comprises multi-beam signals, and wherein the second beamformed output signal produced in the second producing step comprises a single-beam signal.

65. The method according to claim 61 wherein said first and second receive beamformers have respective dynamic ranges, and wherein the dynamic range of said second receive beamformer is wider than that of said first receive beamformer.

66. The method according to claim 65, wherein the dynamic range of said second receive beamformer is substantially wider than that of said first receive beamformer.

67. The method according to claim 65, wherein said first and second receive beamformers have respective directional selectivities for said incident ultrasonic energy, and wherein the directional selectivity of said first receive beamformer is finer than that of said second receive beamformer.

68. The method according to claim 67, wherein the directional selectivity of said first receive beamformer is substantially finer than that of said second receive beamformer.

69. The method according to claim 61, wherein said first and second receive beamformers have respective directional selectivities for said incident ultrasonic energy, and wherein the directional selectivity of said first receive beamformer is finer than that of said second receive beamformer.

70. The method according to claim 65 wherein said first receive beamformer comprises a digital receive beamformer.

71. The method according to claim 65 wherein said first receive beamformer comprises an analog receive beamformer.

72. The method according to claim 65 wherein said first receive beamformer comprises a hybrid analog/digital receive beamformer.

73. The method according to claim 61, wherein:
the step of producing said first output signal comprises producing said first output signal comprising a plurality of values each corresponding to a target in a different respective one of a plurality of range intervals on a beam;
said step of producing said second output signal comprises producing said second output signal comprising at least one value corresponding to a target disposed on a beam within a predetermined range interval; and
a range defined by said plurality of range intervals is substantially greater than a range defined by said predetermined range interval.

74. The method according to claim 61, wherein said step of producing a first output signal comprises using said first receive beamformer to dynamically track a range of focal points of said ultrasonic energy, and wherein said step of producing a second output signal comprises using said second receive beamformer such that it does not dynamically track a range of focal points of said ultrasonic energy.

75. The method according to claim 61, wherein said first receive beamformer comprises a plurality of first processing channels and said plurality of processing channels in second receive beamformer define a plurality of second processing channels, the method further comprising:
for each of said first processing channels, receiving a respective one of said analog signals;
converting each of said analog signals to a respective digital signal;
after said step of converting, introducing a variable time delay in the first processing channel according to a first focusing time delay profile for said first receive beamformer;
for each of said second processing channels, receiving a respective one of said analog signals, and for each second processing channel, isolating a selected range interval in the second processing channel according to a second focusing time delay profile for said second receive beamformer,
after the step of isolating, converting the isolated analog signal to a respective digital signal for at least one of said second processing channels.

76. The method according to claim 75, wherein said step of producing said second beamformed output signal comprises summing the baseband signals in said plurality of second processing channels to produce said second beamformed output signal and wherein said step of summing is performed after said step of isolating and before said step of converting.

77. The method according to claim 61, wherein said first receive beamformer comprises a plurality of first processing channels and said plurality of processing channels in said second receive beamformer define a plurality of second processing channels, the method further comprising:
for each of said first processing channels, receiving a respective one of said analog signals, converting said analog signal to a respective digital input signal, and variably phase rotating said digital input signal; and
for each of said plurality of second processing channels, receiving a respective one of said analog signals, and wherein said step of rotating the phases comprises variably phase rotating the analog signals in at least one of said second channels.

78. The method according to claim 77, wherein said step of producing said second beamformed output signal comprises summing the baseband signals in said plurality of second processing channels to produce said second beamformed output signal and wherein said step of summing the signals of all of said second channels is performed after said step of variably phase rotating and before the step of converting.

79. The method according to claim 62, wherein said first receive beamformer comprises a plurality of first processing channels and wherein said plurality of processing channels in said second beamformer define a plurality of second processing channels, the method comprising:
in said first processing channels, receiving a respective one of said analog signals and producing a respective digital channel output signal;
digitally summing said digital channel output signals;
in said second processing channels, receiving a respective one of said analog signals and producing a respective analog channel output signal; and
said step of summing comprises summing said analog channel output signals.

80. The method according to claim 79, using a common time reference, comprising:
for each of said first processing channels, converting the analog signal for the channel to a respective digital input signal;
digitally delaying said digital input signal for the respective channel by a respective amount relative to said common time reference and time-delaying the digital input signal with that of all others of said channels;
digitally weighting the digital input signal for the channel by a respective apodization; and
digitally demodulating the digital input signal for the channel.

81. The method according to claim 79, comprising, for each of said second processing channels, range gating the analog signals.

82. The method according to claim 61, further comprising steering said analog signals exclusively to one of said first receive beamformer and said second receive beamformer in response to a control signal.

83. The method according to claim 61, wherein each of said receive elements comprises a plurality of ultrasonic transducers in said array.

84. The method according to claim 61, wherein the step of producing said second beamformed output signal comprises the steps of:

range gating said analog signal to produce a gated signal which is responsive to said analog signal only between a gate close time and a gate open time; and integrating a signal responsive to said gated signal over a time period beginning no later than said gate close time and ending no earlier than said gate open time.

85. The method according to claim 84, wherein the step of demodulating comprises demodulating a signal responsive to said gated signal, to produce a gated demodulated signal, said signal integrated in said step of integrating being responsive to said gated demodulated signal.

86. Ultrasonic receive apparatus, for processing analog signals from a plurality of ultrasonic receive elements in an array, which receive elements each generate a respective analog signal in response to ultrasonic energy incident thereon, comprising:

a first, imaging receive beamformer responsive to said analog signals from said array to produce a first beamformed output signal; and a second, non-imaging receive beamformer responsive to said analog signals from said array to produce a second beamformed output signal;

said second, non-imaging beamformer comprising at least one demodulator generating a demodulated analog signal, and a plurality of processing channels, each channel comprising a phase rotator producing a respective analog phase-rotated signal, said demodulator being separate from said phase rotator, said second, non-imaging beamformer applying said analog signals in a selected order to said phase rotators and to said demodulator in producing said second beamformed output signal.

87. Apparatus according to claim 86, wherein each processing channel comprises a respective demodulator.

88. Apparatus according to claim 87, wherein each respective demodulator comprises a mixer generating the demodulated analog signal responsive to a first demodulation signal.

89. Apparatus according to claim 87, wherein each respective demodulator generates a first demodulated analog signal, each of said demodulators responsive to a first demodulation signal and further comprising a second demodulator, separate from said phase rotator, generating a second demodulated analog signal responsive to a second demodulation signal, said first and second demodulation signals being the same.

90. Apparatus according to claim 87, wherein said phase-rotators are downstream of said demodulators.

91. Apparatus according to claim 86, wherein each of said respective phase rotators comprises a pair of filters.

92. Apparatus according to claim 91, wherein at least one of said demodulators is downstream of said respective phase rotators.

93. Apparatus according to claim 92, wherein at least one of said demodulators operates on an analog signal comprising a sum of a plurality of channels.

94. A method for processing analog signals from a plurality of ultrasonic receive elements in an array, which receive elements each generate a respective analog signal in response to ultrasonic energy incident thereon, comprising:

receiving said analog signals from said array in a first, imaging receive beamformer and producing a first beamformed output signal; and receiving said analog signals from said array in a second, non-imaging receive beamformer and producing a second beamformed output signal;

said step of producing a second beamformed output signal comprising the steps of phase-rotating the analog signals received by said second, non-imaging beamformer to produce respective focused analog phase-rotated signals, and separate from said step of phase rotating, demodulating said analog signals.

95. The method according to claim 94, wherein said second, non-imaging beamformer comprises a plurality of channels and wherein said step of phase-rotating comprises phase-rotating the analog signals received in each respective channel.

96. The method according to claim 95, wherein the step of demodulating comprises demodulating the analog signals in each respective processing channel.

97. The method according to claim 96, wherein the step of demodulating comprises mixing at least a first one of said analog signals with a first demodulation signal to generate a first demodulated analog signal.

98. The method according to claim 97, wherein the step of demodulating further comprises mixing a second demodulation signal with at least a second one of said analog signals to generate a second demodulated analog signal, said first and second demodulation signals being the same.

99. The method according to claim 96, wherein said step of phase rotating is performed after said step of demodulating.

100. The method according to claim 95, wherein said step of phase-rotating comprises filtering said analog signals in each channel.

101. The method according to claim 100, wherein said step of phase-rotating is performed before said step of demodulating.

102. The method according to claim 101, further comprising summing the signals from at least two channels and wherein said step of demodulation is performed after said summing step.

103. Ultrasonic imaging apparatus, for processing analog signals from a plurality of ultrasonic receive elements in an array, which receive elements each generate a respective analog signal in response to ultrasonic energy incident thereon, comprising:

a transmit beamformer, said transmit beamformer coupled to excite said array of ultrasonic transducers to emit a transmit beam;

a first, imaging receive beamformer, said first, imaging receive beamformer responsive to analog signals from said array of ultrasonic transducers;

a second, non-imaging receive beamformer, said second, non-imaging receive beamformer responsive to said analog signals from said array of ultrasonic transducers;

a central control communicating a transmit data set to said transmit beamformer, said transmit data set indicating a transmit delay profile across said array which focuses said transmit beam;

said central control communicating a non-imaging receive data set to a separate local control of said non-imaging receive beamformer, said non-imaging receive data set indicating a non-imaging receive delay profile across said array which focuses a non-imaging receive beam;

said central control communicating an imaging receive data set to said imaging receive beamformer, said imaging receive data set indicating an imaging receive delay profile across said array which focuses an imaging receive beam; and said central control calculating both said transmit delay profile and said non-imaging receive delay profile from a common source delay profile.

104. Apparatus according to claim 103, wherein said non-imaging receive data set further indicates a profile of active array elements.

105. Apparatus according to claim 103, wherein said non-imaging receive data set further indicates a focusing time delay profile across an array of active range intervals.

106. Apparatus according to claim 103, wherein said transmit delay profile defines a steering angle for said transmit beam, and wherein said non-imaging receive delay profile defines the same steering angle for said non-imaging receive beam.

107. Apparatus according to claim 106, wherein said non-imaging beamformer comprises a Doppler beamformer and said non-imaging receive delay profile comprises a Doppler receive time delay profile, wherein said central control calculates both said Doppler receive time delay profile and said imaging receive delay profile from the common source delay profile.

108. Apparatus according to claim 106, wherein said transmit delay profile defines a steering angle for said transmit beam, wherein said non-imaging receive delay profile defines the same steering angle for said non-imaging receive beam, and wherein said imaging receive delay profile also defines the same steering angle for said imaging receive beam.

109. Apparatus according to claim 106, wherein said non-imaging receive beamformer includes a range gate for each of said analog signals from said array, and wherein said non-imaging receive data set indicates when and for how long each of said range gates is to be enabled.

110. Apparatus according to claim 109, wherein said non-imaging receive data set comprises a vector of bits for each of said range gates, each i'th bit of each given vector indicating whether the given vector's range gate is to be enabled during the i'th of a plurality of time periods, all of said time periods having the same duration.

111. Apparatus according to claim 103, wherein said non-imaging receive beamformer includes a phase rotator for each of said analog signals from said array, and wherein a portion of said non-imaging receive data set indicates a rotation amount for each of said phase rotators.

112. Apparatus for processing a plurality of analog signals each responsive to ultrasonic energy incident on a respective ultrasonic receive element in an array, comprising:

a non-imaging beamformer responsive to said analog signals to produce a beamformed output signal, said non-imaging beamformer comprising:

a plurality of range gates each coupled to range gate a respective one of said input signals;

a plurality of focusing phase-rotators each coupled to phase-rotate a respective one of said input signals; and a summer coupled to sum signals responsive to said gated, phase-rotated signals to produce a summed signal;

a demodulator demodulating a signal responsive to at least one of said input signals; and an integrator, downstream of said demodulator, said integrator integrating a signal responsive to said summed signal to produce an output value.

113. The method according to claim 4, further comprising generating said analog signal using a plurality of ultrasonic transducers responsive to ultrasonic energy from an object, each transducer generating a respective analog signal.

114. The method according to claim 12, further comprising generating said analog signal using a plurality of ultrasonic transducers responsive to ultrasonic energy from an object, each transducer generating a respective analog signal.

115. Apparatus according to claim 14, further comprising a plurality of ultrasonic transducers responsive to ultrasonic energy from an object, each transducer generating a respective analog signal.

116. Apparatus according to claim 21, further comprising a plurality of ultrasonic transducers responsive to ultrasonic energy from an object, each transducer generating a respective analog signal.

* * * * *

UNITED STATES PATENT AND TRADEMARK OFFICE
CERTIFICATE OF CORRECTION

PATENT NO.   : 5,555,534
DATED        : September 10, 1996
INVENTOR(S)  : Maslak et al.

It is certified that error appears in the above-identified patent and that said Letters Patent is hereby corrected as shown below:

In Claim 13, line 7, replace the entire equation with the following equation: -- $1, -1, 1+\sqrt{2}/2$ and $-(1+\sqrt{2}/2)$ --

In Claim 22, line 7, replace the entire equation with the following equation: -- $1, -1, 1+\sqrt{2}/2$ and $-(1+\sqrt{2}/2)$ --.

Signed and Sealed this

Twenty-eighth Day of July, 1998

Attest:

BRUCE LEHMAN

Attesting Officer

Commissioner of Patents and Trademarks